United States Patent
Nishiyama et al.

(10) Patent No.: US 9,618,924 B2
(45) Date of Patent: *Apr. 11, 2017

(54) CPU OF PLC, SYSTEM PROGRAM FOR PLC, AND RECORDING MEDIUM STORING SYSTEM PROGRAM FOR PLC

(71) Applicant: OMRON CORPORATION, Kyoto (JP)

(72) Inventors: Yoshihide Nishiyama, Kanagawa (JP); Shigeyuki Eguchi, Kyoto (JP); Osamu Hamasaki, Kyoto (JP); Tatsuya Kojima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 816 days.

This patent is subject to a terminal disclaimer.

(21) Appl. No.: 14/017,904

(22) Filed: Sep. 4, 2013

(65) Prior Publication Data

US 2014/0005805 A1    Jan. 2, 2014

Related U.S. Application Data

(63) Continuation of application No. PCT/JP2011/056772, filed on Mar. 22, 2011.

(30) Foreign Application Priority Data

Mar. 15, 2011    (JP) .................................. 2011-056772

(51) Int. Cl.
*G06F 3/00* (2006.01)
*G05B 19/05* (2006.01)
(Continued)

(52) U.S. Cl.
CPC ............. *G05B 19/05* (2013.01); *G06F 9/526* (2013.01); *G06F 9/54* (2013.01); *G06F 9/544* (2013.01);
(Continued)

(58) Field of Classification Search
CPC ........................................................ G06F 9/54
(Continued)

(56) References Cited

U.S. PATENT DOCUMENTS 5,119,318 A    6/1992    Paradies et al.
5,815,659 A    9/1998    Umetsu et al.
(Continued)

FOREIGN PATENT DOCUMENTS

CN    1938683    3/2007
CN    1993681    7/2007
(Continued)

OTHER PUBLICATIONS

Sander Stuijk, Exploring Trade-offs in Buffer Requirements and Throughput Constraints for Synchronous Dataflow Graphs, Jul. 2006.*

(Continued)

*Primary Examiner* — Lechi Truong
(74) *Attorney, Agent, or Firm* — Greenblum & Bernstein, P.L.C.

(57) ABSTRACT

The system program includes, as an execution control process of the control program, an owner-side start process that starts execution of an owner-side control program; a copy process in which, when execution of the owner-side control program ends, a global variable that is rewritten by the owner-side control program is copied from a global variable area to a synchronous buffer corresponding to the global variable; and a referrer-side start process that starts execution of a referrer-side control program.

30 Claims, 39 Drawing Sheets

(51) Int. Cl.
*G06F 9/54* (2006.01)
*G06F 9/52* (2006.01)

(52) U.S. Cl.
CPC .............. *G05B 2219/13005* (2013.01); *G05B 2219/13067* (2013.01); *G06F 2209/523* (2013.01)

(58) Field of Classification Search
USPC ........................................................ 719/310
See application file for complete search history.

(56) References Cited

U.S. PATENT DOCUMENTS

| | | | |
|---|---|---|---|
| 6,608,638 | B1 | 8/2003 | Kodosky et al. |
| 8,464,236 | B2 | 6/2013 | Woersching et al. |
| 2004/0133753 | A1 | 7/2004 | Fulton et al. |
| 2005/0097233 | A1* | 5/2005 | Oka ............... G05B 19/054 710/9 |
| 2008/0313413 | A1 | 12/2008 | Hutner et al. |
| 2009/0049437 | A1 | 2/2009 | Woersching et al. |
| 2010/0199002 | A1 | 8/2010 | Izumi |

FOREIGN PATENT DOCUMENTS

| | | |
|---|---|---|
| CN | 100514294 C | 7/2009 |
| CN | 101794131 | 8/2010 |
| CN | 101950281 | 1/2011 |
| EP | 2221686 | 8/2010 |
| GB | 2301914 | 12/1996 |
| JP | 2002-149421 | 5/2002 |
| JP | 2003-203062 | 7/2003 |
| JP | 2005-63033 | 3/2005 |
| JP | 2007-140655 | 6/2007 |
| WO | 90/13087 | 11/1990 |

OTHER PUBLICATIONS

Extended European Search Report in EP11860793.6, dated Oct. 8, 2015.
Office Action in Chinese Application No. 2015122301611850, dated Dec. 28, 2015.
Music, G. et al., "Combined Simulation for Process Control: Extension of a General Purpose Simulation Tool", Computers in Industry, 38 (1999) pp. 79-92.
Flammini, A. et al, "Sensor Integration in Industrial Environment: From Fieldbus to Web Sensors", Computer Standards & Interfaces, 25 (2003) pp. 183-194.
Song, O., et al., "Wait-free Data Sharing Between Periodic Tasks in Multiprocessor Control Systems", Control Engineering Practice, 11 (2003) pp. 601-611.
U.S. Appl. No. 14/017,720 to Yoshihide Nishiyama et al., which was filed Sep. 4, 2013.
U.S. Appl. No. 14/017,684 to Yoshihide Nishiyama et al., which was filed Sep. 4, 2013.
U.S. Appl. No. 14/017,929 to Yoshihide Nishiyama et al., which was filed Sep. 4, 2013.
International Search Report in PCT/JP2011/056772, along with English language translation, mailing date Jun. 7, 2011.
International Preliminary Report on Patentability in PCT/JP/2011/056772, along with English language translation, dated Dec. 20, 2012.

* cited by examiner

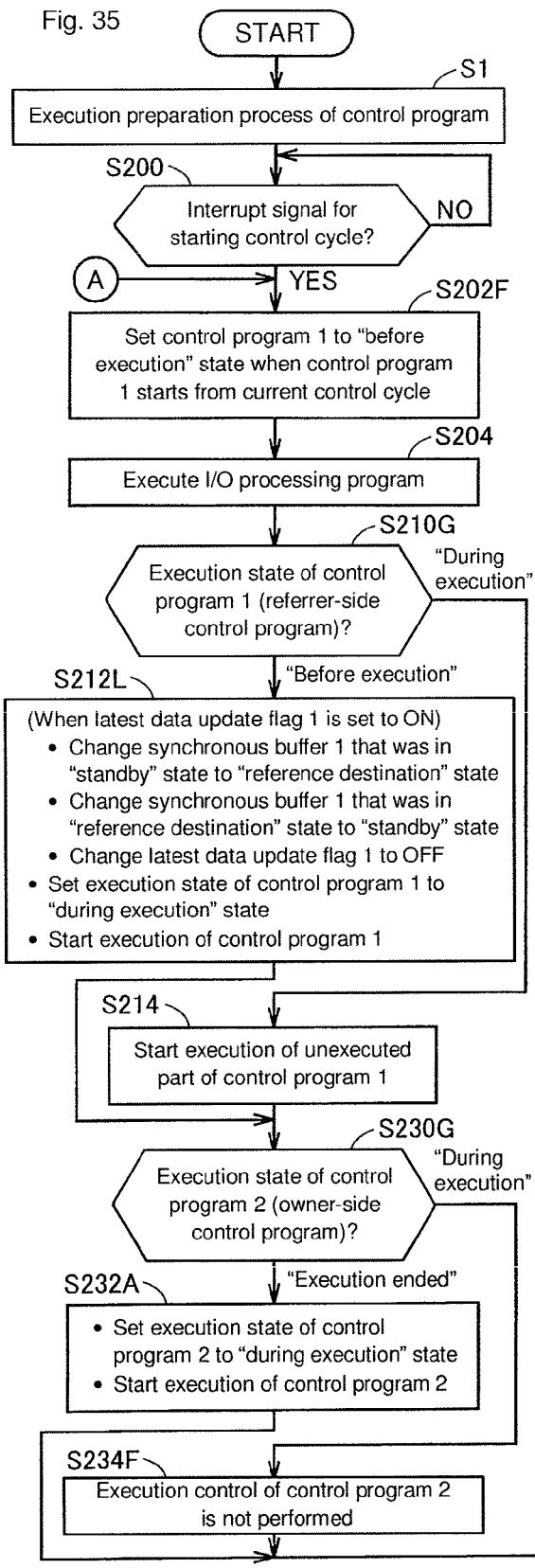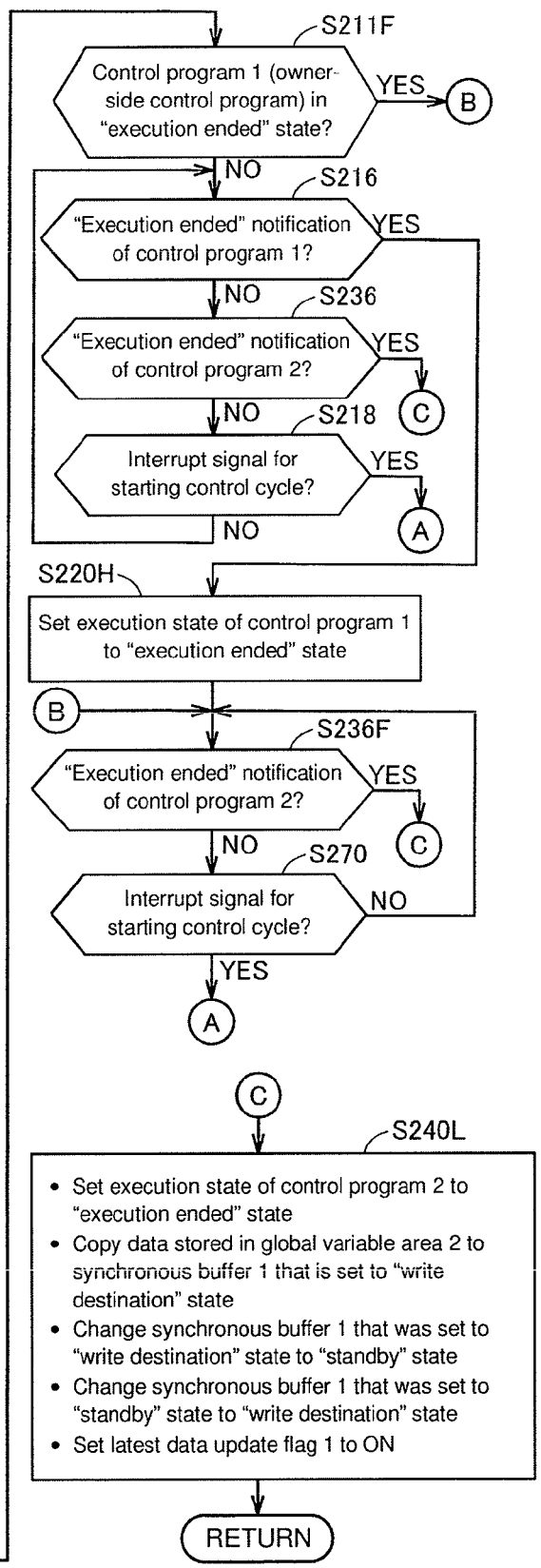
Fig. 35

Fig. 37
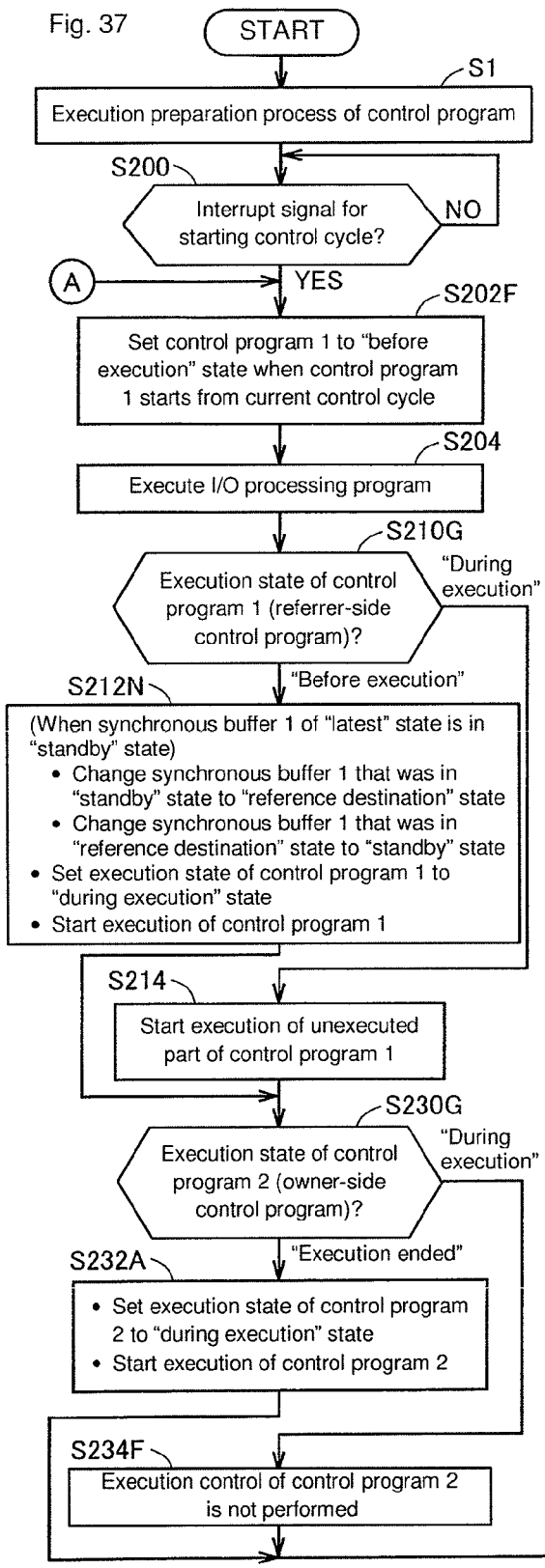
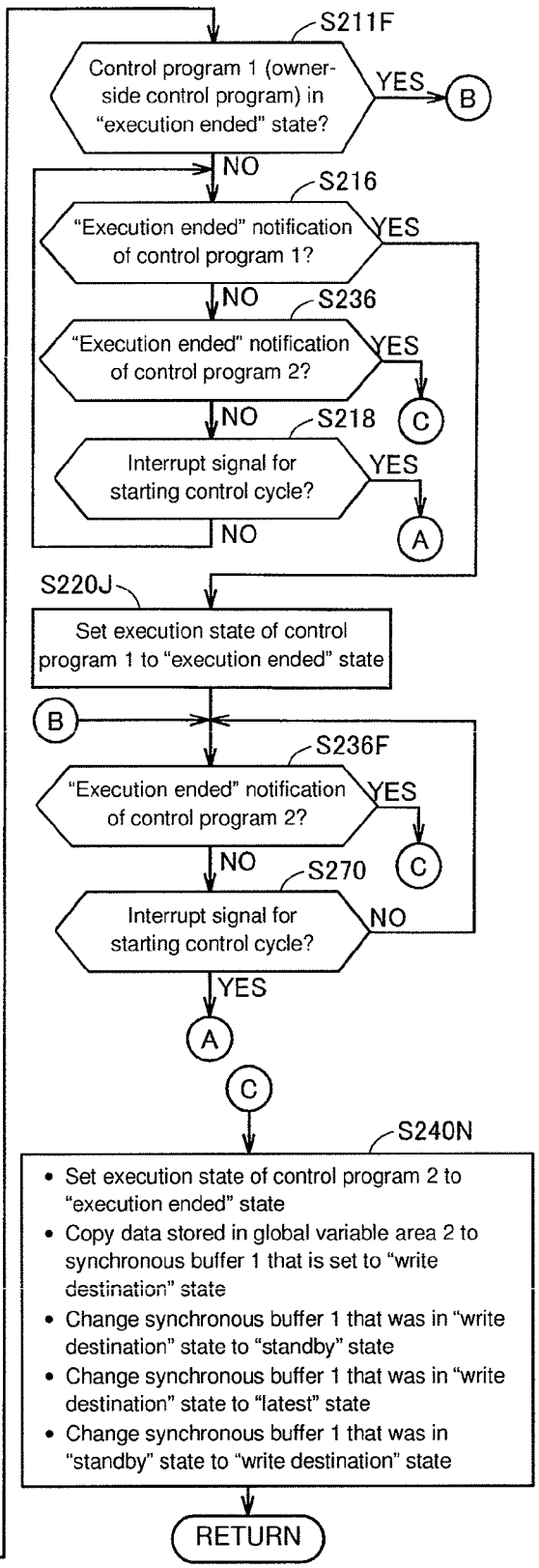

CPU OF PLC, SYSTEM PROGRAM FOR PLC, AND RECORDING MEDIUM STORING SYSTEM PROGRAM FOR PLC

RELATED APPLICATIONS

This application is a continuation application of International Application No. PCT/JP2011/056772, filed Mar. 22, 2011, and claims the benefit of Japanese Application No. 2011-056772, filed Mar. 15, 2011, the disclosures of which are incorporated by reference herein in their entireties.

FIELD OF THE INVENTION

The present invention relates to synchronization of a global variable when a plurality of control programs are executed in a PLC (Programmable Logic Controller) used for controlling operations of a machine, equipment, and the like.

BACKGROUND OF THE INVENTION

A PLC is configured, for example, by a plurality of units such as a CPU (Central Processing Unit) unit that includes a microprocessor executing a control program, or an I/O (Input/Output) unit that manages signal input from an exterior switch or sensor and signal output to an exterior relay or actuator. The CPU unit controls a control target by repeating transmission of output data to another unit, reception of input data from another unit, and execution of a control program that uses the input data to generate the output data. The control program includes a user program that is created according to a control objective of a user. The control program may include a motion control program of which execution is instructed in the user program.

It is known that a plurality of control programs are time-divisionally executed in a PLC. For example, in Patent Literature 1 (Japanese Patent Laid-Open Publication No. 2007-140655), it is described that, in a device in which one CPU is used to process a motion control function controlling a motor and a PLC function executing sequence calculation, for each cycle of a basic clock, "a fixed-cycle motion control process and each axis process" and a "rapid sequence process" are executed, and further, in a remaining period of time of each cycle of the basic clock, a "slow sequence process" or "non-fixed-cycle motion control process" is executed. Further, it is described that, when a slow sequence process does not end within a cycle of the basic clock, the remaining of the process is executed after stopping for a period of time of a predetermined number of cycles of the basic clock.

RELATED ART

Patent Literature

Patent Literature 1: Japanese Patent Laid-Open Publication No. 2007-140655.

SUMMARY OF THE INVENTION

Problems to be Solved by the Invention

When a plurality of control programs are executed in a PLC, in addition to a local variable that is used only by its own process of a control program, a global variable may also be needed that is referenced from a plurality of control programs.

Between start and end of execution of a control program, unless the control program rewrites content of a global variable, no matter how many times the control program references the same global variable, the same content should be obtained. However, between the start and end of execution of the control program, when another control program rewrites the content of the global variable, the control program cannot perform consistent calculation using the global variable.

In this case, it is possible that, before the control program uses the global variable, the control program copies the content of the global variable to a local variable of the control program and actual calculation is performed by referencing the local variable. Or, it is also possible that, when the global variable is rewritten, the rewriting is executed by waiting until when the rewriting does not negatively affect other control programs. In order to do so, to allow the above-described processing to be performed, a developer of the control program must decide procedures regarding how the global variable is used and program accordingly, and this lays a burden on the developer of the control program.

When a system program of a PLC performs exclusive control in which, between start and end of execution of a control program that uses a global variable, other control programs cannot use the global variable, consistency of calculation of the control program is ensured. However, when the exclusive control is performed, until the end of the execution of the control program that has gained access right to the global variable, other control programs that use the global variable cannot be executed. Therefore, in a PLC for which realtime capability is important, such exclusive control that involves such a long period of time of access restriction is not realistic.

A purpose of the present invention is to allow a plurality of control programs in a PLC to be able to reference a global variable for which consistency is ensured, without the need for a control program itself to perform processing of procedures to ensure consistency of the global variable and also without blocking concurrent execution of the plurality of the control programs.

Means for Solving the Problems

According to one aspect of the present invention, a CPU unit of a PLC that controls a control target is provided. The CPU unit of the PLC includes a microprocessor, a memory means and a communication circuit. The CPU unit of the PLC is configured to control the control target by repeating transmission of output data, reception of input data, and execution of a control program that uses the input data to generate the output data. The memory means is used to store the control program, a system program that controls the execution of the control program, and attribute data of a variable that is used by the control program. The microprocessor executes the system program and the control program that are stored in the memory means. The communication circuit transmits the output data and receives the input data. The attribute data can include, when the variable is a global variable that is referenced by a plurality of the control programs, information specifying one owner-side control program that can rewrite the variable and information specifying at least one referrer-side control program that can only reference the variable. The system program includes, as an execution preparation process of the control program, a process in which a global variable area storing the global variable is generated in the memory means; and a process in which, with respect to each referrer-side control program and for each global variable that is referenced by the referrer-side control program, a synchronous buffer is generated in the memory means as a reference destination in place of the global variable area when the referrer-side control program references the global variable. The system program includes, as an execution control process of the control program, an owner-side start process that starts execution of the owner-side control program; a copy process in which, when execution of the owner-side control program ends, the global variable that is rewritten by the owner-side control program is copied from the global variable area to the synchronous buffer corresponding to the global variable; and a referrer-side start process that starts execution of the referrer-side control program.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The first synchronous buffer and the second synchronous buffer are each set to, in a non-overlapping manner, one of a write destination state in which the global variable can be copied from the global variable area to the synchronous buffer and a reference destination state in which the synchronous buffer can be referenced from the referrer-side control program. The copy process is a process of copying to the synchronous buffer in the write destination state.

More preferably, the process in which the synchronous buffer is generated is a process in which, with respect to each referrer-side control program and for each global variable that is referenced from the referrer-side control program, the first synchronous buffer, the second synchronous buffer and a third synchronous buffer are generated as a group of synchronous buffers. The first synchronous buffer, the second synchronous buffer and the third synchronous buffer are each set to, in a non-overlapping manner, one of the write destination state, the reference destination state and a standby state. The copy process further includes a first interchange process in which the write destination state and the standby state of the synchronous buffer in the write destination state that becomes a copy destination and the synchronous buffer in the standby state that is in the same group as the synchronous buffer in the write destination state are interchanged. The referrer-side start process further includes a second interchange process in which, with respect to the synchronous buffers of the referrer-side control program of which execution is started, under a condition that the synchronous buffer storing latest data is in the standby state, the standby state and the reference destination state of the synchronous buffer in the standby state and the synchronous buffer in the reference destination state are interchanged.

Or preferably, the system program further includes, as the execution preparation process of the control program, a process in which, for each combination of the owner-side control program and the referrer-side control program that are associated by the global variable, a latest data update flag is generated in the memory means. The copy process further includes a process in which the latest data update flag related to this copy process is set to ON. The referrer-side start process further includes, under a condition that the latest data update flag related to the synchronous buffer of the referrer-side control program of which execution is started is ON, the second interchange process and a process in which the latest data update flag is set to OFF. Thereby, the second interchange process that is executed under a condition that the synchronous buffer storing latest data is in the standby state is realized.

Or preferably, the system program further includes, as the execution preparation process of the control program, a process in which a latest state recording area is generated in the memory means. The copy process further includes a process in which that the synchronous buffer as the copy destination is in a latest state is recorded in the latest state recording area. The referrer-side start process further includes the second interchange process that is executed under a condition that the synchronous buffer in the latest state that is identified according to content of the latest state recording area is in the standby state.

Or preferably, the referrer-side start process further includes, with respect to the synchronous buffers of the referrer-side control program of which execution is started, under a condition that the synchronous buffer storing latest data is in the write destination state, a third interchange process in which the write destination state and the reference destination state of the synchronous buffer in the write destination state and the synchronous buffer in the reference destination state are interchanged.

More preferably, the system program further includes, as the execution preparation process of the control program, a process in which, for each combination of the owner-side control program and the referrer-side control program that are associated by the global variable, a latest data update flag is generated in the memory means. The copy process further includes a process in which the latest data update flag related to this copy process is set to ON. The referrer-side start process further includes, under a condition that the latest data update flag related to the synchronous buffer of the referrer-side control program of which execution is started is ON, the third interchange process and a process in which the latest data update flag is set to OFF. Thereby, the third interchange process that is executed under a condition that the synchronous buffer storing latest data is in the write destination state is realized.

Or more preferably, the system program further includes, as the execution preparation process of the control program, a process in which a latest state recording area is generated in the memory means. The copy process further includes a process in which that the synchronous buffer as the copy destination is in a latest state is recorded in the latest state recording area. The referrer-side start process further includes the third interchange process that is executed under a condition that the synchronous buffer in the latest state that is identified according to content of the latest state recording area is in the write destination state.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The system program further includes, as the execution preparation process of the control program, a process in which a latest state recording area is generated in the memory means. The copy process further includes a process in which that the synchronous buffer as a copy destination is in a latest state is recorded in the latest state recording area. The referrer-side start process further includes a process in which the synchronous buffer in the latest state that is identified according content of the latest state recording area is set to a reference destination state in which the synchronous buffer is referenced by the referrer-side control program during execution.

More preferably, the process in which the synchronous buffer is generated is a process in which, with respect to each referrer-side control program and for each global variable that is referenced by the referrer-side control program, the first synchronous buffer, the second synchronous buffer and a third synchronous buffer are generated as a group of synchronous buffers. The first synchronous buffer, the second synchronous buffer and the third synchronous buffer are each set to, in a non-overlapping manner, one of a write destination state in which the global variable can be copied from the global variable area, the reference destination state and a standby state. The copy process is a process of copying to the synchronous buffer in the write destination state and further includes a first interchange process in which the write destination state and the standby state of the synchronous buffer in the write destination state that becomes the copy destination and the synchronous buffer in the standby state that is in the same group as the synchronous buffer as the copy destination are interchanged. The referrer-side start process further includes a process in which a synchronous buffer that belongs to the same group as the synchronous buffer in the reference destination state and is not in the write destination state is set to the standby state.

Or preferably, the first synchronous buffer and the second synchronous buffer are set to, in a non-overlapping manner, one of the write destination state in which the global variable can be copied from the global variable area and the reference destination state. The copy process is a process of copying to the synchronous buffer in the write destination state. The referrer-side start process further includes a process in which the other synchronous buffer that belongs to the same group as the synchronous buffer in the reference destination state is set to the write destination state.

Or preferably, the referrer-side start process further includes a process in which the synchronous buffer in the latest state that is identified according content of the latest state recording area is set to a write-protect state. The system program further includes, as the execution control process of the control program, a write-protect release process in which, when execution of the referrer-side control program ends, the write-protect state of the synchronous buffer that was in the write-protect state is released. The copy process is a process in which copying is performed using one of the first synchronous buffer and the second synchronous buffer that is not in the write-protect state as a copy destination.

Preferably, the referrer-side start process further includes a process in which the synchronous buffer that is referenced during execution of the referrer-side control program is set to a write-protect state. The system program further includes, as the execution control process of the control program, a write-protect release process in which, when execution of the referrer-side control program ends, the write-protect state of the synchronous buffer that was in the write-protect state is released. The copy process is a process that is executed under a condition that the synchronous buffer as a copy destination is not in the write-protect state.

More preferably, the process in which the synchronous buffer is generated is a process in which, with respect to each referrer-side control program and for each global variable that is referenced from the referrer-side control program, one synchronous buffer is generated.

More preferably, the process in which the synchronous buffer is generated is a process in which, with respect to each referrer-side control program and for each global variable that is referenced from the referrer-side control program, a first synchronous buffer and a second synchronous buffer are generated as a group of synchronous buffers. The system program further includes, as the execution preparation process of the control program, a process in which a latest state recording area is generated in the memory means. The copy process is a process in which copying is performed using one of the first synchronous buffer and the second synchronous buffer that is not in the write-protect state as a copy destination, and further includes a process in which that a synchronous buffer as the copy destination is in a latest state is recorded in the latest state recording area. The referrer-side start process further includes a process in which the synchronous buffer in the latest state that is identified according content of the latest state recording area is set to the reference destination state in which the synchronous buffer is referenced by the referrer-side control program during execution.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The second synchronous buffer is the synchronous buffer as a reference destination when the referrer-side control program references the global variable. The copy process is a process of copying to the first synchronous buffer. The referrer-side start process further includes a process in which data stored in the first synchronous buffer is copied to the second synchronous buffer.

According to another aspect of the present invention, a system program for a PLC is provided, the system program being stored in a memory means to be executed by a microprocessor in a CPU unit of the PLC, the CPU unit including the microprocessor, the memory means and a communication circuit and controlling a control target by repeating transmission of output data, reception of input data and execution of a control program that uses the input data to generate the output data. The memory means is used to store the control program, a system program that controls the execution of the control program, and attribute data of a variable that is used by the control program. The microprocessor executes, in addition to the system program, the control program. The communication circuit transmits the output data and receives the input data. The attribute data can include, when the variable is a global variable that is referenced by a plurality of the control programs, information specifying one owner-side control program that can rewrite the variable and information specifying at least one referrer-side control program that can only reference the variable. The system program causes the microprocessor to execute, as an execution preparation process of the control program, a process in which a global variable area storing the global variable is generated in the memory means: and a process in which, with respect to each referrer-side control program and for each global variable that is referenced by the referrer-side control program, a synchronous buffer is generated in the memory means as a reference destination in place of the global variable area when the referrer-side control program references the global variable. The system program causes the microprocessor to execute, as an execution control process of the control program, an owner-side start process that starts execution of the owner-side control program; a copy process in which, when execution of the owner-side control program ends, the global variable that is rewritten by the owner-side control program is copied from the global variable area to the synchronous buffer corresponding to the global variable; and the referrer-side start process that starts execution of a referrer-side control program.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The first synchronous buffer and the second synchronous buffer are each set to, in a non-overlapping manner, one of a write destination state in which the global variable can be copied from the global variable area to the synchronous buffer and a reference destination state in which the synchronous buffer can be referenced from the referrer-side control program. The copy process is a process of copying to the synchronous buffer in the write destination state.

More preferably, the process in which the synchronous buffer is generated is a process in which, with respect to each referrer-side control program and for each global variable that is referenced from the referrer-side control program, the first synchronous buffer, the second synchronous buffer and a third synchronous buffer are generated as a group of synchronous buffers. The first synchronous buffer, the second synchronous buffer and the third synchronous buffer are each set to, in a non-overlapping manner, one of the write destination state, the reference destination state and a standby state. The copy process further includes a first interchange process in which the write destination state and the standby state of the synchronous buffer in the write destination state that becomes a copy destination and the synchronous buffer in the standby state that is in the same group as the synchronous buffer in the write destination state are interchanged. The referrer-side start process further includes a second interchange process in which, with respect to the synchronous buffers of the referrer-side control program of which execution is started, under a condition that the synchronous buffer storing latest data is in the standby state, the standby state and the reference destination state of the synchronous buffer in the standby state and the synchronous buffer in the reference destination state are interchanged.

Or preferably, the referrer-side start process further includes, with respect to the synchronous buffers of the referrer-side control program of which execution is started, under a condition that the synchronous buffer storing latest data is in the write destination state, a third interchange process in which the write destination state and the reference destination state of the synchronous buffer in the write destination state and the synchronous buffer in the reference destination state are interchanged.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The system program causes the microprocessor to further execute, as the execution preparation process of the control program, a process in which a latest state recording area is generated in the memory means. The copy process further includes a process in which that the synchronous buffer as a copy destination is in a latest state is recorded in the latest state recording area. The referrer-side start process further includes a process in which the synchronous buffer in the latest state that is identified according content of the latest state recording area is set to a reference destination state in which the synchronous buffer is referenced by the referrer-side control program during execution.

Preferably, the referrer-side start process further includes a process in which the synchronous buffer that is referenced during execution of the referrer-side control program is set to a write-protect state. The system program causes the microprocessor to further execute, as the execution control process of the control program, a write-protect release process in which, when execution of the referrer-side control program ends, the write-protect state of the synchronous buffer that was in the write-protect state is released. The copy process is a process that is executed under a condition that the synchronous buffer as a copy destination is not in the write-protect state.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The second synchronous buffer is the synchronous buffer as a reference destination when the referrer-side control program references the global variable. The copy process is a process of copying to the first synchronous buffer. The referrer-side start process further includes a process in which data stored in the first synchronous buffer is copied to the second synchronous buffer.

According to further another aspect of the present invention, a recording medium storing a system program for a PLC is provided, the system program being stored in a memory means to be executed by a microprocessor in a CPU unit of the PLC, the CPU unit including the microprocessor, the memory means and a communication circuit and controlling a control target by repeating transmission of output data, reception of input data, and execution of a control program that uses the input data to generate the output data. The memory means is used to store the control program, a system program that controls the execution of the control program, and attribute data of a variable that is used by the control program. The microprocessor executes, in addition to the system program, the control program. The communication circuit transmits the output data and receives the input data. The attribute data can include, when the variable is a global variable that is referenced by a plurality of the control programs, information specifying one owner-side control program that can rewrite the variable and information specifying at least one referrer-side control program that can only reference the variable. The system program causes the microprocessor to execute, as an execution preparation process of the control program, a process in which a global variable area storing the global variable is generated in the memory means; and a process in which, with respect to each referrer-side control program and for each global variable that is referenced by the referrer-side control program, a synchronous buffer is generated in the memory means as a reference destination in place of the global variable area when the referrer-side control program references the global variable. The system program causes the microprocessor to execute, as an execution control process of the control program, an owner-side start process that starts execution of the owner-side control program; a copy process in which, when execution of the owner-side control program ends, the global variable that is rewritten by the owner-side control program is copied from the global variable area to the synchronous buffer corresponding to the global variable; and the referrer-side start process that starts execution of a referrer-side control program.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The first synchronous buffer and the second synchronous buffer are each set to, in a non-overlapping manner, one of a write destination state in which the global variable can be copied from the global variable area to the synchronous buffer and a reference destination state in which the synchronous buffer can be referenced from the referrer-side control program. The copy process is a process of copying to the synchronous buffer in the write destination state.

More preferably, the process in which the synchronous buffer is generated is a process in which, with respect to each referrer-side control program and for each global variable that is referenced from the referrer-side control program, the first synchronous buffer, the second synchronous buffer and a third synchronous buffer are generated as a group of synchronous buffers. The first synchronous buffer, the second synchronous buffer and the third synchronous buffer are each set to, in a non-overlapping manner, one of the write destination state, the reference destination state and a standby state. The copy process further includes a first interchange process in which the write destination state and the standby state of the synchronous buffer in the write destination state that becomes a copy destination and the synchronous buffer in the standby state that is in the same group as the synchronous buffer in the write destination state are interchanged. The referrer-side start process further includes a second interchange process in which, with respect to the synchronous buffers of the referrer-side control program of which execution is started, under a condition that the synchronous buffer storing latest data is in the standby state, the standby state and the reference destination state of the synchronous buffer in the standby state and the synchronous buffer in the reference destination state are interchanged.

Or preferably, the referrer-side start process further includes, with respect to the synchronous buffers of the referrer-side control program of which execution is started, under a condition that the synchronous buffer storing latest data is in the write destination state, a third interchange process in which the write destination state and the reference destination state of the synchronous buffer in the write destination state and the synchronous buffer in the reference destination state are interchanged.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The system program causes the microprocessor to further execute, as the execution preparation process of the control program, a process in which a latest state recording area is generated in the memory means. The copy process further includes a process in which that the synchronous buffer as a copy destination is in a latest state is recorded in the latest state recording area. The referrer-side start process further includes a process in which the synchronous buffer in the latest state that is identified according content of the latest state recording area is set to a reference destination state in which the synchronous buffer is referenced by the referrer-side control program during execution.

Preferably, the referrer-side start process further includes a process in which the synchronous buffer that is referenced during execution of the referrer-side control program is set to a write-protect. state The system program causes the microprocessor to further execute, as the execution control process of the control program, a write-protect release process in which, when execution of the referrer-side control program ends, the write-protect state of the synchronous buffer that was in the write-protect state is released. The copy process is a process that is executed under a condition that the synchronous buffer as a copy destination is not in the write-protect state.

Preferably, the process in which the synchronous buffer is generated is a process in which, with respect to each referrer-side control program and for each global variable that is referenced by the referrer-side control program, a first synchronous buffer and a second synchronous buffer are generated as a group of synchronous buffers. The second synchronous buffer is the synchronous buffer as a reference destination when the referrer-side control program references the global variable. The copy process is a process of copying to the first synchronous buffer. The referrer-side start process further includes a process in which data stored in the first synchronous buffer is copied to the second synchronous buffer.

Effect of the Invention

According to the present invention, in a PLC, a plurality of control programs can reference a global variable for which consistency is ensured. In this case, there is no need for a control program itself to perform processing of procedures to ensure the consistency of the global variable. Further, it also does not occur that time-divisional execution or parallel execution of a plurality of control programs is prevented due to waiting over a long period of time for access right to a global variable.

BRIEF DESCRIPTION OF THE DRAWINGS

FIG. 35 is a flow chart illustrating another execution operation according to Embodiment 6.

FIG. 37 is a flow chart illustrating another execution operation according to Embodiment 7.

MODE FOR CARRYING OUT THE INVENTION

Figure 1:
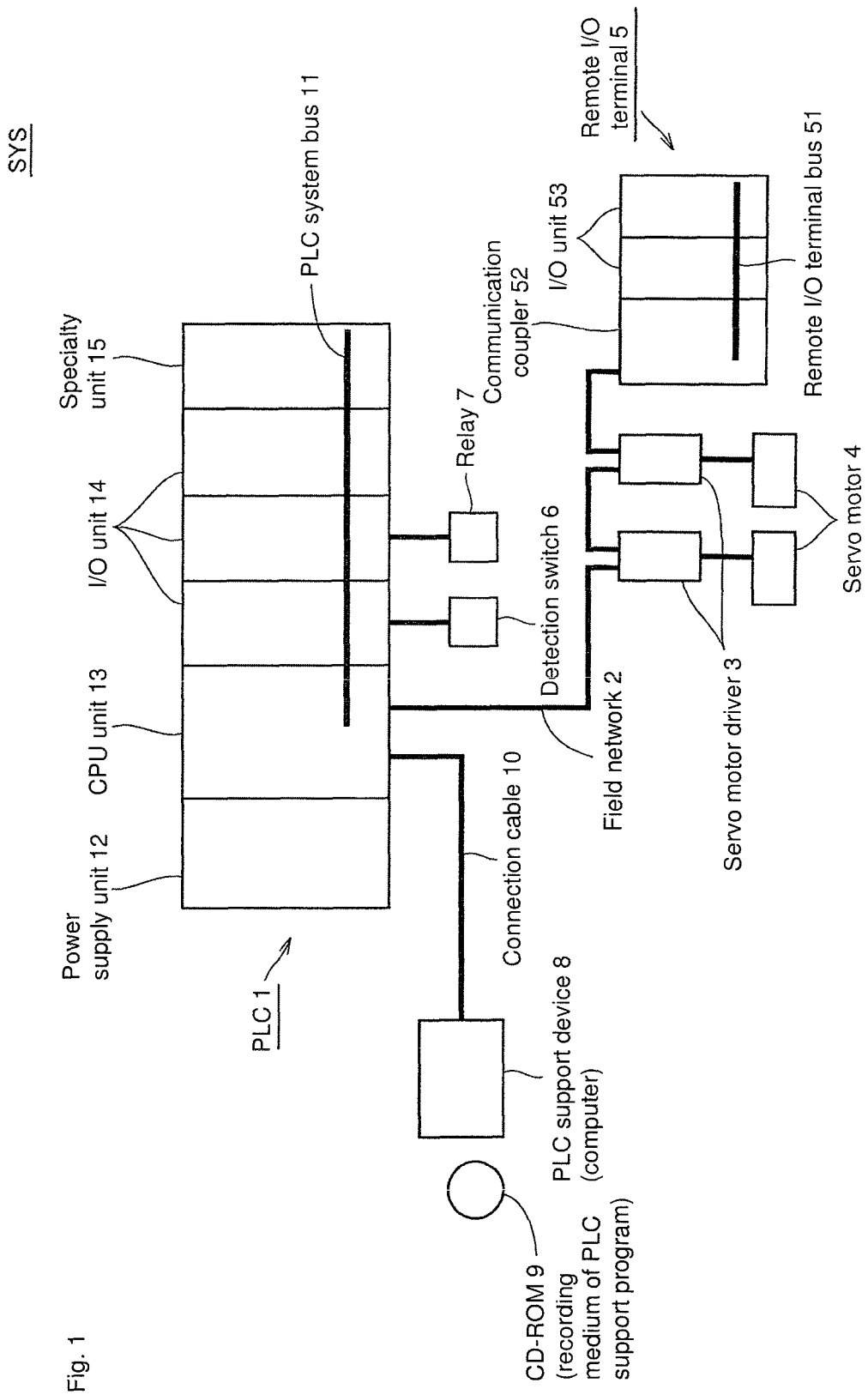
FIG. 1 is a schematic view illustrating an overview configuration of a PLC system according to embodiments of the present invention.

A detailed description of embodiments according to the present invention is given with reference to the drawings. Identical or equivalent portions in the drawings are given identical reference symbols and descriptions thereof are not reiterated.

<A. System Configuration>

A PLC according to the present embodiment controls a control target such as a machine and an equipment. The PLC according to the present embodiment includes a CPU unit as a configuration element. The CPU unit includes a microprocessor, a memory means and a communication circuit. The memory means is used to store a control program, a system program that controls execution of a program, and attribute data of a variable that is used by the control program. The microprocessor executes the system program and the control program that are stored in the memory means. The communication circuit transmits output data and receives input data. The attribute data can include, in a case where the variable is a global variable that is referenced by a plurality of control programs, information specifying one owner-side control program that can rewrite the variable and information specifying one or a plurality of referrer-side control programs that can only reference the variable. First, with reference to FIG. 1, a description is given of a system configuration of a PLC 1 according to the present embodiment.

FIG. 1 is a schematic view illustrating an overview configuration of a PLC system according to embodiments of the present invention. With reference to FIG. 1, a PLC system SYS includes the PLC 1, a servo motor driver 3 and remote I/O terminal 5 connected to the PLC 1 by a field network 2, and a detection switch 6 and relay 7 configuring a field instrument. In addition, a PLC support device 8 is connected to the PLC 1 via a connection cable 10 or the like.

The PLC 1 includes a CPU unit 13 executing a principal calculation process, one or more I/O units 14, and a specialty unit 15. These units are configured so as to be capable of mutually exchanging data via a PLC system bus 11. Further, power of an appropriate voltage is supplied to these units by a power supply unit 12. In addition, each unit configuring the PLC 1 is provided by a PLC manufacturer; therefore, the PLC system bus 11 is typically independently developed and used by the PLC manufacturer. In contrast, the field network 2 described below is often capable of connecting products from different manufacturers and standards for these products are often publicly available.

Details of the CPU unit 13 are noted below with reference to FIG. 2. The I/O unit 14 is a unit related to general input/output processing and handles input/output of data binarized to be ON or OFF. In other words, the I/O unit 14 collects information about whether a sensor such as the detection switch 6 is detecting some target (is ON) or not detecting some target (is OFF). In addition, the I/O unit 14 outputs to an output (such as the relay 7 or an actuator) one of an instruction to activate (ON) and an instruction to deactivate (OFF).

The specialty unit 15 includes functions not supported by the I/O unit 14, such as input/output of analog data, temperature control, and communication using a specific communication method.

The field network 2 transmits various kinds of data exchanged with the CPU unit 13. As the field network 2, typically, various kinds of industrial Ethernets® can be used. Known examples of the industrial Ethernet® include EtherCAT®, Profinet IRT, MECHATROLINK®-III, Powerlink, SERCOS®-III, and CIP Motion, any of which may be used. Moreover, a field network other than the industrial Ethernet® may also be used. For example, when motion control is not performed, DeviceNet, CompoNet/IP®, or the like may be used. In the PLC system SYS according to the present embodiments, a representative example is given in the present embodiments of a configuration where the industrial Ethernet® EtherCAT® is used as the field network 2.

FIG. 1 illustrates the PLC system SYS including both the PLC system bus 11 and the field network 2. However, a system configuration may be employed in which only one of the PLC system bus 11 and the field network 2 is provided. For instance, the field network 2 may be connected to all units. Alternatively, instead of using the field network 2, the servo motor driver 3 may be directly connected to the PLC system bus 11. Furthermore, a communication unit of the field network 2 may be connected to the PLC system bus 11 to communicate with devices connected to the field network 2 by way of the communication unit from the CPU unit 13.

In addition, by allocating functions of the I/O unit 14 and the servo motor driver 3 to the CPU unit 13, the PLC 1 may have a configuration in which the CPU unit 13 directly controls a control target without mediation by the I/O unit 14, the servo motor driver 3, or the like.

The servo motor driver 3 is connected to the CPU unit 13 via the field network 2, and also drives the servo motor 4 according to an instruction value from the CPU unit 13. More specifically, the servo motor driver 3 receives from the PLC 1, at a constant period, an instruction value such as a position instruction value, speed instruction value, and torque instruction value. Further, the servo motor driver 3 obtains, from a detector such as a position sensor (rotary encoder) or torque sensor connected to a shaft of the servo motor 4, an actual measured value for movement of the servo motor 4 such as position, speed (typically calculated based on a difference between a current location and a previous location), and torque. Also, the servo motor driver 3 sets the instruction value from the CPU unit 13 to a desired value, then performs feedback control to produce a feedback value from the actual measured value. In other words, the servo motor driver 3 adjusts an electric current driving the servo motor 4 such that the actual measured value approaches the desired value. Moreover, the servo motor driver 3 may also be called a servo motor amplifier.

FIG. 1 depicts an exemplary system in which the servo motor 4 and the servo motor driver 3 are combined. However, other configurations can also be used, such as a system in which a pulse motor and a pulse motor driver are combined.

The remote I/O terminal 5 is further connected to the field network 2 of the PLC system SYS shown in FIG. 1. The remote I/O terminal 5, basically, performs processes related to general input/output processing similar to the I/O unit 14. More specifically, the remote I/O terminal 5 includes a communication coupler 52 for performing a process related to data transmission in the field network 2, and one or more I/O units 53. These units are configured so as to be capable of mutually exchanging data via a remote I/O terminal bus 51.

The PLC support device 8 is described below.

<B. Hardware Configuration of CPU Unit>

Figure 2:
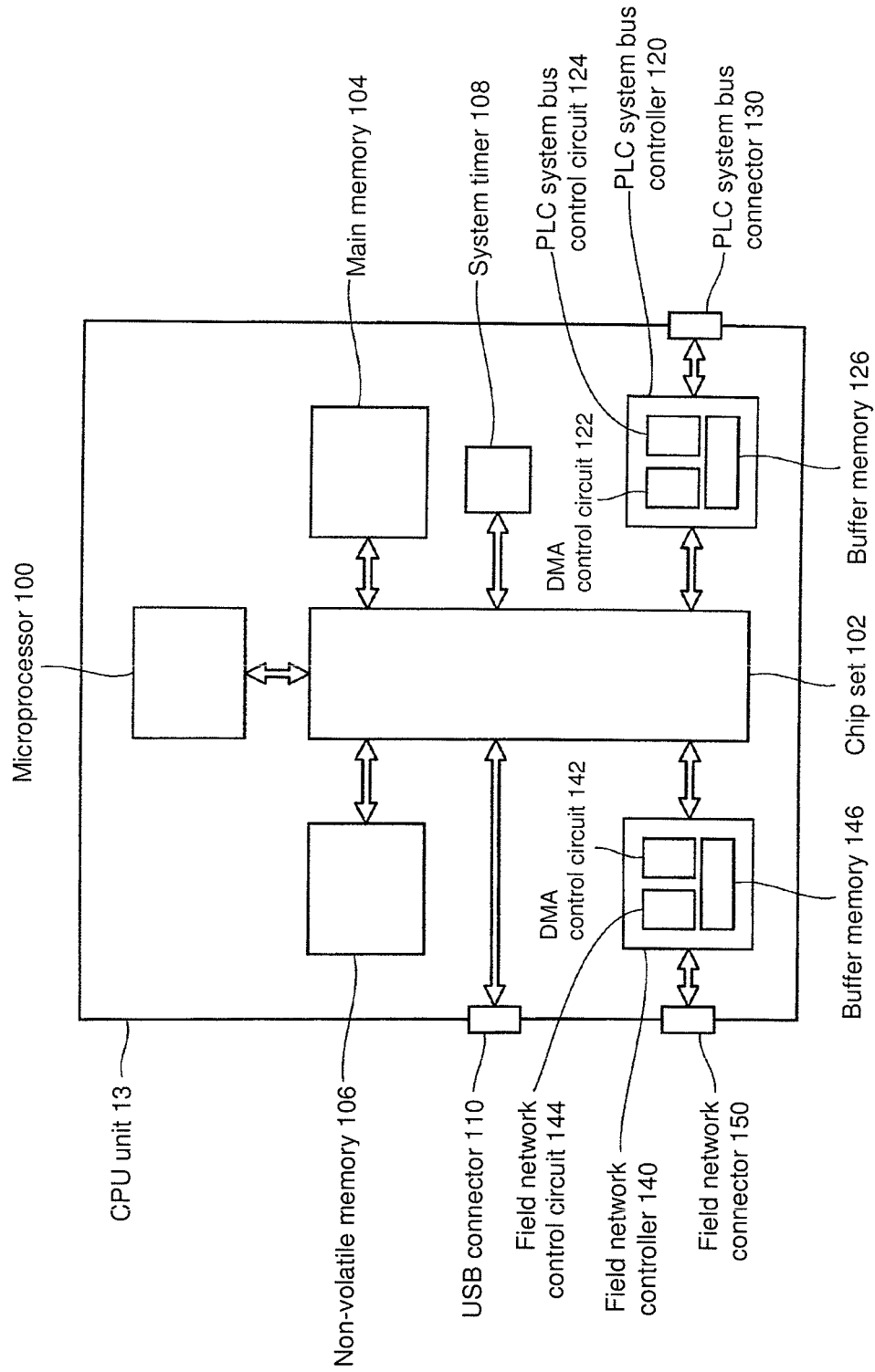
FIG. 2 is a schematic view illustrating a hardware configuration of a CPU unit according to the embodiments of the present invention.

Next, with reference to FIG. 2, a description is given of a hardware configuration of the CPU unit 13. FIG. 2 is a schematic view illustrating a hardware configuration of the CPU unit 13 according to embodiments of the present invention. With reference to FIG. 2, the CPU unit 13 includes a microprocessor 100, a chip set 102, a main memory 104, a non-volatile memory 106, a system timer 108, a PLC system bus controller 120, a field network controller 140, and a USB connector 110. Connections between the chip set 102 and other components are each made by various types of bus.

The microprocessor 100 and the chip set 102, typically, are configured according to a general-purpose computer architecture. In other words, the microprocessor 100 interprets and executes an instruction code serially supplied from the chip set 102 according to an internal clock. The chip set 102 exchanges internal data with various connected components and also generates the required instruction code for the microprocessor 100. Moreover, the chip set 102 includes a function caching data and the like obtained as a result of executing a calculation process in the microprocessor 100.

In Embodiments 1 to 7 to be described in the following, the microprocessor 100 is assumed to be single core when it is not explicitly specified that the microprocessor 100 is multicore. Multicore means that a number of cores is two or more (including a case where the number of cores is two).

The CPU unit 13 includes the main memory 104 and the non-volatile memory 106 as memory means.

The main memory 104 is a volatile storage area (RAM) and holds various programs to be executed by the microprocessor 100 after power is supplied to the CPU unit 13. In addition, the main memory 104 is used as a task memory during execution of various programs by the microprocessor 100. A device such as a DRAM (Dynamic Random Access Memory) or SRAM (Static Random Access Memory) is used as the main memory 104 of this kind.

Meanwhile, the non-volatile memory 106 holds, in a non-volatile manner, data such as a real-time OS (Operating System), PLC 1 system program, a user program, a motion calculation program, and system setting parameters. These programs and data are copied to the main memory 104 as needed to enable the microprocessor 100 to access them. A semiconductor memory, such as a flash memory, can be used as the non-volatile memory 106 of this kind. Alternatively, a magnetic recording medium such as a hard disk drive or an optical recording medium such as a DVD-RAM (Digital Versatile Disk Random Access Memory) or the like can be used.

The system timer 108 generates an interrupt signal in each constant period and provides the interrupt signal to the microprocessor 100. Typical configurations generate the interrupt signals on a plurality of different cycles according to hardware specifications. However, the interrupt signal can also be set to generate on a desired cycle according to an OS (Operating System), BIOS (Basic Input Output System), or the like. Using the interrupt signal generated by the system timer 108, a control operation is achieved for each control cycle (described below).

The CPU unit 13 includes the PLC system bus controller 120 and the field network controller 140 as communication circuits. These communication circuits transmit output data and receive input data.

Moreover, in the case where the CPU unit 13 is allocated the functions of the I/O unit 14 and the servo motor driver 3, transmission of output data and reception of input data by the communication circuit treat the component serving those functions as a recipient of the communication, and so transmission and reception are performed within the CPU unit 13.

The PLC system bus controller 120 controls the exchange of data via the PLC system bus 11. More specifically, the PLC system bus controller 120 includes a DMA (Dynamic Memory Access) control circuit 122, a PLC system bus control circuit 124, and a buffer memory 126. Moreover, the PLC system bus controller 120 is internally connected to the PLC system bus 11 via a PLC system bus connector 130.

The buffer memory 126 acts as a transmission buffer of data output to another unit via the PLC system bus 11 (hereafter referred to as "output data") and as a reception buffer of data input from another unit via the PLC system bus 11 (hereafter referred to as "input data"). Moreover, the output data generated according to the calculation process by the microprocessor 100 is primitively stored in the main memory 104. Further, the output data, which is to be transferred to a specific unit, is retrieved from the main memory 104 and initially held in the buffer memory 126. The input data, which is transferred from the other unit, is moved to the main memory 104 after being initially held in the buffer memory 126.

The DMA control circuit 122 performs transfer of the output data from the main memory 104 to the buffer memory 126 and transfer of the input data from the buffer memory 126 to the main memory 104.

The PLC system bus control circuit 124 performs, between the other unit connected to the PLC system bus 11, a process transmitting the output data of the buffer memory 126 and a process receiving the input data and storing the input data in the buffer memory 126. Typically, the PLC system bus control circuit 124 provides a function of a physical layer and a data link layer in the PLC system bus 11.

The field network controller controls the exchange of data via the field network 2. In other words, the field network controller 140 controls the transmission of the output data and the reception of the input data according to specifications of the field network 2 being used. As noted above, in the present embodiments, the field network 2 following the EtherCAT® standard is used. Therefore, the field network controller 140 is used that includes hardware for performing ordinary Ethernet® communication. In the EtherCAT® standard, a universal Ethernet® controller can be used in which a communication protocol obeying the ordinary Ethernet® standard is attained. However, depending on what kind of industrial Ethernet® is used as the field network 2, an Ethernet® controller is used which has particular specifications corresponding to a communication protocol having an exclusive-use specification different from the ordinary communication protocol. In addition, when a field network other than an industrial Ethernet® is used, an exclusive-use field network controller corresponding to the specification is used.

A buffer memory 146 acts as a transmission buffer of data output to another device via the field network 2 (hereafter referred to as "output data") and as a reception buffer of data input from another device via the field network 2 (hereafter referred to as "input data"). As described above, the output data generated according to the calculation process by the microprocessor 100 is primitively stored in the main memory 104. Further, the output data, which is to be transferred to a specific device, is retrieved from the main memory 104 and initially held in the buffer memory 146. The input data, which is transferred from the other device, is moved to the main memory 104 after being initially held in the buffer memory 146.

A DMA control circuit 142 performs transfer of the output data from the main memory 104 to the buffer memory 146 and transfer of the input data from the buffer memory 146 to the main memory 104.

A field network control circuit 144 performs, between the other device connected to the field network 2, a process transmitting the output data of the buffer memory 146 and a process receiving the input data and storing the input data in the buffer memory 146. Typically, the field network communication control circuit 144 provides a function of a physical layer and a data link layer in the field network 2.

The USB connector 110 is an interface for connecting the PLC support device 8 and the CPU unit 13. Typically, programs and the like transferred from the PLC support device 8 and executable by the microprocessor 100 of the CPU unit 13 are taken into the PLC 1 via the USB connector 110.

<C. Software Configuration of CPU Unit>

Figure 3:
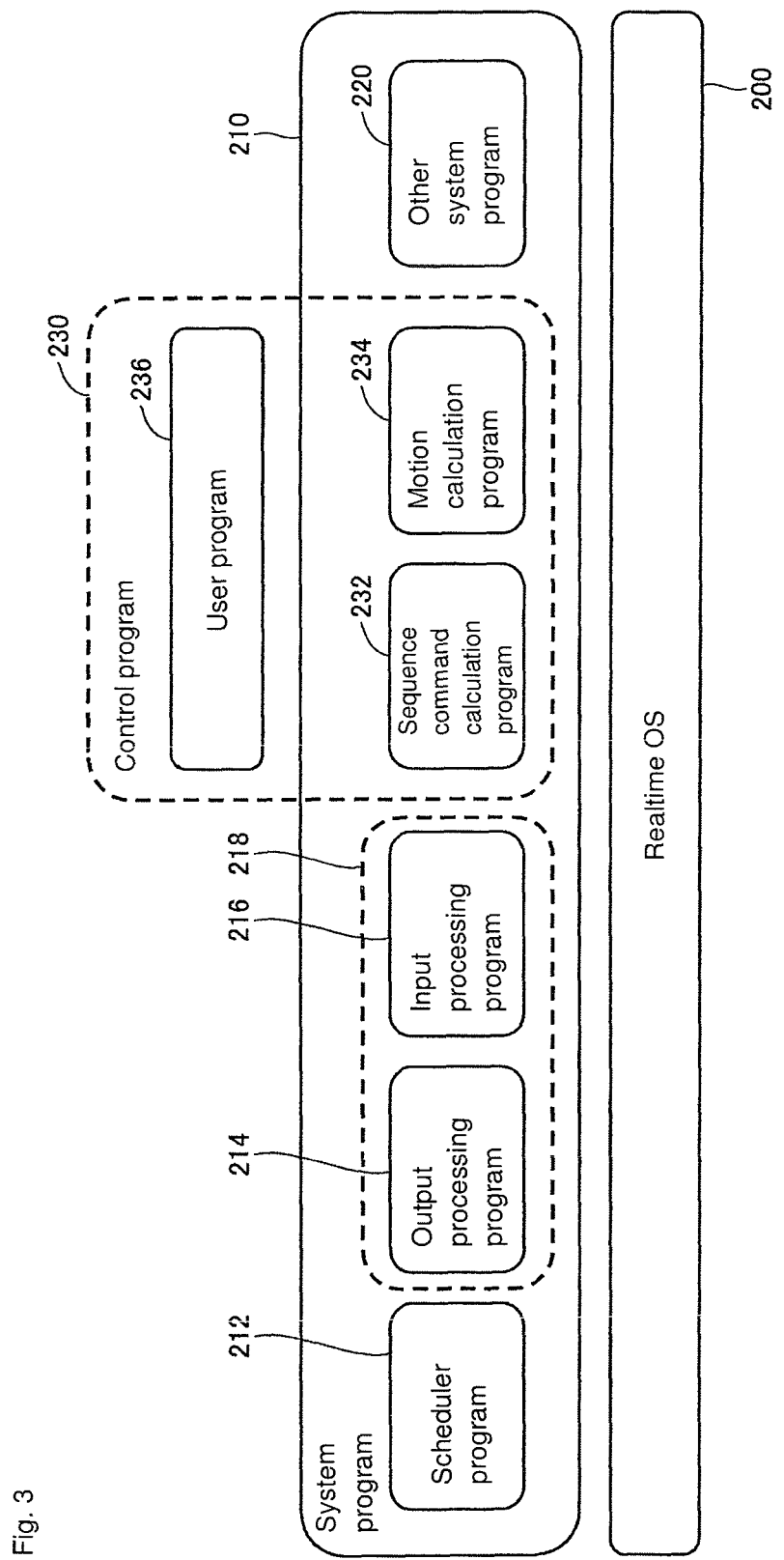
FIG. 3 is a schematic view illustrating a software configuration executed by the CPU unit according to the embodiments of the present invention.

Next, with reference to FIG. 3, a description is given of a software suite for providing various functions according to the present embodiments. A command included in the software is retrieved at an appropriate time and is executed by the microprocessor 100 of the CPU unit 13.

FIG. 3 is a schematic view illustrating a software configuration executed by the CPU unit 13 according to embodiments of the present invention. With reference to FIG. 3, the software executed by the CPU unit 13 has three layers: a real-time OS 200, a system program 210, and a user program 236.

The real-time OS 200 is designed according to the computer architecture of the CPU unit 13 and provides a basic executable environment for the microprocessor 100 to execute the system program 210 and the user program 236. The real-time OS is typically provided by the PLC manufacturer, a dedicated software company, or the like.

The system program 210 is a software suite for providing functions of the PLC 1. Specifically, the system program 210 includes a scheduler program 212, an output processing program 214, an input processing program 216, a sequence command calculation program 232, a motion calculation program 234, and other system programs 220. Moreover, in general, the output processing program 214 and the input processing program 216 are executed consecutively (as a unit), and thus these programs may be collectively referred to as an I/O processing program 218.

The user program 236 is generated according to a control objective of a user. In other words, the user program 236 is a program designed as desired in response to a line (process) or the like to be controlled using the PLC system SYS.

As noted below, the user program 236 works together with the sequence command calculation program 232 and the motion calculation program 234 to achieve the control objective of the user. In other words, the user program 236 utilizes a command, mathematical function, functional module, or the like provided by the sequence command calculation program 232 and the motion calculation program 234 in order to achieve a programmed operation. Therefore, the user program 236, sequence command calculation program 232, and motion calculation program 234 may be collectively referred to as a control program 230.

In this way, the microprocessor 100 of the CPU unit 13 executes the system program 210 and the user program 236 stored in the memory means.

Hereafter, each program is described in detail. As noted above, the user program 236 is generated according to the control objective of the user (e.g., a line or process to be controlled). Typically, the user program 236 is in an object program format that can be executed by the microprocessor 100 of the CPU unit 13. The user program 236 is generated in the PLC support device 8 or the like by compiling a source program written in a ladder language or the like. In addition, the generated user program 236 in the object program format is transferred from the PLC support device 8 to the CPU unit 13 via the connection cable 10, and is then stored in the non-volatile memory 106 or the like.

The scheduler program 212 controls process initiation in each execution cycle and process restart after the process is interrupted for the output processing program 214, the input processing program 216, and the control program 230. More specifically, the scheduler program 212 controls execution of the user program 236 and the motion calculation program 234.

In the CPU unit 13 according to the present embodiments, the constant-period execution cycle (control cycle) suitable for the motion calculation program 234 is used as a shared cycle of an entire process. Therefore, because all processes are unlikely to be completed within one control cycle, the processes to be executed are sorted according to a degree of priority into processes for which execution must be completed in each control cycle and processes which may be executed over a plurality of control cycles. The scheduler program 212 administrates an execution sequence and the like of the sorted processes. More specifically, the higher the degree of priority given the program, the sooner the scheduler program 212 executes the program within each control cycle duration.

The output processing program 214 reallocates the output data generated by execution of the user program 236 (the control program 230) in a format appropriate for transfer to the PLC system bus controller 120 and/or the field network controller 140. When the PLC system bus controller 120 or the field network controller 140 require an instruction from the microprocessor 100 for executing a transmission, the output processing program 214 issues the instruction.

The input processing program 216 reallocates the input data received by the PLC system bus controller 120 and/or the field network controller 140 in a format appropriate for use by the control program 230.

The sequence command calculation program 232 is a program called up when a given sequence command used by the user program 236 is executed. The sequence command calculation program 232 is executed to attain the content of the command.

The motion calculation program 234 is a program executed according to an instruction by the user program 236 and calculates an instruction value output to a motor driver such as the servo motor driver 3 or the pulse motor driver each time the program is executed.

The other system programs 220 collectively refer to a suite of programs for achieving various functions of the PLC 1 other than those of the programs individually depicted in FIG. 3.

The real-time OS 200 provides an environment for switching between and executing the plurality of programs according to passage of time. In the PLC 1 according to the present embodiments, the output data generated by execution of the programs of the CPU unit 13 is treated as an event (interrupt) for output (transmission) to another unit or another device, and the interrupt of the control cycle initiation is given as a default setting. When the interrupt of the control cycle initiation is generated, the real-time OS 200 switches an execution target in the microprocessor 100 from the program being executed at the time the interrupt is generated to the scheduler program 212. Moreover, when the scheduler program 212 and the program whose execution is controlled by the scheduler program 212 are never executed, the real-time OS 200 executes a program included in another system program 210. Such a program includes, for example, a program related to communication processing via the connection cable 10 (USB) between the CPU unit 13 and the PLC support device 8.

Moreover, the control program 230 and the scheduler program 212 are stored in the main memory 104 and the non-volatile memory 106, which are memory means.

<D. Main Memory Configuration>

Figure 4:
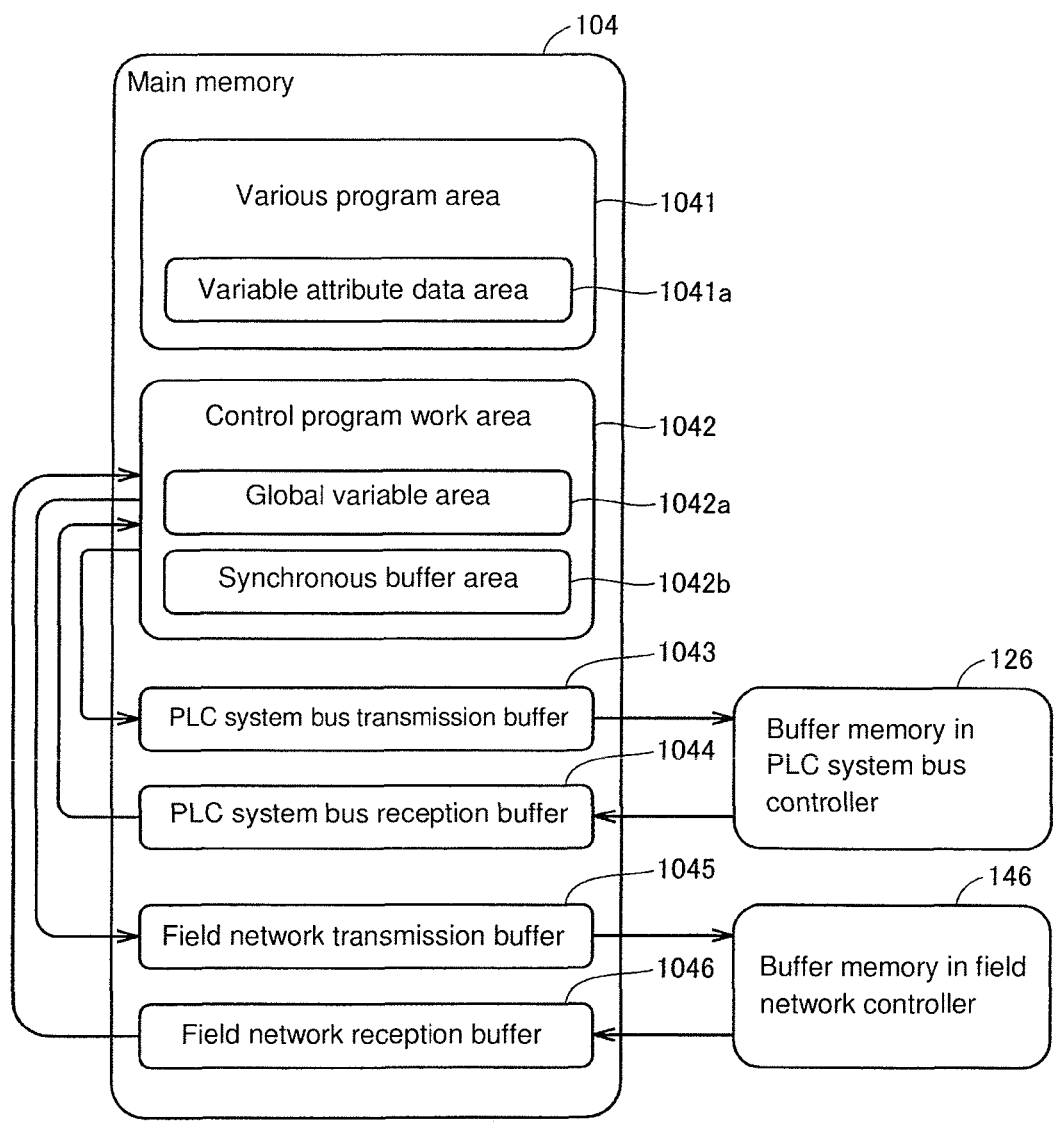
FIG. 4 is a schematic view illustrating a configuration of the main memory area of the CPU unit according to the embodiments of the present invention.

Next, with reference to FIG. 4, a description is given of a storage area configured by the main memory 104 of the CPU unit 13.

FIG. 4 is a schematic view illustrating a configuration of the main memory 104 area of the CPU unit 13 according to embodiments of the present invention. With reference to FIG. 4, the main memory 104 forms a various programs area 1041, a control program work area 1042, a PLC system transmission buffer 1043, a PLC system bus reception buffer 1044, a field network transmission buffer 1045, and field network reception buffer 1046.

In addition to an area storing programs themselves, the various program area 1041 also includes an area 1041a storing attribute data of a variable that is used by a program during execution. The attribute data can include, in a case where the variable is a global variable that is referenced by a plurality of control programs, information specifying one owner-side control program that can rewrite the variable and information specifying one or a plurality of referrer-side control programs that can only reference the variable.

In the control program work area 1042, in addition to a local variable area for each control program 230, a global variable area 1042a and a synchronous buffer area 1042b are generated by the system program 210. In the control program work area 1042, output data that is generated by executing the control program 230 and input data that is referenced by a control program are stored.

The PLC system bus transmission buffer 1043 and the PLC system bus reception buffer 1044 temporarily store data transmitted and received, respectively, through the PLC system bus 11. Similarly, the field network transmission buffer 1045 and the field network reception buffer 1046 temporarily store data transmitted and received, respectively, through the field network 2.

More specifically, when any output data are to be transmitted through the PLC system bus 11, the output processing program 214 copies the output data to be transmitted from the control program work area 1042 to the PLC system bus transmission buffer 1043. In this process, the output processing program 214 reallocates the output data such that an output data group intended for the same unit is grouped in the PLC system bus transmission buffer 1043 so that a plurality of output data transmitted to the same unit can be transmitted together.

Similarly, when any output data are to be transmitted through the field network 2, the output processing program 214 copies the output data to be transmitted from the control program work area 1042 to the field network transmission buffer 1045. In this process, the output processing program 214 reallocates the output data in a format for serial frame transmission in the field network transmission buffer 1045.

The input processing program 216 copies to the control program work area 1042 the input data received by the PLC system bus controller 120 and stored in the PLC system bus reception buffer 1044 and/or the input data received by the field network controller 140 and stored in the field network reception buffer 1046. In this process, the input processing program 216 reallocates the input data in a format suitable for use by the control program 230 in the control program work area 1042.

The DMA control circuit 122 of the PLC system bus controller 120 transfers the output data stored in the PLC system bus transmission buffer 1043 to the buffer memory 146 of the PLC system bus controller 120, and transfers the input data stored in the buffer memory 146 to the PLC system bus reception buffer 1044.

The DMA control circuit 142 of the field network controller 140 transfers the output data stored in the field network transmission buffer 1045 to the buffer memory 146 of the field network controller 140, and transfers the input data stored in the buffer memory 146 to the field network reception buffer 1046.

The control program work area 1042, the PLC system bus transmission buffer 1043, the PLC system bus reception buffer 1044, the field network transmission buffer 1045, and the field network reception buffer 1046 are configured to control access to one another independently. Thus, a plurality of operations (1) to (3) described below, for example, can be executed in parallel.

(1) Access to the control program work area 1042 by the microprocessor 100 in association with execution of the user program 236.

(2) Access to the PLC system bus transmission buffer 1043 and/or the PLC system bus reception buffer 1044 in the main memory 104 by the DMA control circuit 122 of the PLC system bus controller 120 for data transfer between the PLC system bus transmission buffer 1043 and/or the PLC system bus reception buffer 1044 in the main memory 104 and the buffer memory 126 in the PLC system bus controller 120.

(3) Access to the field network transmission buffer 1045 and/or the field network reception buffer 1046 in the main memory 104 by the DMA control circuit 142 of the field network controller 140 for data transfer between the field network transmission buffer 1045 and/or the field network reception buffer 1046 in the main memory 104 and the buffer memory 146 in the field network controller 140.

<E. Operation of Overall Process of System Program>

Next, a description is given of an operation of an overall process of the system program 210.

In an execution stage of the system program 210, an execution preparation process of the control program 230 and an execution control process of the control program 230 are sequentially executed. More specifically, the system program 210 includes the following processes (1) and (2) as an execution preparation process of the control program 230.

(1) A process in which a global variable area storing a global variable is generated in the memory means.

(2) A process in which, with respect to each referrer-side control program and for each global variable that is referenced from the referrer-side control program, a synchronous buffer is generated in the memory means as a reference destination in place of the global variable area when the referrer-side control program references the global variable. Further, the execution preparation process of the control program 230 can include other execution preparation processes according to a specific implementation.

Further, the system program 210 includes the following processes (3)-(5) as an execution control process of the control program 230.

(3) An owner-side start process that starts execution of an owner-side control program.

(4) A copy process in which, when execution of an owner-side control program ends, a global variable that is rewritten by the owner-side control program is copied from the global variable area to a synchronous buffer corresponding to the global variable.

(5) A referrer-side start process that starts an execution of a referrer-side control program.

Further, the execution control process of the control program 230 can include other execution control processes according to a specific implementation.

Figure 5:
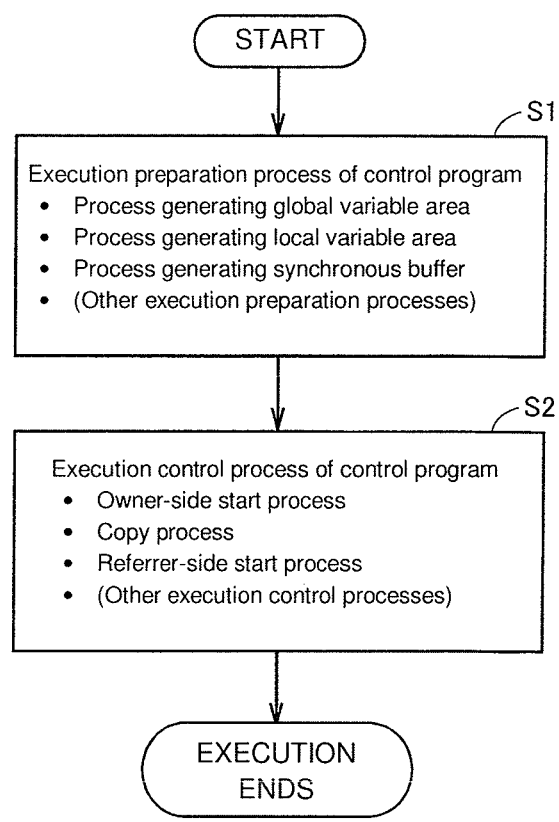
FIG. 5 is a flow chart illustrating an overall process of a system program in the CPU unit according to the embodiments of the present invention.

FIG. 5 is a flow chart illustrating an overall process of a system program in a CPU unit according to embodiments of the present invention. As illustrated in FIG. 5, first, the execution preparation process of the control program 230 is executed (step S1), and then, the execution control process of the control program 230 is executed (step S2). Execution sequence of the processes included in the execution preparation process (step S1) of the control program 230 can be suitably designed. Similarly, the processes included in the execution control process (step S2) of the control program 230 are repeatedly executed along with repeated execution of the control program 230 and the execution sequence of the processes depends on a specific implementation.

In the following, a description is given of Embodiments 1 to 7 as typical examples of a specific implementation.

<F. Single Synchronous Buffer Method (Embodiment 1)>
(f1: Overview)

In Embodiment 1, a case is assumed where a plurality of control programs are time-divisionally executed. In this case, there exists a global variable that is referenced by a plurality of control programs. One owner-side control program is set that can rewrite the global variable, and one or a plurality of referrer-side control programs are set that can only reference the global variable. In the following, a control program that is set as an owner-side control program is referred to as an "owner of the global variable" or simply an "owner." In the following, an example is given of a case where, separate from a relation between lengths of execution cycles, one of the control programs is specified as an owner of a global variable.

(f2: Control Program Having a Higher Degree of Execution Priority and a Shorter Execution Cycle is an Owner of a Global Variable)

In an example described below, a state is assumed in which a plurality of control programs (control programs 1-3) having different degrees of execution priority and different execution cycles are executed. In this case, it is assumed that the degree of execution priority of the control program is higher as compared to the other control programs 2 and 3 and that the execution cycle of the control program 1 is shorter as compared to the other control programs 2 and 3. In this case, the control program 1 having a shorter execution cycle is set as an owner (owner-side control program) of a global variable and the control programs 2 and 3 are set as referrers (referrer-side control programs) of the global variable.

Figure 6:
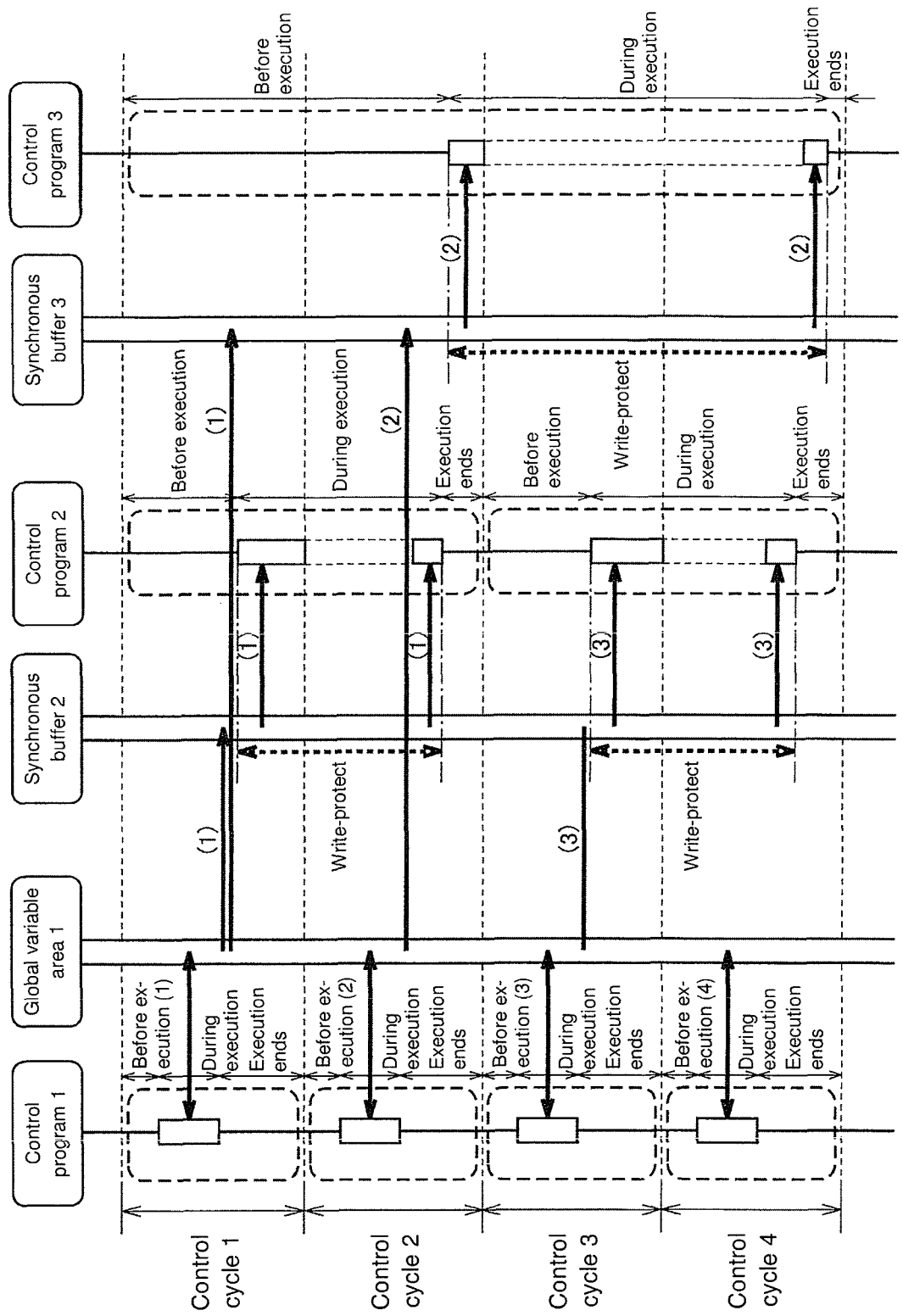
FIG. 6 is a sequence diagram illustrating an execution operation according to Embodiment 1.
Figure 7:
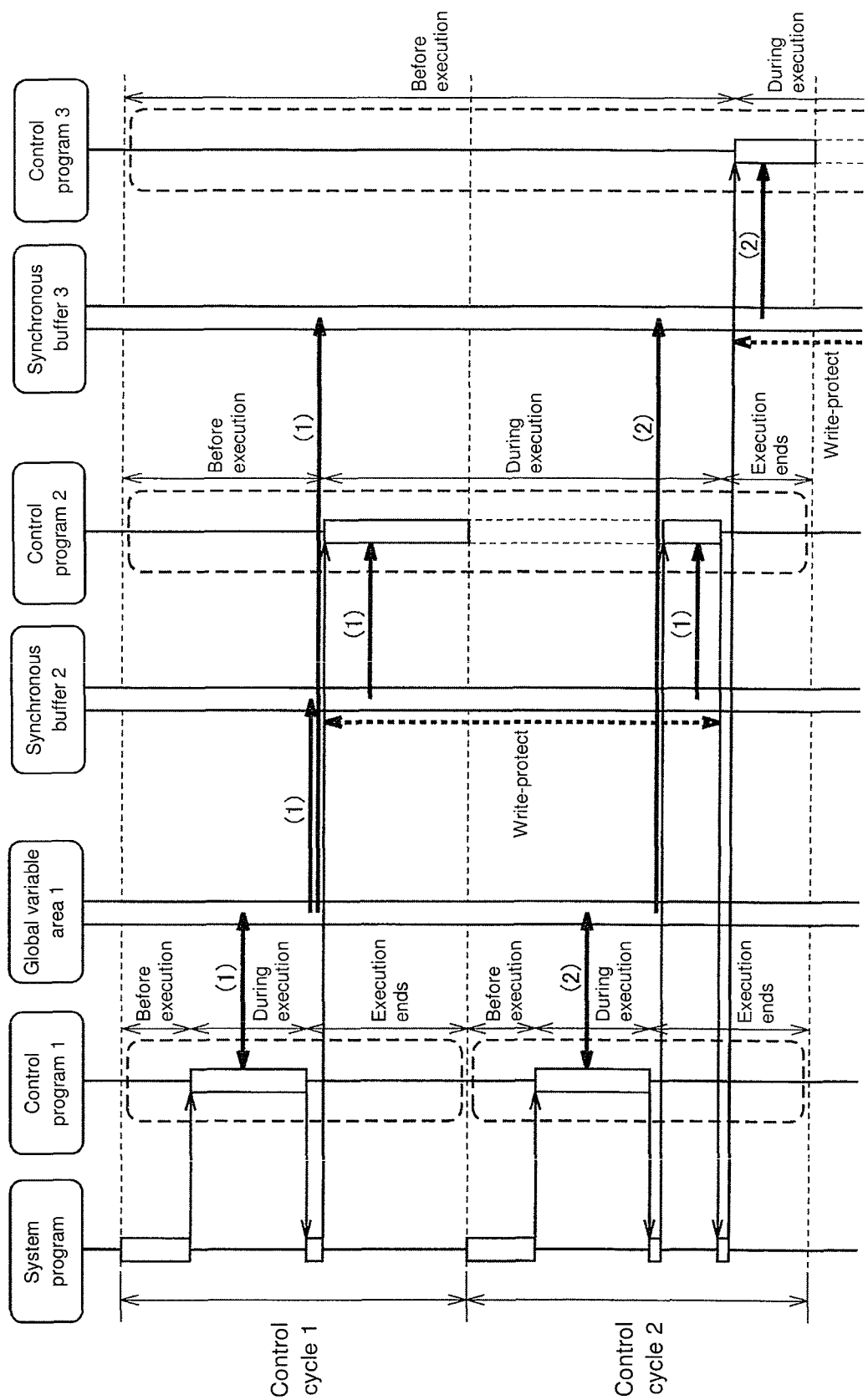
FIG. 7 is a sequence diagram illustrating on an enlarged scale control cycles 1 and 2 that are illustrated in FIG. 6.
Figure 8:
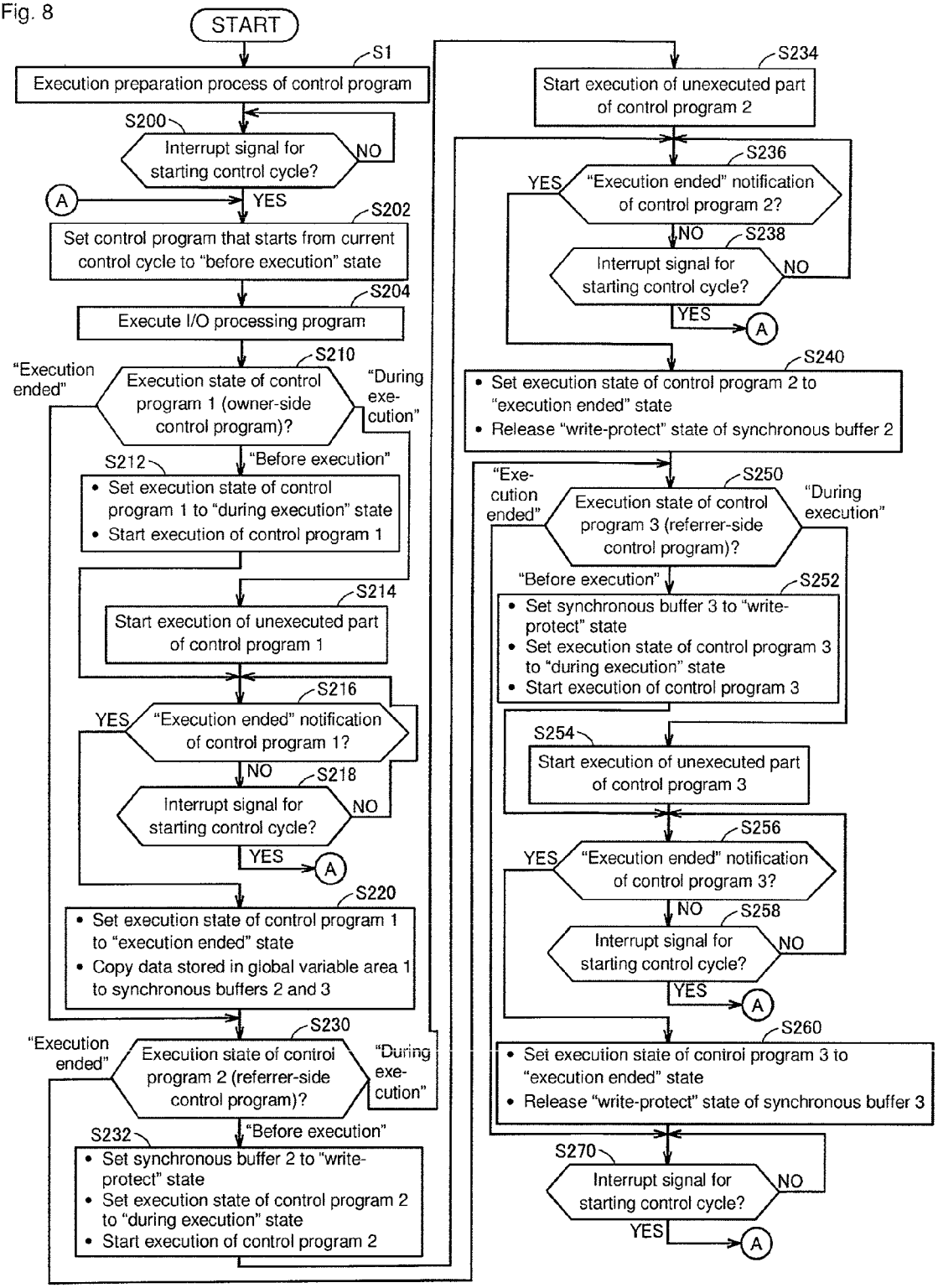
FIG. 8 is a flow chart illustrating an execution operation according to Embodiment 1.

FIG. 6 is a sequence diagram illustrating an execution operation according to Embodiment 1. With reference to FIG. 6, it is assumed that the control programs 1-3 are executed. FIG. 7 is a sequence diagram illustrating on an enlarged scale control cycles 1 and 2 that are illustrated in FIG. 6. FIG. 8 is a flow chart illustrating an execution operation according to Embodiment 1.

A rectangle with rounded corners of a dashed line along a time axis of each of the control programs 1-3 in FIG. 6 indicates an execution cycle of the corresponding control program. For example, the control program 1 has one control cycle as an execution cycle and, similarly, the control programs 2 and 3 respectively have two and four control cycles as an execution cycle. In the following, in sequence diagrams that are used for description, execution cycles are similarly indicated.

Further, an arrow of a solid line in a lateral direction in FIG. 6 indicates exchange of data and a number that is indicated in association with each arrow indicates of which control cycle a state is reflected by the corresponding data. For example, an arrow that is indicated with (1) indicates that data generated by execution of a control program in a control cycle 1 is exchanged. In the following, in sequence diagrams that are used for description, execution cycles are similarly indicated.

In the example illustrated in FIG. 6, the control program 1 is the owner of a global variable. Therefore, the control program 1 writes its execution result and the like to a global variable area 1 in the global variable area 1042*a*. On the other hand, the control programs 2 and 3 that are set as referrer-side control programs execute processes by referencing data stored in corresponding synchronous buffers 2 and 3, respectively, in the synchronous buffer area 1042*b*. Execution results and the like may also be respectively written to the corresponding synchronous buffers 2 and 3. Further, synchronization between data in the synchronous buffers 2 and 3 and in the global variable area 1 is maintained according to steps to be described later.

In FIG. 6, along the time axis of each of the control programs 1-3, an execution state of the control program is indicated. More specifically, within an execution cycle in which a predetermined process is to be executed, an execution state is monitored that can be one of a "before execution" state in which a process is not yet started, a "during execution" state in which the process is being executed in an execution cycle, and an "execution ended" state in which the process has ended in the execution cycle.

Such execution state can be indicated by recording the execution state of each control program in an execution state recording area. The execution state recording area is generated in the control program work area 1042 in the main memory 104 by the system program 210 in the "execution preparation process of a control program" (step S1 illustrated in FIG. 5). A mode of the recording of the execution state can be suitably determined. For example, modes can be adopted such as that in which, for each execution state, information (such as a name or an identification number of a control program) that identifies a control program in the execution state is recorded, and that in which, for each control program, a flag or a state variable that represents an execution state is provided and a value of the flag or state variable is recorded. An execution state flag can be used in a manner such that in which, when a "before execution flag" is ON, the execution state is the "before execution" state; when a "during execution flag" is ON, the execution state is the "during execution" state; and so on. An execution state variable can be set in a manner such as that in which, when a value of the state variable is "1", the execution state is "before execution"; when the value is "2", the execution state is "during execution"; and so on. The same applies to management of an execution state of a control program in other embodiments to be described in the following.

In FIG. 7, the execution operation in the control cycles 1 and 2 of the sequence diagram illustrated in FIG. 6 is illustrated on an enlarged scale. In FIG. 7, in order to describe in more detail the execution operation in the CPU unit 13, the system program 210 is also illustrated. The system program 210 mainly indicates a period of time during which the scheduler program 212, the output processing program 214 and the input processing program 216 operate. The output processing program 214 and the input processing program 216 are executed during a beginning portion (before the start of the execution of the control program 1 in FIG. 7) of time in each control cycle during the execution control performed by the scheduler program 212. In other embodiments to be described in the following, as can be understood from the example of FIG. 7, a period of time also exists during which the system program 210 operates: however, this period of time is not illustrated in the drawing in view of simplifying the description. Each control cycle in FIGS. 6 and 7 is started when an interrupt signal for starting a control cycle that is generated by the system timer 108 is input to the microprocessor 100. When there is an interrupt for starting a control cycle, in a case where there is a control program under execution, the realtime OS 200 interrupts the execution of the control program and causes the system program 210 (the scheduler program 212) to be executed by the microprocessor 100.

With reference to FIG. 8, the microprocessor 100 executes the execution preparation process of the control program 230 in the system program 210 (step S1). Next, the microprocessor 100 executes the execution control process of the control program 230 in the system program 210 (step S2 illustrated in FIG. 5). A detailed example of the execution control process of the control program 230 corresponds to steps S200-S270.

First, the microprocessor 100 waits for an interrupt signal for starting a control cycle (step S200). When an interrupt signal for starting a control cycle is received (YES in step S200), the microprocessor 100 sets a control program that starts from the current control cycle to the "before execution" state. That is, when an execution cycle of the control program 1 starts from the current control cycle, the control program 1 is set to the "before execution" state. Similarly, when an execution cycle of the control program 2 starts from the current control cycle, the control program 2 is set to the "before execution" state. When an execution cycle of the control program 3 starts from the current control cycle, the control program 3 is set to the "before execution" state (step S202). Next, the microprocessor 100 executes the I/O processing program 218 (the output processing program 214 and the input processing program 216) in the system program 210 (step S204).

Thereafter, the microprocessor 100 determines the execution state of the control program 1 (owner-side control program) (step S210). When the control program 1 (owner-side control program) is in the "before execution" state ("before execution" in step S210), the microprocessor 100 sets the execution state of the control program 1 to the "during execution" state and starts execution of the control program 1 (step S212).

When the control program 1 (owner-side control program) is in the "during execution" state ("during execution" in step S210), the microprocessor 100 starts execution of an unexecuted part of the control program 1 (step S214).

When the control program 1 (owner-side control program) is in the "execution ended" state ("execution ended" in step S210), the process proceeds to step S230.

In step S212 or step S214, after the execution of the control program 1 is started, the microprocessor 100 determines whether an "execution ended" notification of the control program 1 is received (step S216).

When an "execution ended" notification of the control program 1 is not received (NO in step S216), the microprocessor 100 determines whether an interrupt signal for starting a control cycle is received (step S218). When an interrupt signal for starting a control cycle is received (YES in step S218), the processing of step S202 and thereafter is repeated. That is, when an interrupt for starting a control cycle is generated before an "execution ended" notification of the control program 1 is received, the execution of the control program 1 is temporarily interrupted and in the next control cycle, after the execution of the I/O processing program, the unexecuted part of the control program 1 is executed. However, FIGS. 6 and 7 illustrate a case where the execution cycle of the control program 1 is equal to the control cycle and the control program 1 is programmed to contain only a processing load that ends within the control cycle. When the execution of the control program 1 does not end within the control cycle, the execution cycle of the control program 1 is extended. That is, the execution of the control program 1 is interrupted and in the next control cycle the unexecuted part of the control program 1 is executed. Or, at the stage when the execution of the control program 1 does not end within the control cycle (execution cycle), it is also possible to determine that an error occurs and perform error handling. For the control programs 2 and 3 in FIGS. 6 and 7 and also for other embodiments, when a control program does not end within an execution cycle, extension of the execution cycle or error handling is similarly performed. On the other hand, when an interrupt signal for starting a control cycle is not received (NO in step S218), the processing of step S216 and thereafter is repeated. The processing of the interrupt signal for starting a control cycle is so expressed for convenience on the flow chart of the system program 210. However, in an actual implementation, the microprocessor 100 does not execute a loop of steps S216 and S218 and, from the start to end of the execution of the control program 1, does not execute the system program 210. When there is an interrupt for starting a control cycle before the execution of the control program 1 ends, the realtime OS 200 interrupts the execution of the control program 1 and causes the system program 210 to execute from step S202. The same applies to processing of an interrupt signal for starting a control cycle (steps S236 and S238 and steps S256 and S258) related to the control programs 2 and 3 in the present flow chart and processing of an interrupt signal for starting a control cycle in other flow charts.

On the other hand, when an "execution ended" notification of the control program 1 is received (YES in step S216), the microprocessor 100 sets the execution state of the control program 1 to the "execution ended" state and copies data stored in the global variable area 1 to the synchronous buffer 2 and the synchronous buffer 3 (step S220). The operation of copying the data stored in the global variable area 1 to the synchronous buffer 2 and the synchronous buffer 3 is indicated by an arrow of a solid line in FIGS. 6 and 7.

However, the data stored in the global variable area 1 is not copied to a synchronous buffer that is in a "write-protect" state. The write-protect state will be described later.

After step S220, the microprocessor 100 determines the execution state of the control program 2 (referrer-side control program) (step S230). When the control program 2 (referrer-side control program) is in the "before execution" state ("before execution" in step S230), the microprocessor 100 sets the corresponding synchronous buffer 2 to the "write-protect" state and then sets the execution state of the control program 2 to the "during execution" state and starts execution of the control program 2 (step S232).

When the control program 2 (referrer-side control program) is in the "during execution" state ("during execution" in step S230), the microprocessor 100 starts execution of an unexecuted part of the control program 2 (step S234). In this case, the "write-protect" state of the corresponding synchronous buffer 2 is not released and is maintained.

When the control program 2 (referrer-side control program) is in the "execution ended" state ("execution ended" in step S230), the process proceeds to step S250.

In step S232 or step S234, after the execution of the control program 2 is started, the microprocessor 100 determines whether an "execution ended" notification of the control program 2 is received (step S236).

When an "execution ended" notification of the control program 2 is not received (NO in step S236), the microprocessor 100 determines whether an interrupt signal for starting a control cycle is received (step S238). When an interrupt signal for starting a control cycle is received (YES in step S238), the processing of step S202 and thereafter is repeated. On the other hand, when an interrupt signal for starting a control cycle is not received (NO in step S238), the processing of step S236 and thereafter is repeated.

On the other hand, when an "execution ended" notification of the control program 2 is received (YES in step S236), the microprocessor 100 sets the execution state of the control program 2 to the "execution ended" state and releases the "write-protect" state of the corresponding synchronous buffer 2 (step S240). A period of time of the "write-protect" state of the synchronous buffer 2 is indicated using an arrow of a dashed line in FIGS. 6 and 7.

After step S240, the microprocessor 100 determines the execution state of the control program 3 (referrer-side control program) (step S250). When the control program 3 (referrer-side control program) is in the "before execution" state ("before execution" in step S250), the microprocessor 100 sets the corresponding synchronous buffer 3 to the "write-protect" state and then sets the execution state of the control program 3 to the "during execution" state and starts execution of the control program 3 (step S252).

When the control program 3 (referrer-side control program) is in the "during execution" state ("during execution" in step S250), the microprocessor 100 starts execution of an unexecuted part of the control program 3 (step S254). In this case, the "write-protect" state of the corresponding synchronous buffer 3 is not released and is maintained.

When the control program 3 (referrer-side control program) is in the "execution ended" state ("execution ended" in step S250), the process proceeds to step S270.

In step S252 or step S254, after the execution of the control program 3 is started, the microprocessor 100 determines whether an "execution ended" notification of the control program 3 is received (step S256).

When an "execution ended" notification of the control program 3 is not received (NO in step S256), the microprocessor 100 determines whether an interrupt signal for starting a control cycle is received (step S258). When an interrupt signal for starting a control cycle is received (YES in step S258), the processing of step S202 and thereafter is repeated. On the other hand, when an interrupt signal for starting a control cycle is not received (NO in step S258), the processing of step S256 and thereafter is repeated.

On the other hand, when an "execution ended" notification of the control program 3 is received (YES in step S256), the microprocessor 100 sets the execution state of the control program 3 to the "execution ended" state and releases the "write-protect" state of the corresponding synchronous buffer 3 (step S260). A period of time of the "write-protect" state of the synchronous buffer 3 is indicated using an arrow of a dashed line in FIGS. 6 and 7.

After step S260, the process waits for an interrupt signal for starting a control cycle (step S270). When an interrupt signal for starting a control cycle is received (YES in step S270), the processing of step S202 and thereafter is again executed.

When there are a plurality of global variables that are common to an owner-side control program and a referrer-side control program, a process copying these global variables from a global variable area to a synchronous buffer of the referrer-side control program is collectively performed. Synchronous buffers are grouped in units for each of which the collective copying process is performed. A write-protect state of a synchronous buffer is set in common for synchronous buffers in the same group. That the state of a synchronous buffer is set in common for synchronous buffers in the same group similarly applies also to any one of a "write-protect" state, a "write destination" state, a "reference destination" state, a "standby" state and a "latest" state in other embodiments to be described in the following.

Further, the above-described write-protect state of a synchronous buffer is indicated by recording in a write-protect state recording area that the synchronous buffer is in the "write-protect" state. The write-protect state recording area is generated in the control program work area 1042 in the main memory 104 by the system program 210 in the "execution preparation process of a control program" (step S1 illustrated in FIG. 5). A mode of the recording of that a synchronous buffer is in the "write-protect" state can be suitably determined. For example, modes can be adopted such as that in which information (such as an identification number of a group of synchronous buffers) that identifies a group that is in the "write-protect" state among the groups of synchronous buffers that are grouped in units for each of which the collective copying process is performed, and that in which, for each of the groups of the synchronous buffers, a flag or state variable that indicates whether the group is in the "write-protect" state is provided and a value of the flag or state variable is recorded. The same applies to management of an execution state of a control program in other embodiments to be described in the following.

(f3: Control Program Having a Lower Degree of Execution Priority and a Longer Execution Cycle is an Owner of a Global Variable)

In an example described below, it is assumed that a control program 1 that is set as a referrer (referrer-side control program) of a global variable has a higher degree of execution priority and a shorter execution cycle and that a control program 2 that is set as an owner (owner-side control program) of the global variable has a lower degree of execution priority and a longer execution cycle.

Figure 9:
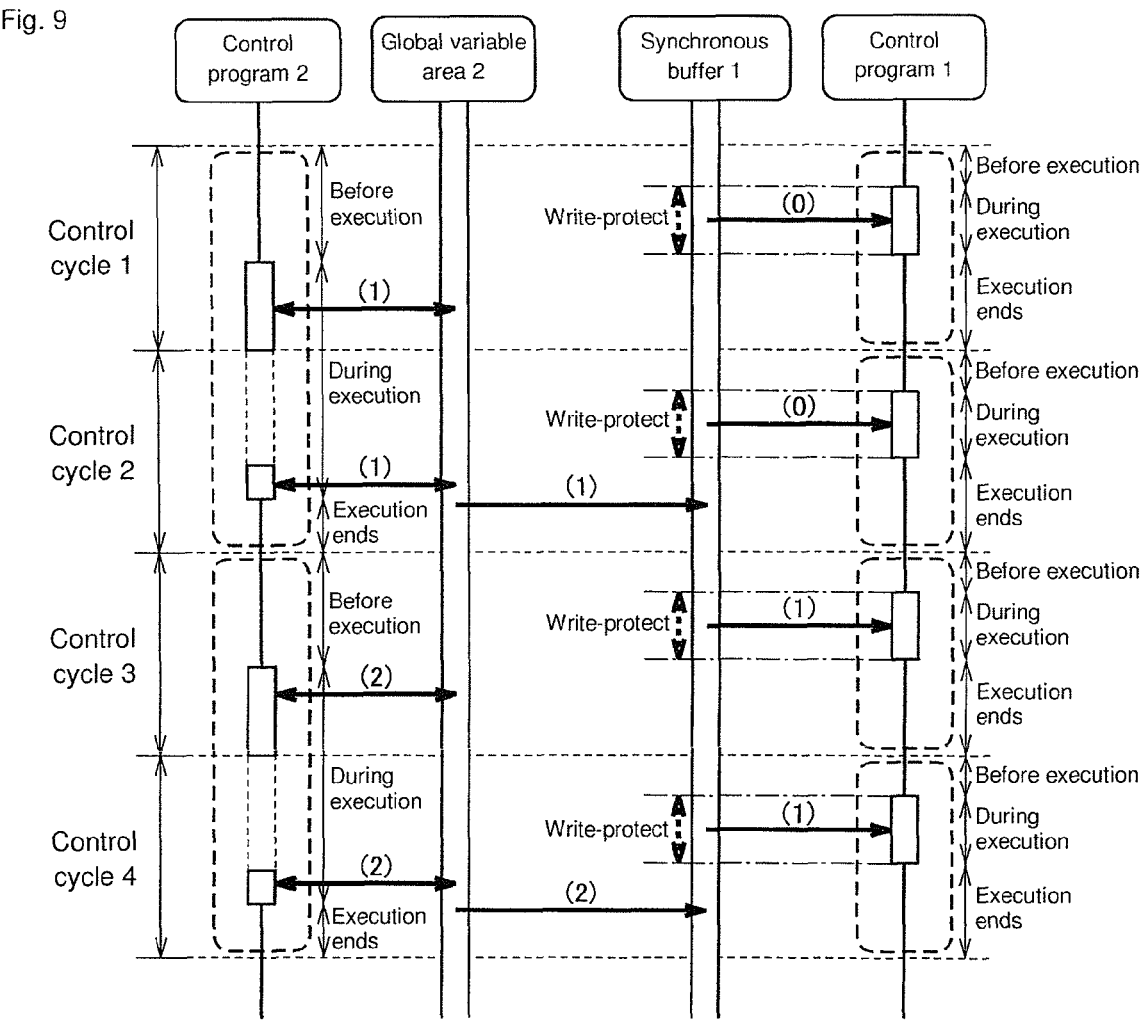
FIG. 9 is a sequence diagram illustrating another execution operation according to Embodiment 1.

FIG. 9 is a sequence diagram illustrating another execution operation according to Embodiment 1. In the example illustrated in FIG. 9, the control program 2 is the owner of the global variable. Therefore, the control program 2 writes its execution result and the like to a global variable area 2 in the global variable area 1042*a*. On the other hand, the control program 1 that is set as a referrer-side control program executes a process by referencing data stored in a synchronous buffer 1 in the synchronous buffer area 1042*b*. Execution result and the like may also be written to the corresponding synchronous buffer 1. On the other hand, it is assumed that the execution cycle of the control program 1 is shorter as compared to the control program 2. In the example illustrated in FIG. 9, the execution cycle of the control program 1 corresponds to one control cycle and the execution cycle of the control program 2 corresponds to two control cycles.

In this case, synchronization between the synchronous buffer 2 and the global variable area 1 is maintained according to steps described in the following.

Figure 10:
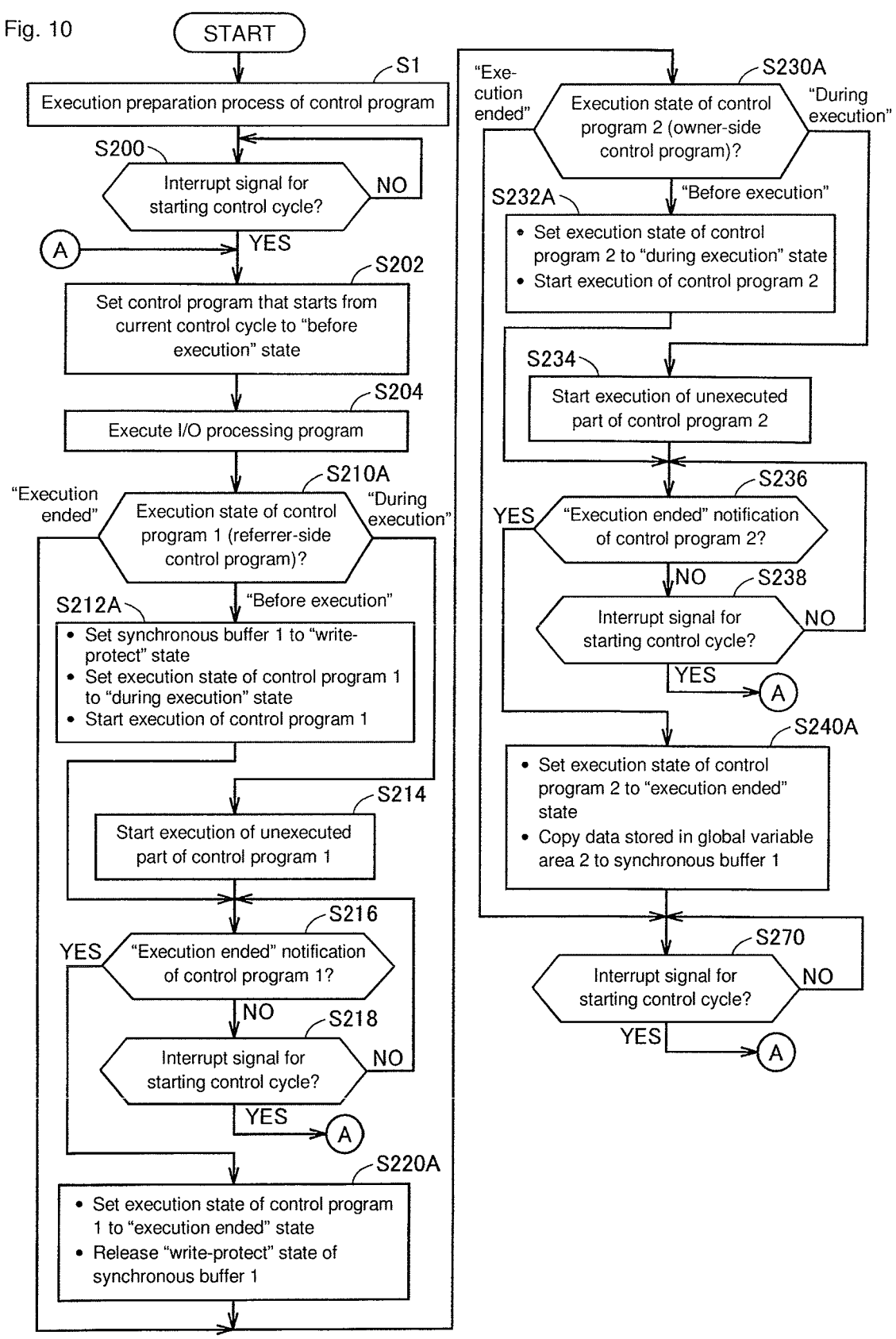
FIG. 10 is a flow chart illustrating another execution operation according to Embodiment 1.

FIG. 10 is a flow chart illustrating another execution operation according to Embodiment 1. In the flow chart of FIG. 10, a step that executes a same process as in the flow chart illustrated in FIG. 8 is given a same step number as in FIG. 8.

With reference to FIG. 10, the microprocessor 100 executes the execution preparation process of the control program 230 in the system program 210 (step S1). Next, the microprocessor 100 executes the execution control process of the control program 230 in the system program 210 (step S2 illustrated in FIG. 5).

More specifically, the microprocessor 100 waits for an interrupt signal for starting a control cycle (step S200). When an interrupt signal for starting a control cycle is received (YES in step S200), the microprocessor 100 sets a control program that starts from the current control cycle to the "before execution" state (step S202). Next, the microprocessor 100 executes the I/O processing program 218 (the output processing program 214 and the input processing program 216) in the system program 210 (step S204).

Thereafter, the microprocessor 100 determines the execution state of the control program 1 (referrer-side control program) (step S210A). When the control program 1 (referrer-side control program) is in the "before execution" state ("before execution" in step S210A), the microprocessor 100 sets the corresponding synchronous buffer 1 to the "write-protect" state and then sets the execution state of the control program 1 to the "during execution" state and starts execution of the control program 1 (step S212A).

When the control program 1 (referrer-side control program) is in the "during execution" state ("during execution" in step S210A), the microprocessor 100 starts execution of an unexecuted part of the control program 1 (step S214). In this case, the "write-protect" state of the corresponding synchronous buffer 1 is not released and is maintained.

When the control program 1 (referrer-side control program) is in the "execution ended" state ("execution ended" in step S210A), the process proceeds to step 230A.

In step S212A or step S214, after the execution of the control program 1 is started, the microprocessor 100 determines whether an "execution ended" notification of the control program 1 is received (step S216).

When an "execution ended" notification of the control program 1 is not received (NO in step S216), the microprocessor 100 determines whether an interrupt signal for starting a control cycle is received (step S218). When an interrupt signal for starting a control cycle is received (YES in step S218), the processing of step S202 and thereafter is repeated. That is, when an interrupt for starting a control cycle is generated before an "execution ended" of the control program 1 is received, the execution of the control program 1 is temporarily interrupted and in the next control cycle, after the execution of the I/O processing program, the unexecuted part of the control program 1 is executed. On the other hand, when an interrupt signal for starting a control cycle is not received (NO in step S218), the processing of step S216 and thereafter is repeated.

On the other hand, when an "execution ended" notification of the control program 1 is received (YES in step S216), the microprocessor 100 sets the execution state of the control program 1 to the "execution ended" state and releases the "write-protect" state of the corresponding synchronous buffer 1 (step S220A). A period of time of the "write-protect" state of the synchronous buffer 1 is indicated using an arrow of a dashed line in FIG. 9.

After step S220A, the microprocessor 100 determines the execution state of the control program 2 (owner-side control program) (step S230A). When the control program 2 (owner-side control program) is in the "before execution" state ("before execution" in step S230A), the microprocessor 100 sets the execution state of the control program 2 to the "during execution" state and starts execution of the control program 2 (step S232A).

When the control program 2 (owner-side control program) is in the "during execution" state ("during execution" in step S230A), the microprocessor 100 starts execution of an unexecuted part of the control program 2 (step S234).

When the control program 2 (owner-side control program) is in the "execution ended" state ("execution ended" in step S230A), the process proceeds to step S270.

In step S232 or step S234, after the execution of the control program 2 is started, the microprocessor 100 determines whether an "execution ended" notification of the control program 2 is received (step S236).

When an "execution ended" notification of the control program 2 is not received (NO in step S236), the microprocessor 100 determines whether an interrupt signal for starting a control cycle is received (step S238). When an interrupt signal for starting a control cycle is received (YES in step S238), the processing of step S202 and thereafter is repeated. On the other hand, when an interrupt signal for starting a control cycle is not received (NO in step S238), the processing of step S236 and thereafter is repeated.

On the other hand, when an "execution ended" notification of the control program 2 is received (YES in step S236), the microprocessor 100 sets the execution state of the control program 2 to the "execution ended" state and copies data stored in the global variable area 2 to the synchronous buffer 1 (step S240A). The operation of copying the data stored in the global variable area 2 to the synchronous buffer 1 is indicated by an arrow of a solid line in FIG. 9.

After step S240A, the process waits for an interrupt signal for starting a control cycle (step S270). When an interrupt signal for starting a control cycle is received (YES in step S270), the processing of step S202 and thereafter is again executed.

In view of simplifying the description, FIG. 9 illustrates an example in which a number of referrer-side control programs that reference one global variable is "1." However, the number of referrer-side control programs can be arbitrarily set. In any of the embodiments, the number of referrer-side control programs that reference one global variable is arbitrarily set. Even for an embodiment in which only one referrer-side control program is illustrated, operation in a case where there are a plurality of referrer-side control programs can be understood by referring to FIGS. 6-8.

(f4: Summary)

In any embodiment, when there are a control program 1 and a control program 2, it is possible that for one global variable the control program 1 is an owner, and for another global variable the control program 2 is an owner. The operation of the "execution control process of a control program" of the system program can be understood for each global variable.

As described above, in Embodiments, the system program 210 includes the following processes (1) and (2) as an execution preparation process of the control program 230.

(1) A process in which the global variable area 1042a storing a global variable is generated in the memory means (basically, the main memory 104).

(2) A process in which the synchronous buffer area 1042b is generated in the memory means (basically, the main memory 104), the synchronous buffer area 1042b providing, with respect to each referrer-side control program and for each global variable that is referenced from the referrer-side control program, one synchronous buffer as a reference destination in place of the global variable area when the referrer-side control program references the global variable.

Further, the system program 210 includes the following processes (1)-(4) as an execution control process of the control program 230.

(1) An owner-side start process (step S212 in FIG. 8 and step S232 in FIG. 10) that starts execution of an owner-side control program.

(2) A copy process (step S220 in FIG. 8 and step S240A in FIG. 10) in which, when execution of an owner-side control program ends, copying a global variable that is rewritten by the owner-side control program from a global variable area to a synchronous buffer corresponding to the global variable is performed under a condition that the synchronous buffer as a copy destination is not in the write-protect state.

(3) A referrer-side start process (S232 and S252 in FIG. 8 and S212A in FIG. 10) that starts execution of a referrer-side control program and further executes a process in which a synchronous buffer that is referenced during the execution of the referrer-side control program is set to the write-protect state.

(4) A write-protect release process (S240 and S260 in FIG. 8 and S220A in FIG. 10) that, when the execution of the referrer-side control program ends, releases the write-protect state of the synchronous buffer that was in the write-protect state.

According to the above-described Embodiment 1, despite that there exists a period of time of the write-protect state for a synchronous buffer, for example, in a control cycle common to the control programs, when control of the degree of execution of each of the control programs is performed, a referrer-side control program can reference a latest value of a global variable at the start of the execution of the referrer-side control program. That is, in this case, the value of the global variable that is to be referenced by the referrer-side control program can be obtained by the copy process during a period of time in which the synchronous buffer is not in the write-protect state.

Further, according to Embodiment 1, for each referrer-side control program, a synchronous buffer for each global variable that is referenced from the referrer-side control program is single. Therefore, even when the number of global variables and the number of referrer-side control programs are large, a size of a memory occupied by a synchronous buffer is small. Further, because of the singleness of the synchronous buffer, an algorithm is simple. Therefore, the design of the system program is easy.

<G. Method of Sequentially Copying to a Plurality of Synchronous Buffers (Embodiment 2)>

(g1: Overview)

In the above-described Embodiment 1, an example is described that adopts a configuration in which data stored in the global variable area is not copied to a synchronous buffer that is in the "write-protect" state. In contrast, a description is given of a configuration in which, regardless the execution state of a referrer-side control program that references a synchronous buffer, data stored in the global variable area can be copied to the synchronous buffer.

More specifically, in Embodiment 2, as a synchronous buffer, an area that temporarily stores data from a global variable area and an area where a referrer-side control program actually references data are respectively provided. This allows data stored in the global variable area to be copied to the synchronous buffer without affecting the execution state of the referrer-side control program.

(g2: Control Program Having a Higher Degree of Execution Priority and a Shorter Execution Cycle is an Owner of a Global Variable)

Figure 11:
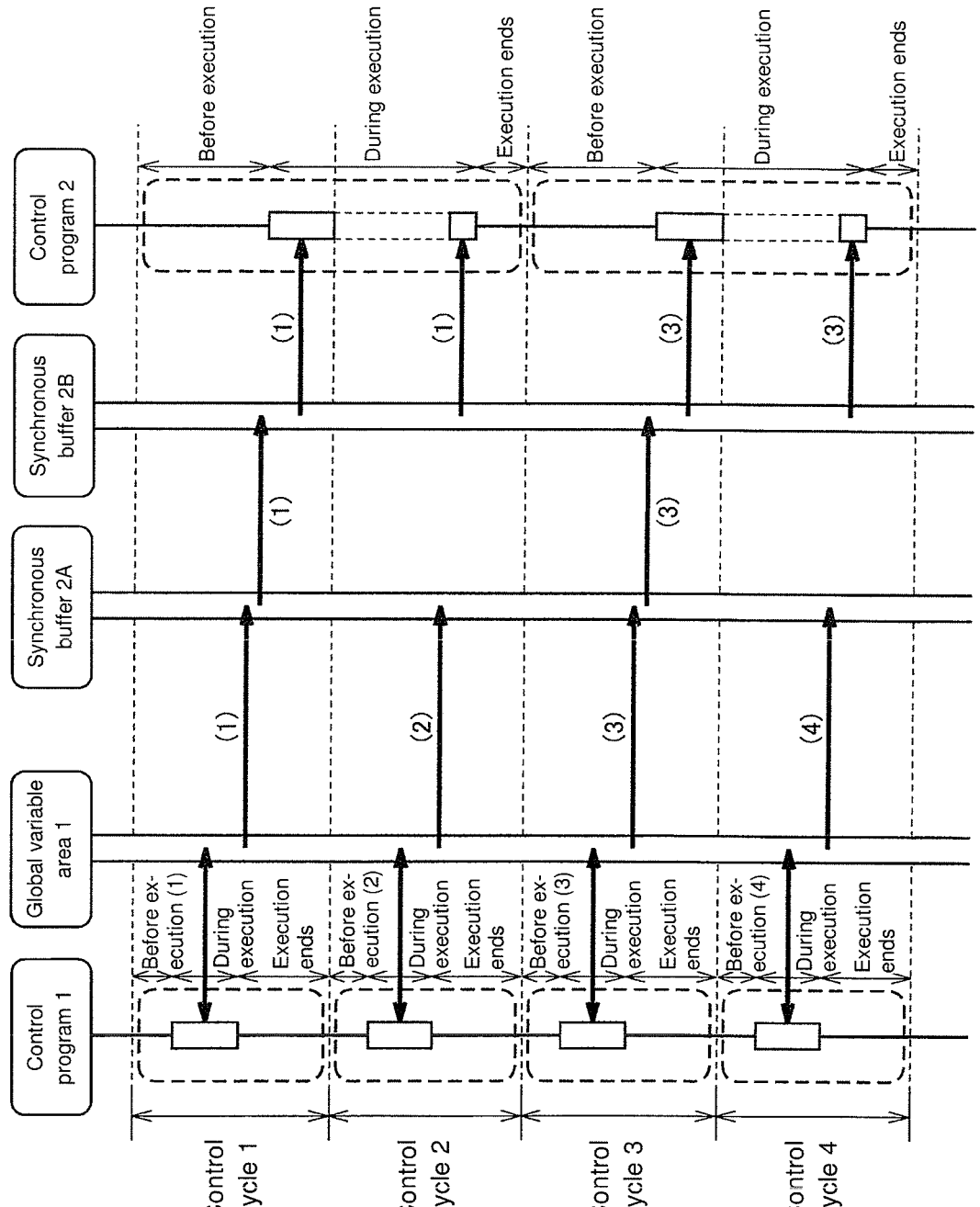
FIG. 11 is a sequence diagram illustrating an execution operation according to Embodiment 2.

FIG. 11 is a sequence diagram illustrating an execution operation according to Embodiment 2. In the sequence diagram illustrated in FIG. 11, it is assumed that two control programs (a control program 1 and a control program 2) are time-divisionally executed and that the control program 1 having a higher degree of priority and a shorter execution cycle is set as an owner (owner-side control program) of a global variable.

In the example illustrated in FIG. 11, the control program 1 is the owner of the global variable. Therefore, the control program 1 writes its execution result and the like to a global variable area 1 in the global variable area 1042a. On the other hand, synchronous buffers 2A and 2B are provided in the synchronous buffer area 1042b. Data in the global variable area 1 is first written to the synchronous buffer 2A and subsequently transferred at an appropriate timing from the synchronous buffer 2A to the synchronous buffer 2B. A synchronization process between the global variable area 1 and the synchronous buffers 2A and 2B as illustrated in FIG. 11 is described with reference to FIG. 12.

Figure 12:
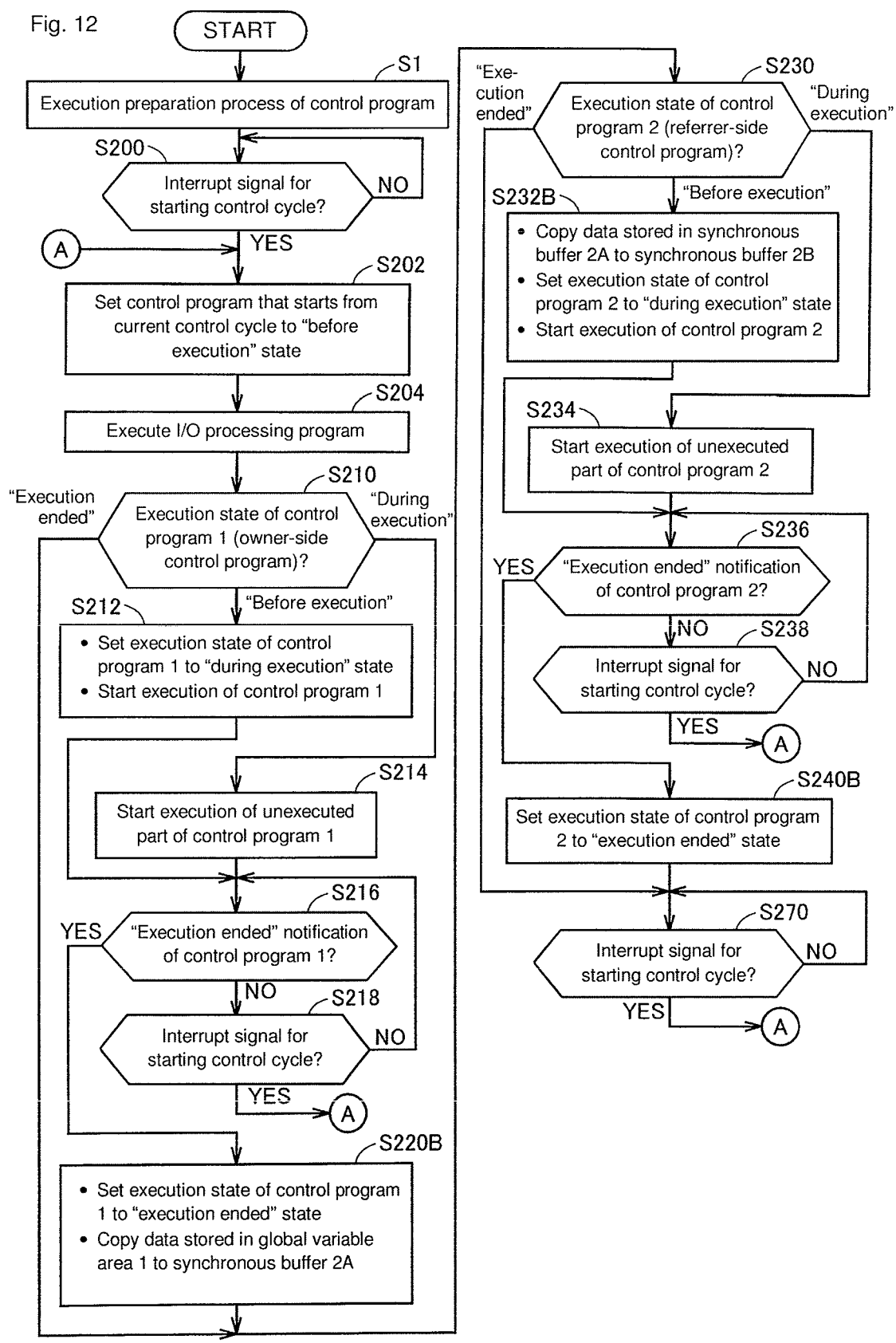
FIG. 12 is a flow chart illustrating an execution operation according to Embodiment 2.

FIG. 12 is a flow chart illustrating an execution operation according to Embodiment 2. In the flow chart of FIG. 12, a step that executes a same process as in the flow chart illustrated in FIG. 8 is given a same step number as in FIG. 8.

With reference to FIG. 12, the microprocessor 100 executes the execution preparation process of the control program 230 in the system program 210 (step S1). Next, the microprocessor 100 executes the execution control process of the control program 230 in the system program 210 (step S2 illustrated in FIG. 5).

In the flow chart illustrated in FIG. 12, a process similar to that of steps S200-S218 of the flow chart illustrated in FIG. 8 is executed. However, in the flow chart illustrated in FIG. 12, a process of step S220B is executed in place of step S220.

Specifically, at step S220B, the microprocessor 100 sets the execution state of the control program 1 to the "execution ended" state and copies data stored in the global variable area 1 to the synchronous buffer 2A. The operation of copying the data stored in the global variable area 1 to the synchronous buffer 2A is indicated by an arrow of a solid line in FIG. 11.

After step S220B, the microprocessor 100 determines the execution state of the control program 2 (referrer-side control program) (step S230). When the control program 2 (referrer-side control program) is in the "before execution" state ("before execution" in step S230), the microprocessor 100 copies data stored in the synchronous buffer 2A synchronous buffer to the 2B and then sets the execution state of the control program 2 to the "during execution" state and starts execution of the control program 2 (step S232B).

When the control program 2 (referrer-side control program) is in the "during execution" state ("during execution" in step S230), the microprocessor 100 starts execution of an unexecuted part of the control program 2 (step S234). In this case, the data stored in the synchronous buffer 2A is not copied to the synchronous buffer 2B.

When the control program 2 (referrer-side control program) is in the "execution ended" state ("execution ended" in step S230), the process proceeds to step S270.

In step S232B or step S234, after the execution of the control program 2 is started, the microprocessor 100 determines whether an "execution ended" notification of the control program 2 is received (step S236).

When an "execution ended" notification of the control program 2 is not received (NO in step S236), the microprocessor 100 determines whether an interrupt signal for starting a control cycle is received (step S238). When an interrupt signal for starting a control cycle is received (YES in step S238), the processing of step S202 and thereafter is repeated. On the other hand, when an interrupt signal for starting a control cycle is not received (NO in step S238), the processing of step S236 and thereafter is repeated.

On the other hand, when an "execution ended" notification of the control program 2 is received (YES in step S236), the microprocessor 100 sets the execution state of the control program 2 to the "execution ended" state (step S240B).

After step S240B, the process waits for an interrupt signal for starting a control cycle (step S270). When an interrupt signal for starting a control cycle is received (YES in step S270), the processing of step S202 and thereafter is again executed.

(g3: Control Program Having a Lower Degree of Execution Priority and a Longer Execution Cycle is an Owner of a Global Variable)

In an example described below, it is assumed that a control program 1 that is set as a referrer (referrer-side control program) of a global variable has a higher degree of execution priority and a shorter execution cycle and that a control program 2 that is set as an owner (owner-side control program) of the global variable has a longer execution cycle.

Figure 13:
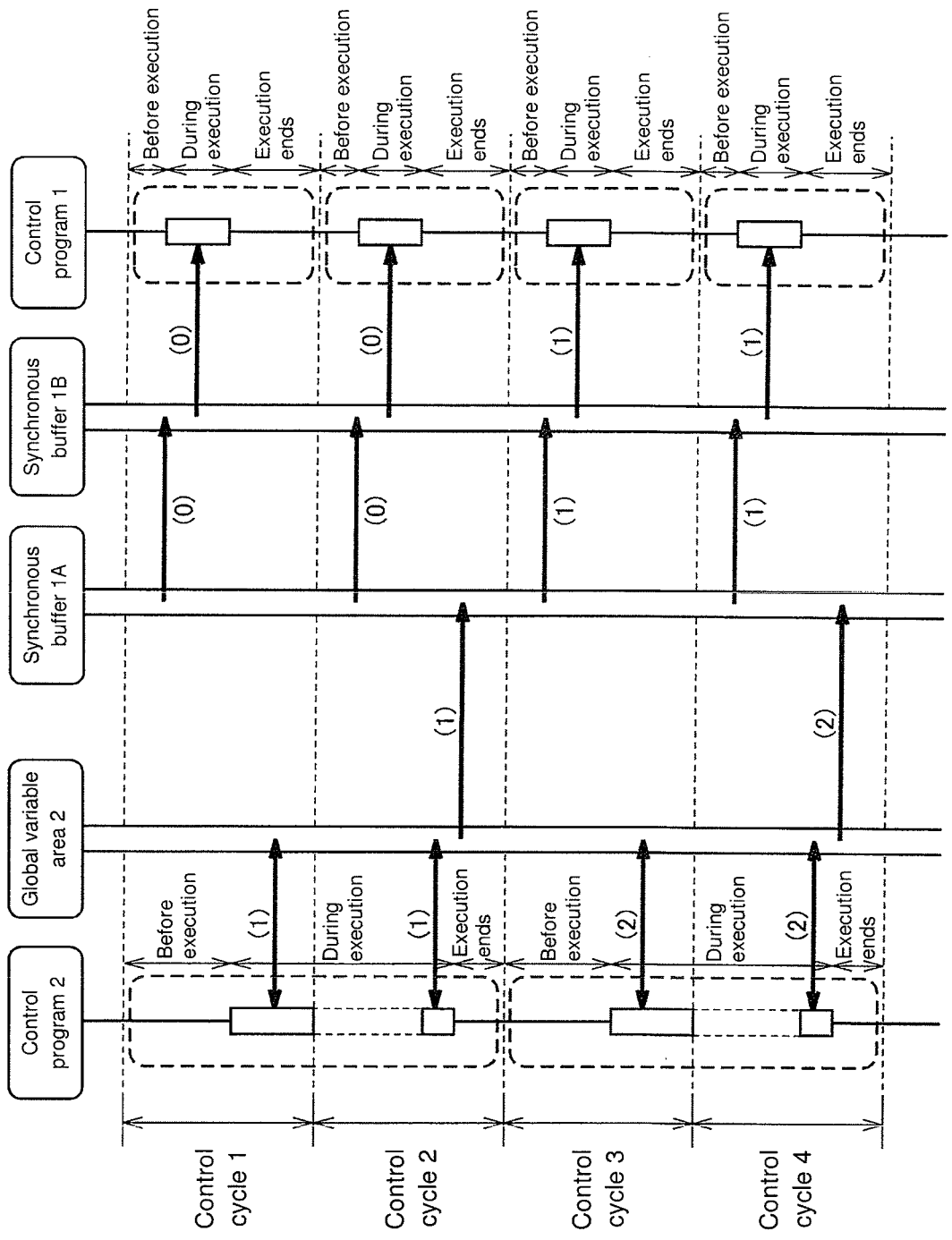
FIG. 13 is a sequence diagram illustrating another execution operation according to Embodiment 2.

FIG. 13 is a sequence diagram illustrating another execution operation according to Embodiment 2. In the example illustrated in FIG. 13, the control program 2 is the owner of the global variable. Therefore, the control program 2 writes its execution result and the like to a global variable area 2 in the global variable area 1042a. On the other hand, for the control program 1 that is set as a referrer-side control program, synchronous buffers 1A and 1B are provided.

In this case, synchronization between the synchronous buffers 1A and 1B and the global variable area 2 is maintained according to steps described in the following.

Figure 14:
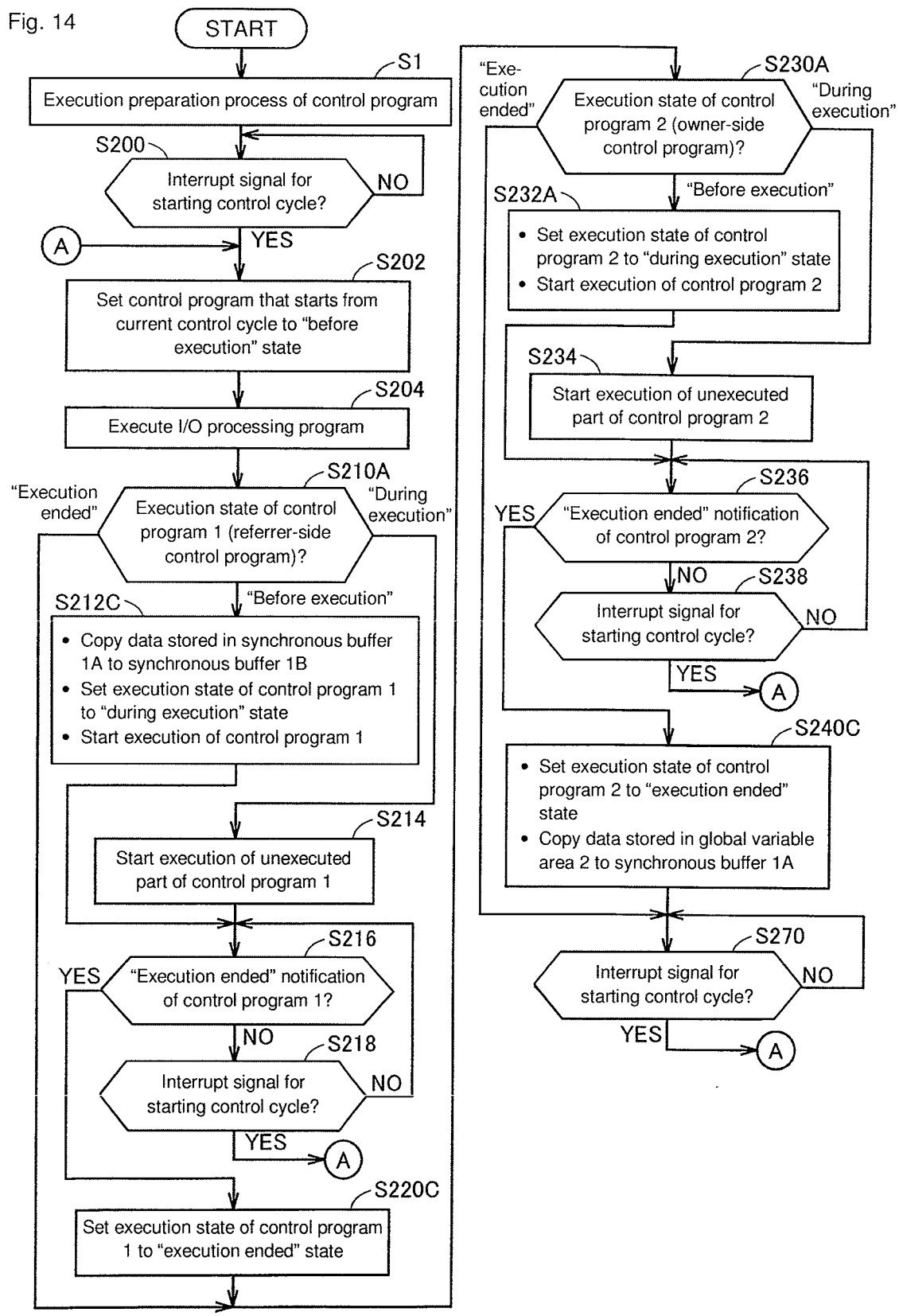
FIG. 14 is a flow chart illustrating another execution operation according to Embodiment 2.

FIG. 14 is a flow chart illustrating another execution operation according to Embodiment 2. In the flow chart of FIG. 14, a step that executes a same process as in the flow chart illustrated in FIG. 10 is given a same step number as in FIG. 10.

The flow chart illustrated in FIG. 14 is different as compared to the flow chart illustrated in FIG. 10 in that processes of steps S212C, S220C and S240C are executed in place of steps S212A, S220A and S240A, respectively. In the following, the difference is mainly described, and detailed description of other processes is not repeated.

In step S212C that is executed when the control program 1 (referrer-side control program) is in the "before execution" state ("before execution" in step S210A), the microprocessor 100 copies data stored in the synchronous buffer 1A to the synchronous buffer 1B and then sets the execution state of the control program 1 to the "during execution" state and starts execution of the control program 1 (step S212C).

In step S220C that is executed when an "execution ended" notification of the control program 1 is received (YES in step S216), the microprocessor 100 sets the execution state of the control program 1 to the "execution ended" state (step S220C).

In step S240C that is executed when an "execution ended" notification of the control program 2 is received (YES in step S236), the microprocessor 100 sets the execution state of the control program 2 to the "execution ended" state and copies data stored in the global variable area 2 to the synchronous buffer 1A (step S240C). The operation of copying the data stored in the global variable area 2 to the synchronous buffer 1A is indicated by an arrow of a solid line in FIG. 13.

(g4: Summary)

As described above, in Embodiment 2, the system program 210 includes the following processes (1) and (2) as an execution preparation process of the control program 230.

(1) A process in which the global variable area 1042a storing a global variable is generated in the memory means (basically, the main memory 104).

(2) A process in which the synchronous buffer area 1042b is generated in the memory means (basically, the main memory 104), the synchronous buffer area 1042b providing, with respect to each referrer-side control program and for each global variable that is referenced from the referrer-side control program, a first synchronous buffer and a second synchronous buffer as a group of synchronous buffers.

The second synchronous buffer is a synchronous buffer as a reference destination when the referrer-side control program references the global variable.

Further, the system program 210 includes the following processes (1)-(3) as an execution control process of the control program 230.

(1) An owner-side start process (step S212 in FIG. 12 and step S232A in FIG. 14) that starts execution of an owner-side control program.

(2) A copy process (step S220B in FIG. 12 and step S240C in FIG. 14) in which, when execution of an owner-side control program ends, a global variable that is rewritten by the owner-side control program is copied from a global variable area to a synchronous buffer corresponding to the global variable.

(3) A referrer-side start process (S232B in FIG. 12 and S212C in FIG. 14) that starts execution of a referrer-side control program and further executes a process in which data stored in a first synchronous buffer is copied to a second synchronous buffer.

According to the above-described Embodiment 2, a copy process from the global variable area to the first synchronous buffer can always be performed and further copying from the first synchronous buffer to the second synchronous buffer is performed when the execution of the referrer-side control program starts. Therefore, the referrer-side control program can reference the latest value of the global variable at the start of the execution of the referrer-side control program.

Further, in Embodiment 2, it is not necessary to determine a state of a synchronous buffer as a copy destination when performing the copy process to the first synchronous buffer; and thus, an algorithm is simple.

When the microprocessor 100 is multicore, the timing of writing to the first synchronous buffer (copying from the global variable area) and the timing of reading from the first synchronous buffer (copying to the second synchronous buffer) may overlap. However, in this case, the other process may be performed after the process that starts first has ended.

<H. Method of Selectively Using a Plurality of Synchronous Buffers (Embodiment 3)>

(h1: Overview)

In Embodiment 2, an example is described in which two synchronous buffers are used to sequentially forward data. In contrast, in Embodiment 3, a description is given of a configuration in which, by selectively using a plurality of synchronous buffers (typically two), data stored in the global variable area can be copied to a synchronous buffer regardless an execution state of a referrer-side control program that references the synchronous buffer.

(h2: Control Program Having a Higher Degree of Execution Priority and a Shorter Execution Cycle is an Owner of a Global Variable)

Figure 15:
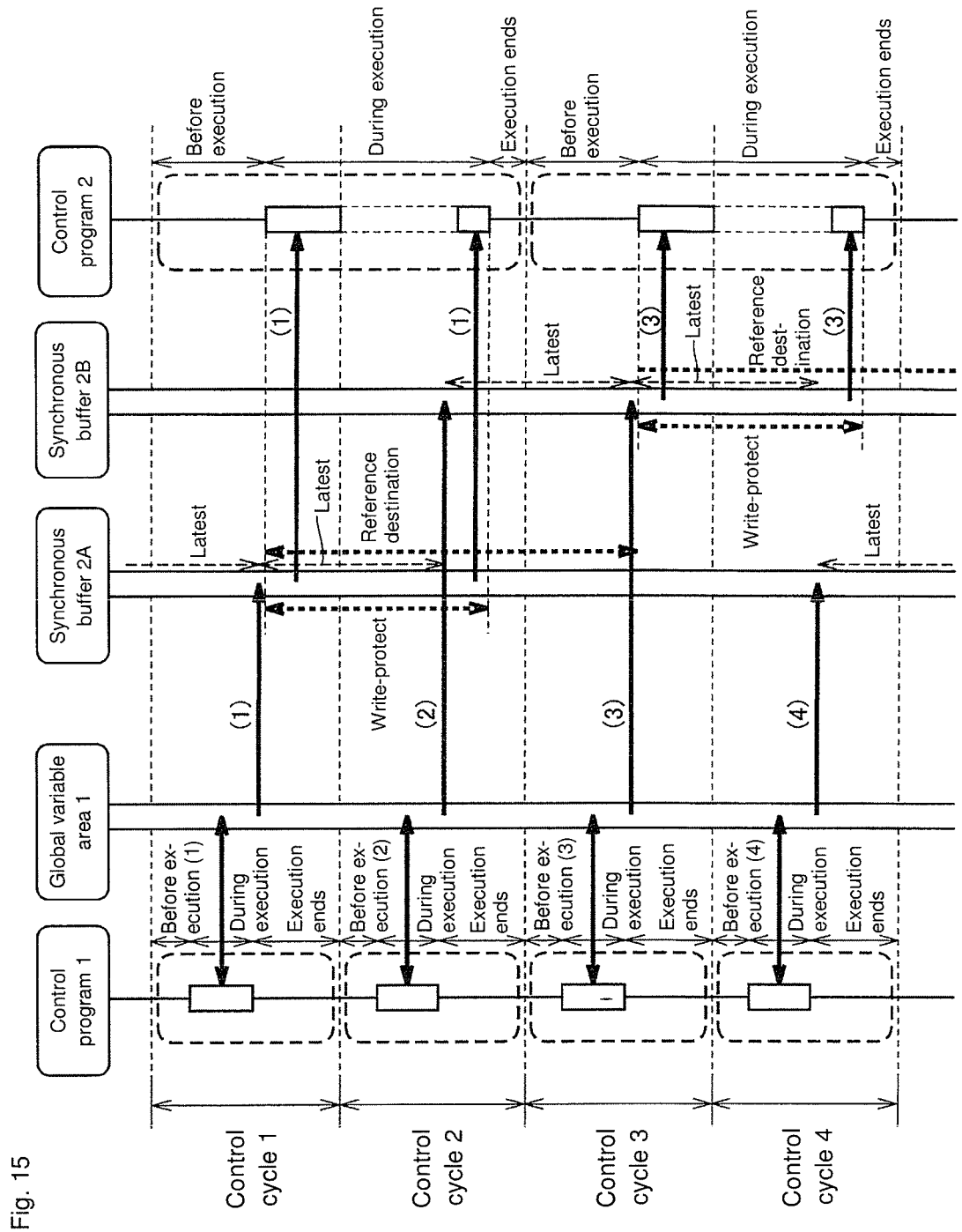
FIG. 15 is a sequence diagram illustrating an execution operation according to Embodiment 3.

FIG. 15 is a sequence diagram illustrating an execution operation according to Embodiment 3. In the sequence diagram illustrated in FIG. 15, it is assumed that two control programs (a control program 1 and a control program 2) are time-divisionally executed and that the control program 1 having a higher degree of execution priority and a shorter execution cycle is set as an owner (owner-side control program) of a global variable.

In the example illustrated in FIG. 15, the control program 1 is the owner of the global variable. Therefore, the control program 1 writes its execution result and the like to a global variable area 1 in the global variable area 1042a. On the other hand, synchronous buffers 2A and 2B are provided in the synchronous buffer area 1042b. Data in the global variable area 1 is written to one of the synchronous buffer 2A and the synchronous buffer 2B. More specifically, the data in the global variable area 1 is copied to one of the two synchronous buffers that is not in a "write-protect" state. A synchronization process between the global variable area 1 and the synchronous buffers 2A and 2B as illustrated in FIG. 15 is described with reference to FIG. 16.

Figure 16:
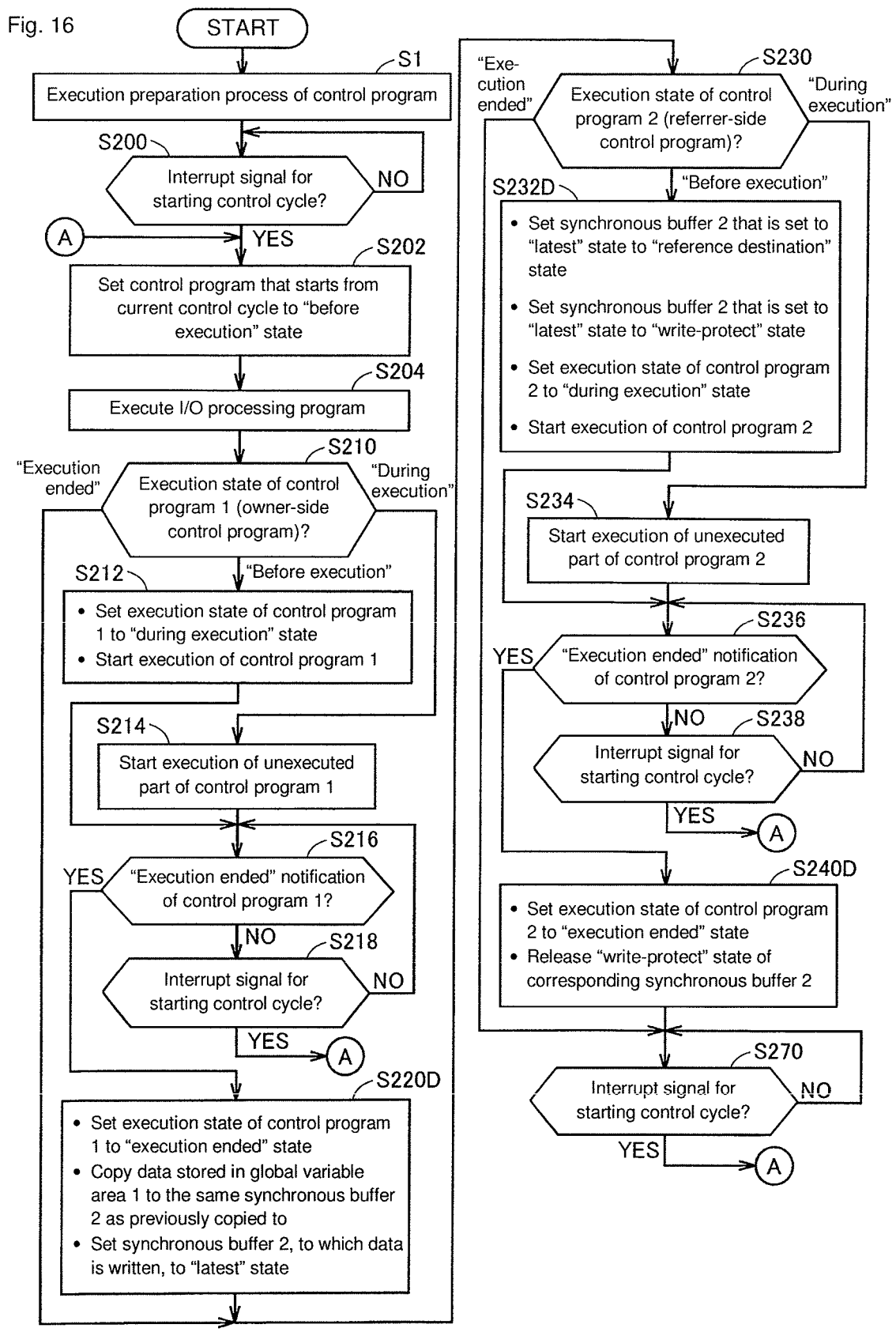
FIG. 16 is a flow chart illustrating an execution operation according to Embodiment 3.

FIG. 16 is a flow chart illustrating an execution operation according to Embodiment 3. In the flow chart of FIG. 16, a step that executes a same process as in the flow chart illustrated in FIG. 12 is given a same step number as in FIG. 12.

The flow chart illustrated in FIG. 16 is different as compared to the flow chart illustrated in FIG. 12 in that processes of steps S220D, S232D and S240D are executed in place of steps S220B, S232B and S240B, respectively. In the following, the difference is mainly described, and detailed description of other processes is not repeated.

In step S220D that is executed when an "execution ended" notification of the control program 1 is received (YES in step S216), the microprocessor 100 sets the execution state of the control program 1 to the "execution ended" state and then copies data stored in the global variable area 1 to the same synchronous buffer 2 (synchronous buffer 2A or synchronous buffer 2B) as previously copied to and sets the synchronous buffer 2, to which data is written, to the "latest" state (step S220D).

However, when the synchronous buffer 2 that is a write destination of the data stored in the global variable area 1 is set to the "write-protect" state, the data is written to the other synchronous buffer 2.

In step S232D that is executed when the control program 2 (referrer-side control program) is in the "before execution" state ("before execution" in step S230), the microprocessor 100 sets the synchronous buffer 2 (synchronous buffer 2A or synchronous buffer 2B) that is set to the "latest" state to the "reference destination" state of the control program 2 (referrer-side control program) and also to the "write-protect" state, and further sets the execution state of the control program 2 to the "during execution" state and starts execution of the control program 2 (step S232D).

In step S234 that is executed when the control program 2 (referrer-side control program) is in the "during execution" state ("during execution" in step S230), the "reference destination" state and the "write-protect" state of the synchronous buffer 2 that is set to the "latest" state are not released and are maintained.

In step S240D that is executed when an "execution ended" notification of the control program 2 is received (YES in step S236), the microprocessor 100 sets the execution state of the control program 2 to the "execution ended" state and releases the "write-protect" state of the corresponding synchronous buffer 2 (step S240D).

The above-described states of a synchronous buffer, that is, the write-protect state, the reference destination state and the state (latest state) in which the latest data is stored are indicated by recording in a write-protect state recording area, a reference destination state recording area and a latest state recording area, respectively, that the corresponding synchronous buffer is in the write-protect state, the reference destination state and the latest state. These recording areas are generated in the control program work area 1042 in the main memory 104 by the system program 210 in the "execution preparation process of a control program" (step S1 illustrated in FIG. 5). A mode of the recording that a synchronous buffer is in the write-protect state, the reference destination state or the latest state can be suitably determined. For example, modes can be adopted such as that in which information (such as an identification number of a group of synchronous buffers) that identifies a group that is in the write-protect state, the reference destination state or the latest state among the groups of synchronous buffers that are grouped in units for each of which the collective copying process is performed, and that in which, for each of the groups of the synchronous buffers, a flag or state variable that indicates whether the group is in the write-protect state, the reference destination state or the latest state is provided and a value of the flag or state variable is recorded. The same applies to management of an execution state of a control program in other embodiments to be described in the following.

(h3: Control Program Having a Lower Degree of Execution Priority and a Longer Execution Cycle is an Owner of a Global Variable)

In an example described below, it is assumed that a control program 1 that is set as a referrer (referrer-side control program) of a global variable has a higher degree of execution priority and a shorter execution cycle and that a control program 2 that is set as an owner (owner-side control program) of the global variable has a lower degree of execution priority and a longer execution cycle.

Figure 17:
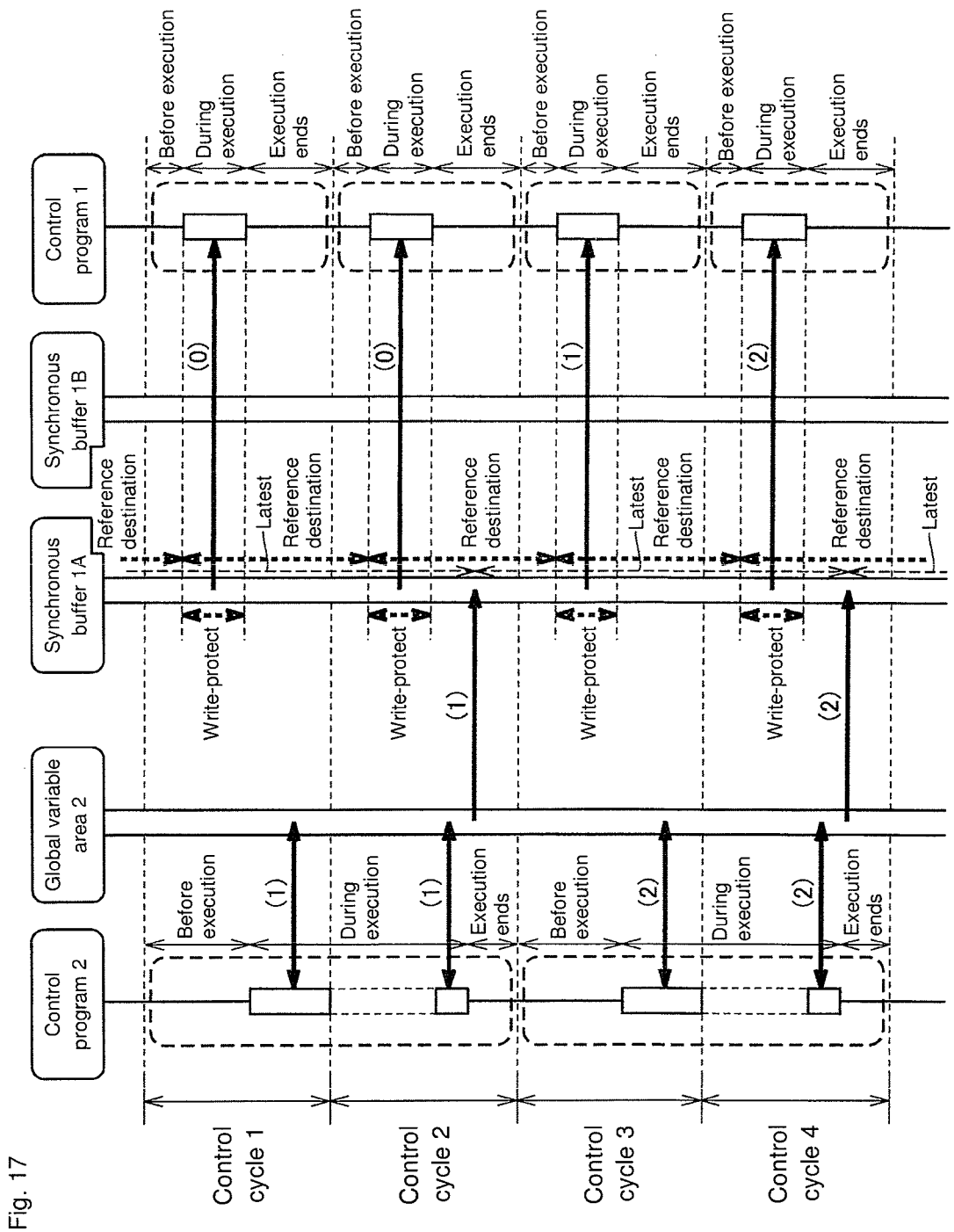
FIG. 17 is a sequence diagram illustrating another execution operation according to Embodiment 3.

FIG. 17 is a sequence diagram illustrating another execution operation according to Embodiment 3. In the example illustrated in FIG. 17, the control program 2 is the owner of the global variable. Therefore, the control program 2 writes its execution result and the like to a global variable area 2 in the global variable area 1042*a*. On the other hand, for the control program 1 that is set as a referrer-side control program, synchronous buffers 1A and 1B are provided.

In this case, synchronization between the synchronous buffers 1A and 1B and the global variable area 2 is maintained according to steps described in the following.

Figure 18:
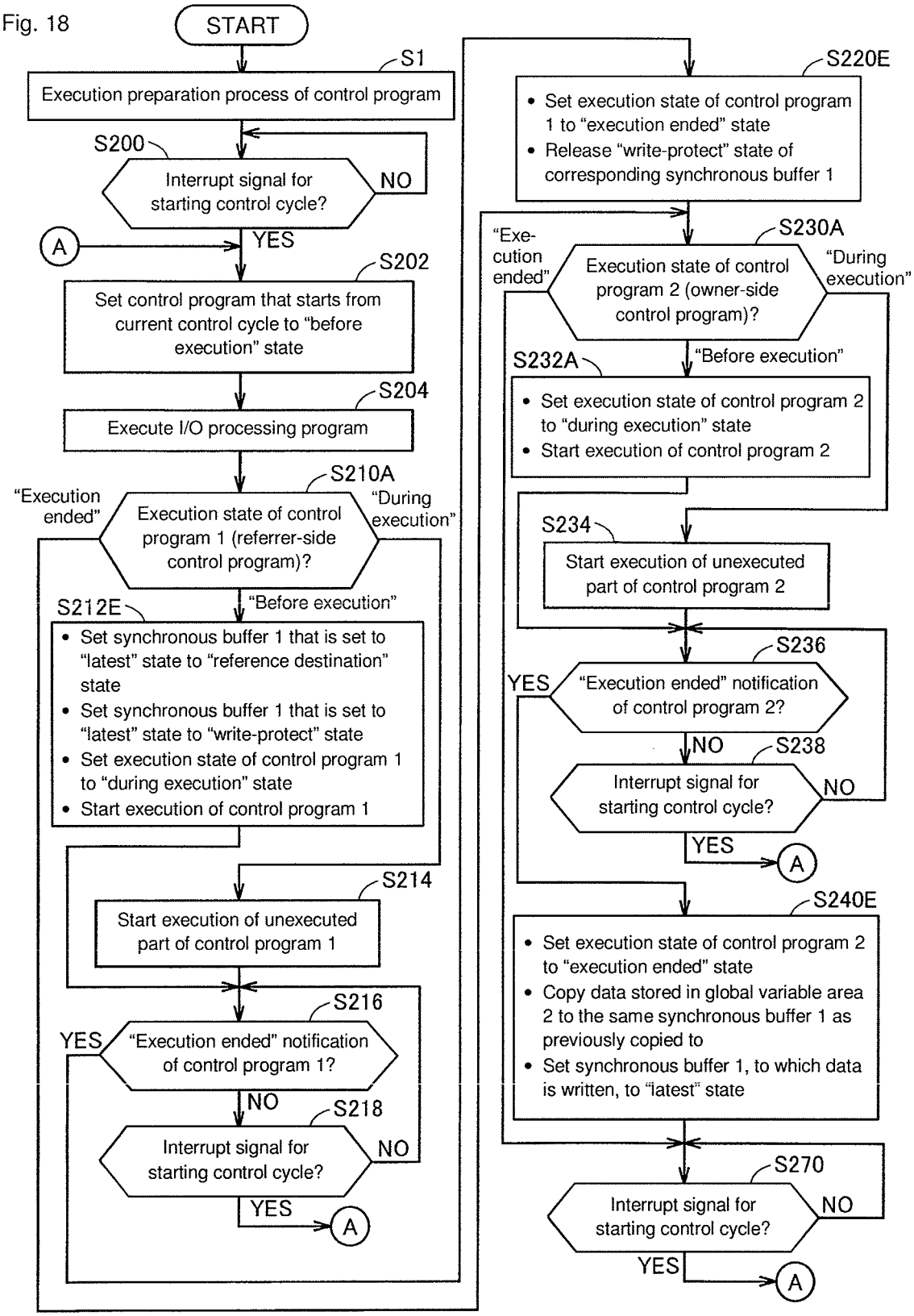
FIG. 18 is a flow chart illustrating another execution operation according to Embodiment 3.

FIG. 18 is a flow chart illustrating another execution operation according to Embodiment 3. In the flow chart of FIG. 18, a step that executes a same process as in the flow chart illustrated in FIG. 14 is given a same step number as in FIG. 14.

The flow chart illustrated in FIG. 18 is different as compared to the flow chart illustrated in FIG. 14 in that processes of steps S212E, S220E and S240E are executed in place of steps S212C, S220C and S240C, respectively. In the following, the difference is mainly described, and detailed description of other processes is not repeated.

In step S212E that is executed when the control program 1 (referrer-side control program) is in the "before execution" state ("before execution" in step S210A), the microprocessor 100 sets the synchronous buffer 1 (synchronous buffer 1A or synchronous buffer 1B) that is set to the "latest" state to the "reference destination" state of the control program 1 (referrer-side control program) and also to the "write-protect" state, and further sets the execution state of the control program 1 to the "during execution" state and starts execution of the control program 1 (step S212E).

In step S214 that is executed when the control program 1 (referrer-side control program) is in the "during execution" state ("during execution" in step S210A), the "reference destination" state and the "write-protect" state of the synchronous buffer 1 that is set to the "latest" state are not released and are maintained.

In step S220E that is executed when an "execution ended" notification of the control program 1 is received (YES in step S216), the microprocessor 100 sets the execution state of the control program 1 to the "execution ended" state and releases the "write-protect" state of the corresponding synchronous buffer 1 (step S220E).

In step S240E that is executed when an "execution ended" notification of the control program 2 is received (YES in step S236), the microprocessor 100 sets the execution state of the control program 2 to the "execution ended" state and then copies data stored in the global variable area 2 to the same synchronous buffer 1 (synchronous buffer 1A or synchronous buffer 1B) as previously copied to and sets the synchronous buffer 1, to which data is written, to the "latest" state (step S240E).

However, when the synchronous buffer 1 that is a write destination of the data stored in the global variable area 2 is set to the "write-protect" state, the data is written to the other synchronous buffer 1.

(h4: [Multicore] Control Program Executed by the Same Core as the System Program is an Owner of a Global Variable)

Figure 19:
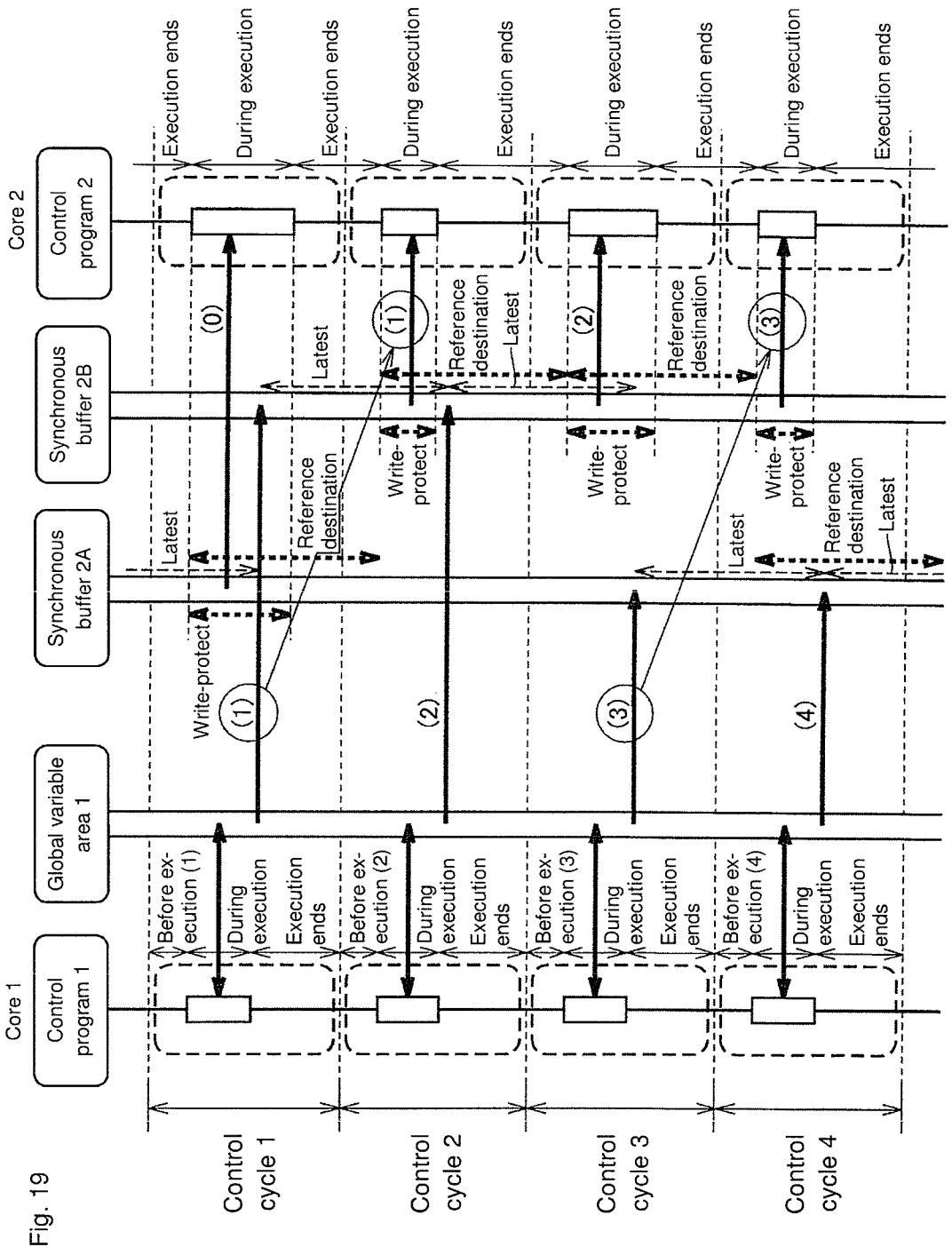
FIG. 19 is a sequence diagram illustrating an execution operation in a multicore microprocessor according to Embodiment 3.
Figure 20:
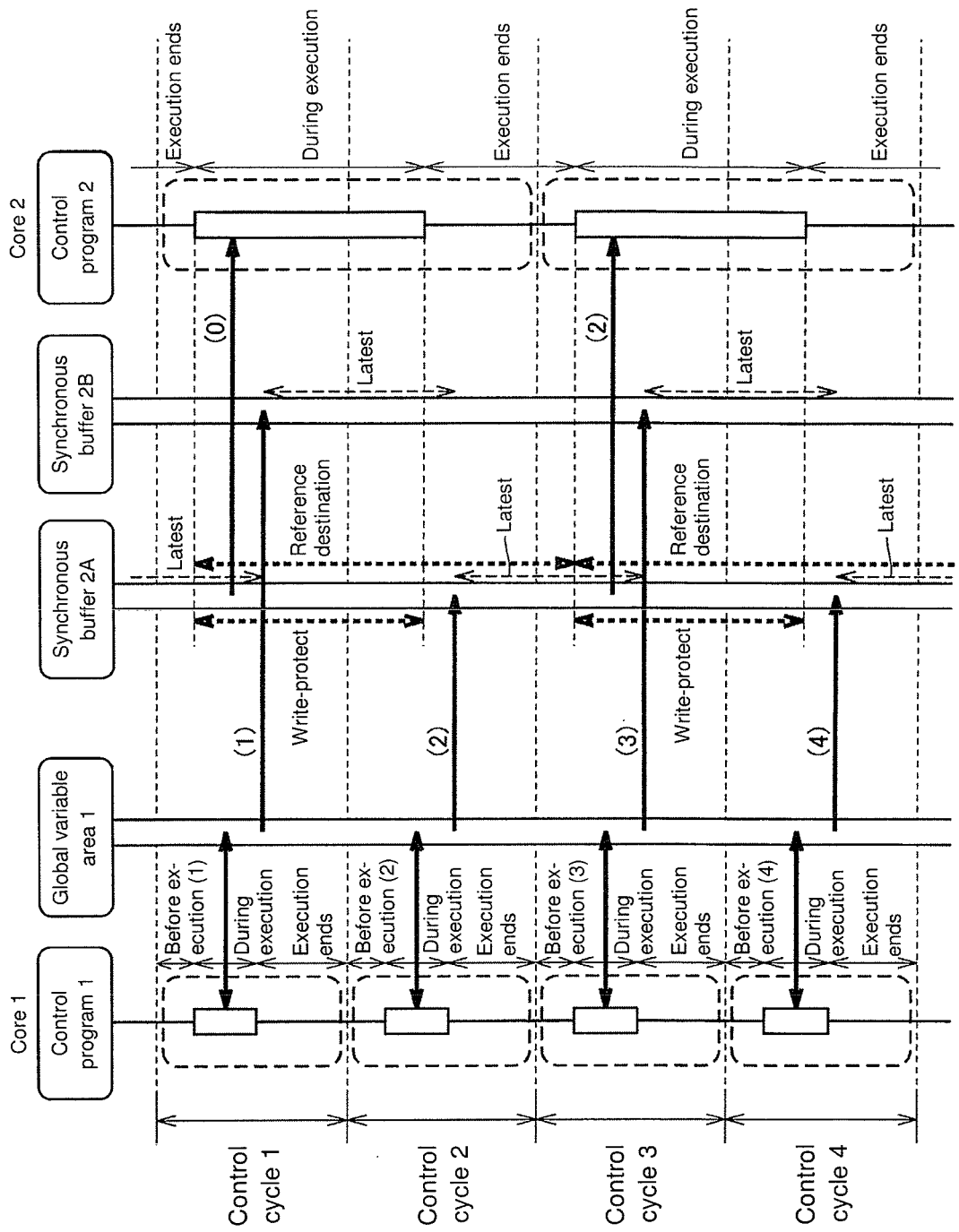
FIG. 20 is a sequence diagram illustrating an execution operation in a multicore microprocessor according to Embodiment 3.

Next, an example is given of a case where the microprocessor 100 is multicore. FIGS. 19 and 20 are sequence diagrams illustrating an execution operation in a multicore microprocessor according to Embodiment 3. More specifically, in FIGS. 19 and 20, a core 1 executes a control program 1 and a core 2 executes a control program 2. In this case, in the core 1, in addition to the control program 1, a system program is also executed. It is assumed that the control program 1 is set to an owner-side control program. FIG. 19 illustrates an example in which an execution cycle of the control program 1 and an execution cycle of the control program 2 are substantially the same and FIG. 20 illustrates an example in which the execution cycle of the control program 1 is shorter than the execution cycle of the control program 2.

A case is considered where the multicore as illustrated in FIGS. 19 and 20 is adopted to execute the control program 1 and the control program 2 in parallel. The control program 2 can be executed at any time in view of resource utilization of the core. However, when it is considered as a PLC, the control program 2 also needs to use an output process and an input process of the system program. Therefore, it is basic to wait for the end of the output process and the input process that are executed at the beginning of each control cycle to start execution of the control program 2.

When the control program 2 does not need to use the output process and input process of the system program, it is also possible to change the design so that the control program 2 is executed without synchronizing the execution cycle of the control program 2 with the control cycle. For example, it is also possible that, when the execution of the control program 2 ends, the next referrer-side start process is immediately performed.

In this case, synchronization between a global variable area 1 and synchronous buffers 2A and 2B is maintained according to steps described in the following.

Figure 21:
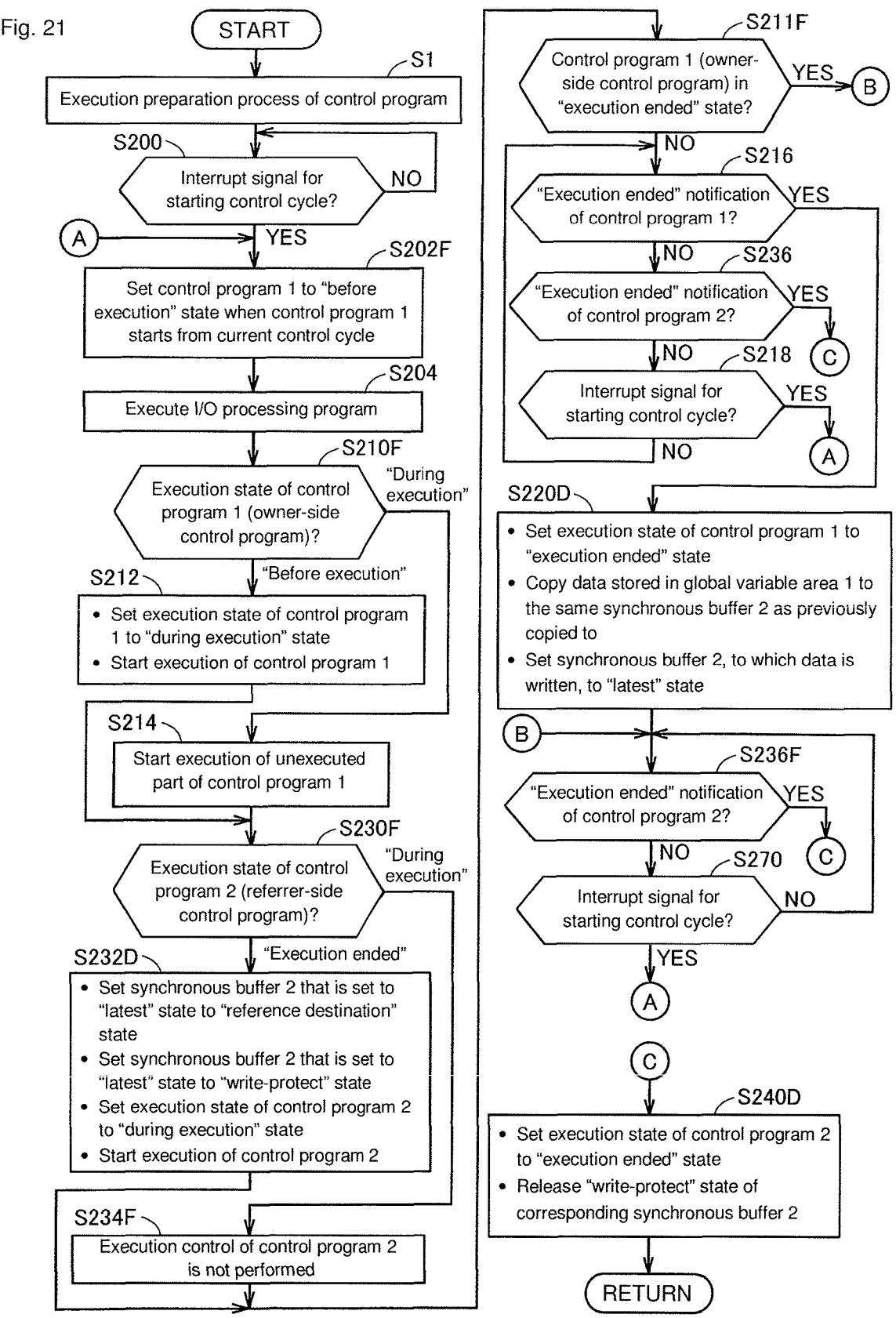
FIG. 21 is a flow chart illustrating an execution operation according to Embodiment 3.

FIG. 21 is a flow chart illustrating an execution operation according to Embodiment 3. The flow chart illustrated in FIG. 21 is applicable to any one of FIGS. 19 and 20. In the flow chart of FIG. 21, a step that executes a substantially same process as in the flow chart illustrated in FIG. 16 is given a same step number as in FIG. 16.

With reference to FIG. 21, the microprocessor 100 (core 1) executes the execution preparation process of the control program 230 in the system program 210 (step S1). Next, the microprocessor 100 (core 1) executes the execution control process of the control program 230 in the system program 210 (step S2 illustrated in FIG. 5). A detailed example of the execution control process of the control program 230 corresponds to steps S200-S270.

First, the microprocessor 100 (core 1) waits for an interrupt signal for starting a control cycle (step S200). When an interrupt signal for starting a control cycle is received (YES in step S200), the microprocessor 100 (core 1) sets the control program 1 to the "before execution" state in a case where the execution cycle of the control program 1 starts from the current control cycle (step S202F). Next, the microprocessor 100 (core 1) executes the I/O processing program 218 (the output processing program 214 and the input processing program 216) in the system program 210 (step S204).

Thereafter, the microprocessor 100 (core 1) determines the execution state of the control program 1 (owner-side control program) (step S210F). When the control program 1 (owner-side control program) is in the "before execution" state ("before execution" in step S210F), the microprocessor 100 (core 1) sets the execution state of the control program 1 to the "during execution" state and starts execution of the control program 1 (step S212). However, before the core 1 of the microprocessor 100 is dedicated to the execution of the control program 1, it is necessary to perform processing of steps S230F, S232D and S234F. Therefore, despite the expression of the flow chart, the execution of the control program 1 starts after the processing of steps S230F, S232D and S234F ends.

When the control program 1 (owner-side control program) is in the "during execution" state ("during execution" in step S210F), the microprocessor 100 (core 1) starts execution of an unexecuted part of the control program 1 (step S214). However, for the same reason as the above, in practice, the execution starts after the processing of steps S230F, S232D and S234F ends.

After the execution of the control program 1 starts at step S212 or step S214, the microprocessor 100 (core 1) determines the execution state of the control program 2 (referrer-side control program) (step S230F). When the control program 2 (referrer-side control program) is in the "execution ended" state ("execution ended" in step S230F), the microprocessor 100 (core 1) sets the synchronous buffer 2 (synchronous buffer 2A or synchronous buffer 2B) that is set to the "latest" state to the "reference destination" state of the control program 2 (referrer-side control program) and also to the "write-protect" state, and further sets the execution state of the control program 2 to the "during execution" state and starts execution of the control program 2 (step S232D).

When the control program 2 (referrer-side control program) is in the "during execution" state ("during execution" in step S230F), the microprocessor 100 (core 1) does not perform execution control of the control program 2 (step S234F). In this case, both of the "reference destination" state and the "write-protect" state of the corresponding synchronous buffer 2 are not released and the execution of the control program 2 is continued.

After step S232D or step S234F, the microprocessor 100 (core 1) determines whether the control program 1 (owner-side control program) is in the "execution ended" state (step S211F). In practice, that the realtime OS 200 detects the end of execution of the control program 1 corresponds to step S211F. When the execution of the control program 1 is not ended (NO in step S211F), the core 1 of the microprocessor 100 is dedicated to the execution of the control program 1. Thus, in practice, a loop process consisting steps S216, S236 and S218 and step S240D cannot be executed as in the flow chart. In practice, when the realtime OS 200 detects the end of the execution of control program 2 in the core 2, step S240D is executed as an interrupt process in the core 1. However, for convenience, the description will be given along with the flow chart.

When the control program 1 (owner-side control program) is in the "execution ended" state (YES in step S211F), the process proceeds to step S236F.

When the control program 1 (owner-side control program) is not in the "execution ended" state (NO in step S211F), the microprocessor 100 (core 1) determines whether an "execution ended" notification of the control program 1 is received (step S216). When an "execution ended" notification of the control program 1 is received (YES in step S216), the process proceeds to step S220D.

On the other hand, when an "execution ended" notification of the control program 1 is not received (NO in step S216), the microprocessor 100 (core 1) determines whether an "execution ended" notification of the control program 2 is received (step S236). When an "execution ended" notification of the control program 2 is received (YES in step S236), the process proceeds to step S240D. That is, when an "execution ended" notification of the control program 2 is received before an "execution ended" notification of the control program 1 is received, the process of step S240D is executed.

On the other hand, when an "execution ended" notification of the control program 2 is not received (NO in step S236), whether an interrupt signal for starting a control cycle is received is determined (step S238). When an interrupt signal for starting a control cycle is received (YES in step S218), the processing of step S202F and thereafter is again executed. That is, when an interrupt for starting a control cycle is generated before an "execution ended" notification of the control program 1 is received, the processing of step S202F and thereafter is again executed. On the other hand, when an interrupt signal for starting a control cycle is not received (NO in step S218), the processing of step S216 and thereafter is repeated.

In step S220D, the microprocessor 100 (core 1) sets the execution state of the control program 1 to the "execution ended" state and then copies data stored in the global variable area 1 to the same synchronous buffer 2 (synchronous buffer 2A or synchronous buffer 2B) as previously copied to and sets the synchronous buffer 2, to which data is written, to the "latest" state (step S220D). Next, the microprocessor 100 (core 1) determines whether an "execution ended" notification of the control program 2 is received (step S236F). When an "execution ended" notification of the control program 2 is received (YES in step S236F), the process proceeds to step S240D. That is, when an "execution ended" notification of the control program 2 is received before an interrupt for starting a control cycle is generated, the process of step S240D is executed.

On the other hand, when an "execution ended" notification of the control program 2 is not received (NO in step S236), whether an interrupt signal for starting a control cycle is received is determined (step S270). When an interrupt signal for starting a control cycle is received (YES in step S270), the processing of step S202F and thereafter is again executed. On the other hand, when an interrupt signal for starting a control cycle is not received (NO in step S270), the processing of step S236F and thereafter is repeated.

In step S240D, the microprocessor 100 (core 1) sets the execution state of the control program 2 to the "execution ended" state and releases the "write-protect" state of the corresponding synchronous buffer 2 (step S240D). After the execution of step S240D, the process returns to processing that is executed before the process proceeds to step S240D.

(h5: [Multicore] Control Program Executed by a Different Core from the System Program is an Owner of a Global Variable)

Next, an example is given of a case where, when the microprocessor 100 is multicore, a control program that is executed by a core that is different from a core that executes the system program is set as an owner-side control program.

Figure 22:
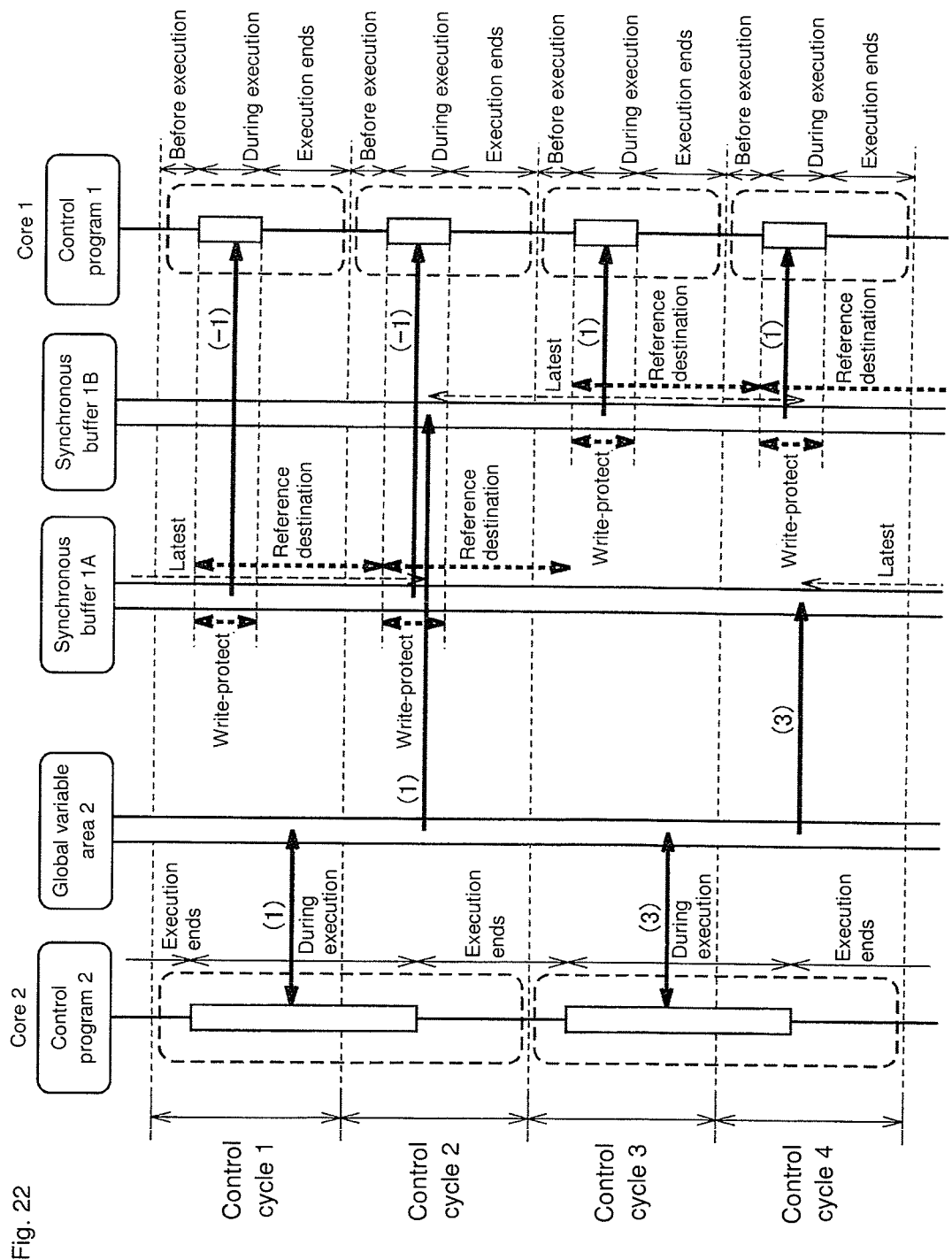
FIG. 22 is a sequence diagram illustrating another execution operation in a multicore microprocessor according to Embodiment 3.

FIG. 22 is a sequence diagram illustrating another execution operation in a multicore microprocessor according to Embodiment 3. In the sequence diagram illustrated in FIG. 22, it is assumed that a control program 2 that is executed by a core 2 is set as an owner-side control program.

Figure 23:
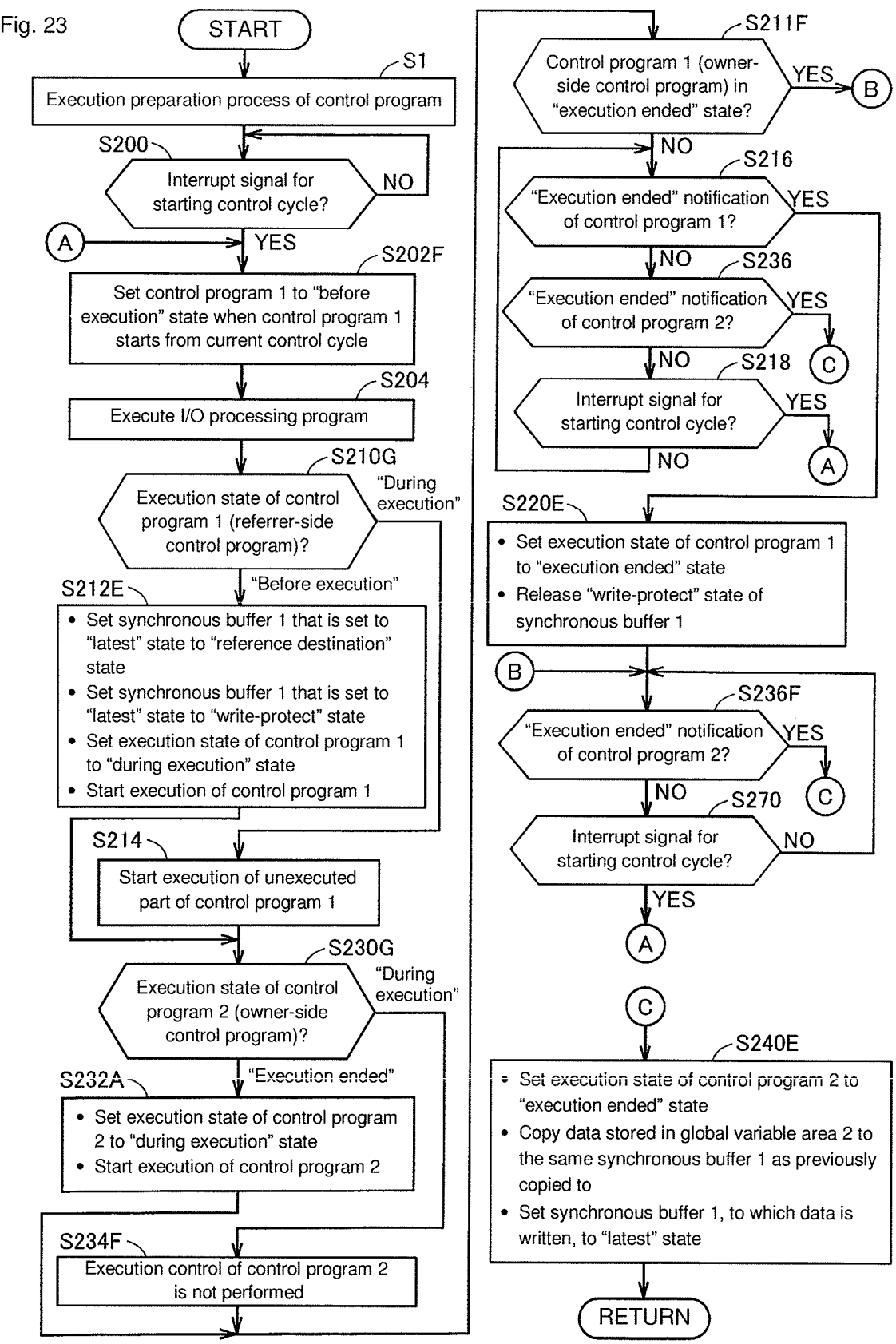
FIG. 23 is a flow chart illustrating another execution operation according to Embodiment 3.

FIG. 23 is a flow chart illustrating another execution operation according to Embodiment 3. In the flow chart of FIG. 23, a step that executes a same process as in the flow charts illustrated in FIGS. 18 and 21 is given a same step number as in FIGS. 18 and 21.

The flow chart illustrated in FIG. 23 is different as compared to the flow chart illustrated in FIG. 21 in that processes of steps S210G, S212E, S230G, S232A, S220E and S240E are executed in place of steps S210F, 5212, S230F, S232D, S220D and S240D, respectively. In the following, the difference is mainly described, and detailed description of other processes is not repeated.

In step S210G, the microprocessor 100 (core 1) determines the execution state of the control program 1 (referrer-side control program) (step S210G).

In step S212E that is executed when the control program 1 (referrer-side control program) is in the "before execution" ("before execution" in step S210G), the microprocessor 100 (core 1) sets the synchronous buffer 1 (synchronous buffer 1A or synchronous buffer 1B) that is set to the "latest" state to the "reference destination" of the control program 1 (referrer-side control program) and also to the "write-protect" state, and further sets the execution state of the control program 1 to the "during execution" state and starts execution of the control program 1 (step S212E). However, the execution of the control program 1 starts after the processing of steps S230F, S232A and S234F ends.

In step S214 that is executed when the control program 1 (referrer-side control program) is in the "during execution" state ("during execution" in step S210G), the "reference destination" state and the "write-protect" state of the synchronous buffer 2 that is set to the "latest" state are not released and are maintained.

In step S230G, the microprocessor 100 (core 1) determines the execution state of the control program 2 (owner-side control program) (step S230G).

In step S232A that is executed when the control program 2 (owner-side control program) is in the "execution ended" state ("execution ended" in step S230G), the microprocessor 100 (core 1) sets the execution state of the control program 2 to the "during execution" state and causes the core 2 to start execution of the control program 2 (step S232A).

In step S234F that is executed when the control program 2 (owner-side control program) is in the "during execution" state ("during execution" in step S230G), the execution of the control program 2 is continued.

In step S220E that is executed when an "execution ended" notification of the control program 1 is received (YES in step S216), the microprocessor 100 (core 1) sets the execution state of the control program 1 to the "execution ended" state and releases the "write-protect" state of the corresponding synchronous buffer 1 (step S220E).

In step S240E, the microprocessor 100 (core 1) sets the execution state of the control program 2 to the "execution ended" state and then copies data stored in the global variable area 2 to the same synchronous buffer 1 (synchronous buffer 1A or synchronous buffer 1B) as previously copied to and sets the synchronous buffer 1, to which data is written, to the "latest" state (step S240E).

However, when the synchronous buffer 1 that is a write destination of the data stored in the global variable area 2 is set to the "write-protect" state, the data is written to the other synchronous buffer 1.

(h6: Summary)

As described above, in Embodiment 3, the system program 210 includes the following processes (1) and (2) as an execution preparation process of the control program 230.

(1) A process in which the global variable area 1042a storing a global variable is generated in the memory means (basically, the main memory 104).

(2) A process in which, with respect to each referrer-side control program and for each global variable that is referenced from the referrer-side control program, a first synchronous buffer and a second synchronous buffer that serve as a reference destination in place of the global variable area when the referrer-side control program references the global variable are generated in the memory means (basically, the main memory 104) as a group of synchronous buffers (synchronous buffers 1A and 1B, or, synchronous buffer 2A or 2B).

In this case, this process also includes a process in which a latest state recording area for storing a state (latest state) in which the latest data is stored is generated in the memory means (basically, the main memory 104).

Further, the system program 210 includes the following processes (1)-(4) as an execution control process of the control program 230.

(1) An owner-side start process (step S212 in FIGS. 16 and 21 and step S232A in FIGS. 18 and 23) that starts execution of an owner-side control program.

(2) A referrer-side start process (step S232D in FIGS. 16 and 21 and step S212E in FIGS. 18 and 23) that starts execution of a referrer-side control program and further executes a process in which a synchronous buffer that is identified as in the latest state according to the content of the latest state recording area is set to the reference destination state, in which the synchronous buffer is referenced by the referrer-side control program during execution, and the synchronous buffer is set to the write-protect state.

(3) A copy process (step S220D in FIGS. 16 and 21 and step S240E in FIGS. 18 and 23) that, when execution of an owner-side control program ends, copies a global variable that is rewritten by the owner-side control program from a global variable area to a synchronous buffer, as a copy destination, that is not in the write-protect state and that is one of a first synchronous buffer and a second synchronous buffer that correspond to the global variable, and further executes a process in which that the synchronous buffer as a copy destination is in the latest state is recorded in the latest state recording area.

(4) A write-protect release process (S240D in FIGS. 16 and 21 and S220E in FIGS. 18 and 23) that, when the execution of the referrer-side control program ends, releases the write-protect state of the synchronous buffer that was in the write-protect state.

According to the above-described Embodiment 3, with respect to each referrer-side control program and for each global variable that is referenced from the referrer-side control program, there are two synchronous buffers and there is always at least one synchronous buffer that is writable. Therefore, the copy process can be performed at any time. Further, the synchronous buffer storing the latest data that is copied based on the content of the latest state recording area when the execution of the referrer-side control program starts is used as the reference destination. Thereby, the referrer-side control program can reference the value of the global variable that is the latest when the execution of the referrer-side control program starts.

When compared with the above-described Embodiment 1 that is in common with Embodiment 3 in that the write-protect state is used, in Embodiment 3, for example, as illustrated in FIG. 19 by surrounding using circles, even when a timing to perform the copy process arrives during a write-protect period of time of one synchronous buffer, the copy process can be executed with respect to the other synchronous buffer and then the copied data can be referenced later by the referrer-side control program. Therefore, it is avoided that, when the timing of the copy process arrives during a write-protect period of time, the data cannot be referenced by the referrer-side control program. In particular, when control programs are executed in parallel by a multicore microprocessor, it is possible that data copied during a write-protect period of time of one synchronous buffer is referenced by a referrer-side control program. Therefore, Embodiment 3 is more advantageous.

<I. Update Flag Type Two-Buffer Interchange Method (Embodiment 4)>

(i1: Overview)

In the above-described Embodiment 3, a description is given of a configuration in which, by setting a synchronous buffer, to which data stored in the global variable area 1 is copied, to the "write-protect" state, synchronization between the synchronous buffer and the global variable area 1 is maintained. In contrast, Embodiments 4 and 5 adopt a configuration in which synchronous buffers are set to a "write destination" state and a "reference destination" state and, by interchanging these states, synchronization between the synchronous buffers and the global variable area 1 is maintained. In particular, in Embodiment 4, an example is given of a configuration in which a latest data update flag is used to control the interchange of the states of the synchronous buffers.

In Embodiment 4, an example is also given of a case where the microprocessor 100 is multicore.

(i2: [Multicore] Control Program Executed by the Same Core as the System Program is an Owner of a Global Variable)

Figure 24:
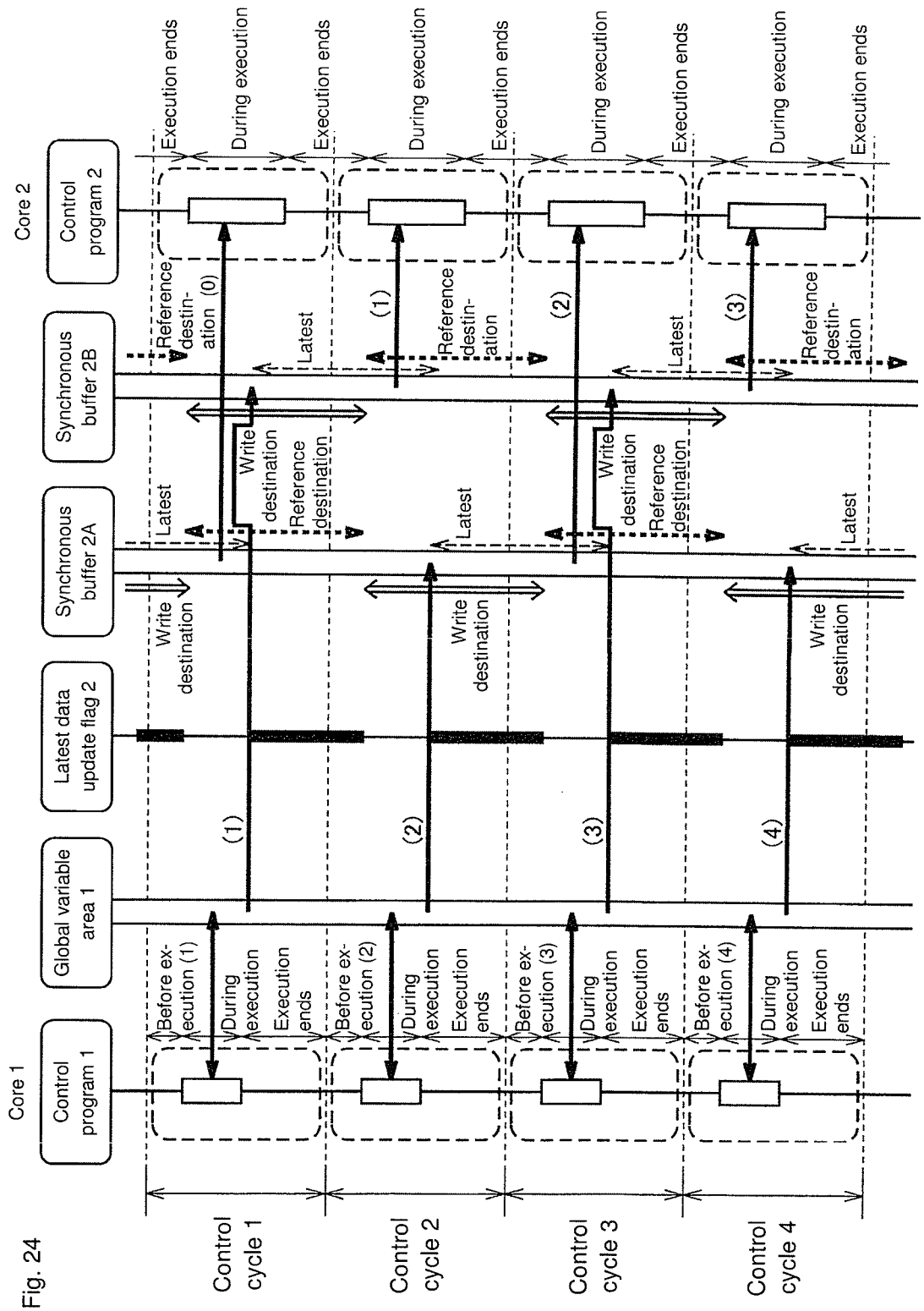
FIG. 24 is a sequence diagram illustrating an execution operation in a multicore microprocessor according to Embodiments 4 and 5.
Figure 25:
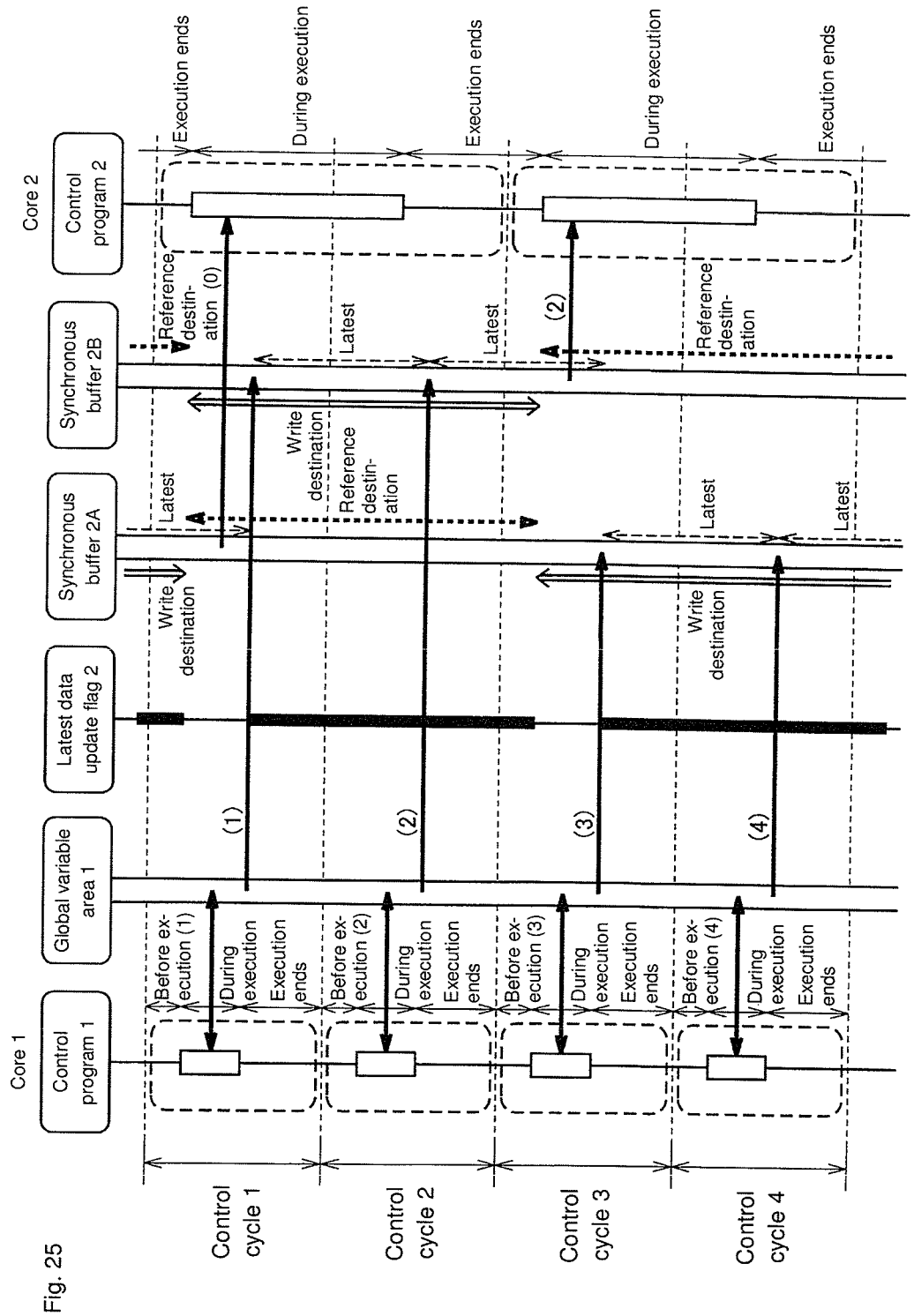
FIG. 25 is a sequence diagram illustrating an execution operation in a multicore microprocessor according to Embodiments 4 and 5.

FIGS. 24 and 25 are sequence diagrams illustrating an execution operation in a multicore microprocessor according to Embodiment 4. More specifically, in FIGS. 24 and 25, a core 1 executes a control program 1 and a core 2 executes a control program 2. In this case, in the core 1, in addition to the control program 1, a system program is also executed. It is assumed that the control program 1 is set to an owner-side control program. FIG. 24 illustrates an example in which an execution cycle of the control program 1 and an execution cycle of the control program 2 are substantially the same and FIG. 25 illustrates an example in which the execution cycle of the control program 1 is shorter than the execution cycle of the control program 2.

FIGS. 24 and 25 are sequence diagrams for commonly describing Embodiment 4 and Embodiment 5 (to be described later). In Embodiment 5 (to be described later), information for identifying a synchronous buffer as a reference destination that stores copied latest data is handled. Therefore, when Embodiment 4 is described with reference to FIGS. 24 and 25, only a "latest data update flag" is focused on, and a "latest state" identification indicated along the time axes of the synchronous buffers 2A and 2B is not needed. On the other hand, when Embodiment 5 is described with reference to FIGS. 24 and 25, only the "latest" state identification indicated along the time axes of the synchronous buffers 2A and 2B is focused on and the "latest data update flag" is not needed.

Further, in FIGS. 24 and 25, the "write destination" state and the "reference destination" state are simply referred to as "write destination" and "reference destination".

A case is considered where the multicore as illustrated in FIGS. 24 and 25 is adopted to execute the control program 1 and the control program 2 in parallel. The control program 2 can be executed at any time in view of resource utilization of the core. However, when it is considered as a PLC, the control program 2 also needs to use an output process and an input process of the system program. Therefore, it is basic to wait for the end of the output process and the input process that are executed at the beginning of each control cycle to start execution of the control program 2.

When the control program 2 does not need to use the output process and input process of the system program, it is also possible to change the design so that the control program 2 is executed without synchronizing the execution cycle of the control program 2 with the control cycle. For example, it is also possible that, when the execution of the control program 2 ends, the next referrer-side start process is immediately performed.

In this case, synchronization between a global variable area 1 and synchronous buffers 2A and 2B is maintained according to steps described in the following.

Figure 26:
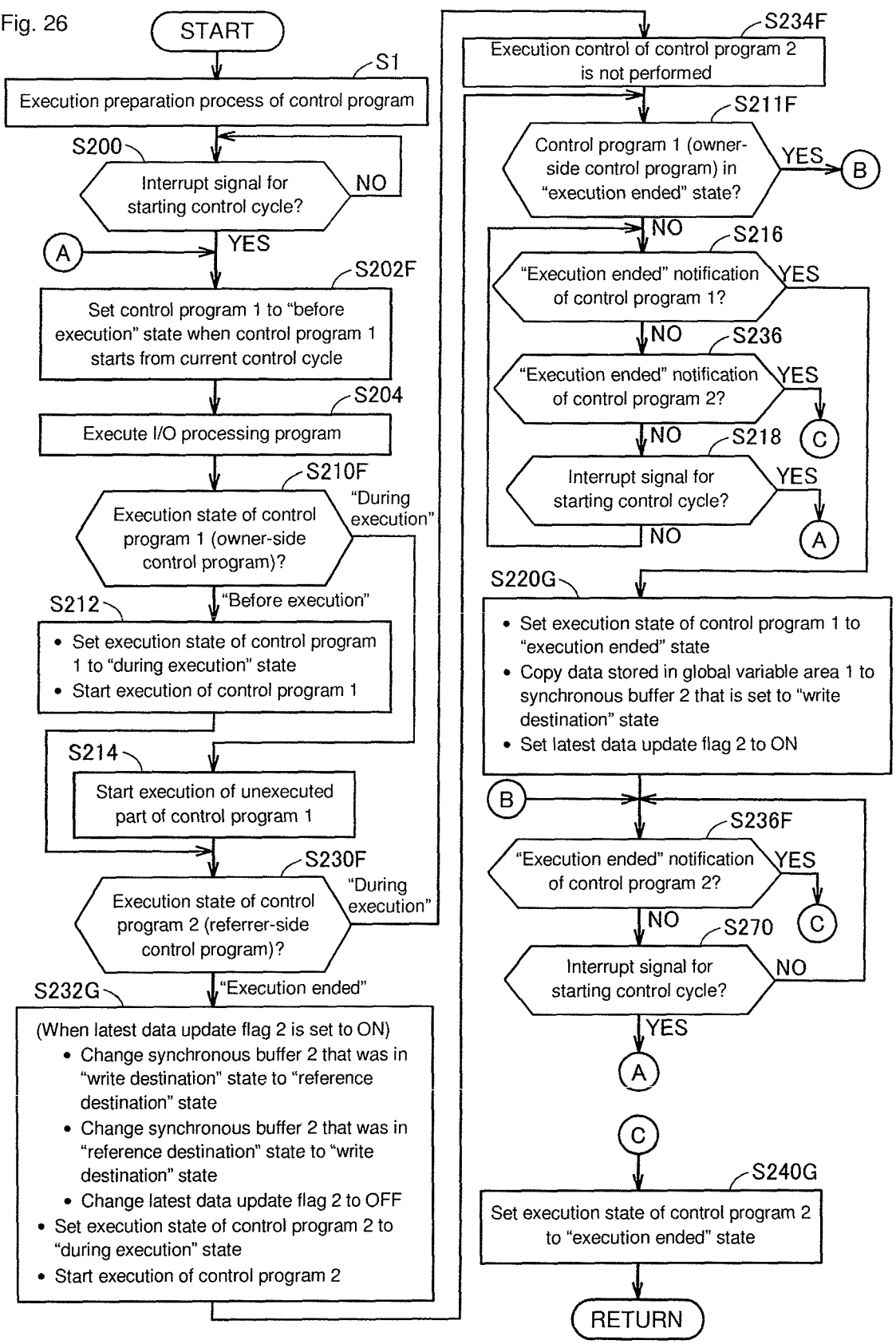
FIG. 26 is a flow chart illustrating an execution operation according to Embodiment 4.

FIG. 26 is a flow chart illustrating an execution operation according to Embodiment 4. The flow chart illustrated in FIG. 26 is applicable to any one of FIGS. 24 and 25. In the flow chart of FIG. 26, a step that executes a substantially same process as in the flow chart illustrated in FIG. 21 is given a same step number as in FIG. 21.

The flow chart illustrated in FIG. 26 is different as compared to the flow chart illustrated in FIG. 21 in that processes of steps S232G, S220G and S240G are executed in place of steps S232D, S220D and S240D, respectively. In the following, the difference is mainly described, and detailed description of other processes is not repeated.

In step S232G that is executed when the control program 2 (referrer-side control program) is in the "execution ended" state ("execution ended" in step S230F), when a latest data update flag 2 is set to ON, the microprocessor 100 (core 1) changes a synchronous buffer 2 (synchronous buffer 2A or 2B) that was in the "write destination" state to the "reference destination" state and changes a synchronous buffer 2 (synchronous buffer 2A or 2B) that was in the "reference destination" state to the "write destination" state, and then changes the latest data update flag 2 from ON to OFF.

When the latest data update flag 2 is not set to ON (when the latest data update flag 2 is set to OFF), the "write destination" state and "reference destination" state of the synchronous buffers 2 are not changed and the latest data update flag 2 is also maintained as OFF.

Further, the microprocessor 100 (core 1) sets the execution state of the control program 2 to the "during execution" state and causes the core 2 to start execution of the control program 2 (step S232G).

In step S220G that is executed when an "execution ended" notification of the control program 1 is received (YES in step S216), the microprocessor 100 sets the execution state of the control program 1 to the "execution ended" state and then copies data stored in the global variable area 1 to a synchronous buffer 2 (synchronous buffer 2A or synchronous buffer 2B) that is set to the "write destination" state and sets the latest data update flag 2 to ON (step S220G).

In step S240G that is executed when an "execution ended" notification of the control program 2 is received (YES in step S236 or YES in step S236F), the microprocessor 100 sets the execution state of the control program 2 to the "execution ended" state (step S240G).

The above-described states of a synchronous buffer, that is, the write destination state and the reference destination state, are indicated by recording in a write destination state recording area and a reference destination state recording area, respectively, that the corresponding synchronous buffer is in the write destination state and the reference destination state. These recording areas are generated in the control program work area 1042 in the main memory 104 by the system program 210 in the "execution preparation process of a control program" (step S1 illustrated in FIG. 5). A mode of the recording that a synchronous buffer is in the write destination state or the reference destination state can be suitably determined. For example, modes can be adopted such as that in which information (such as an identification number of a group of synchronous buffers) that identifies a group that is in the write destination state or the reference destination state among the groups of synchronous buffers that are grouped in units for each of which the collective copying process is performed, and that in which, for each of the groups of the synchronous buffers, a flag or state variable that indicates whether the group is in the write destination state or the reference destination state is provided and a value of the flag or state variable is recorded. For one synchronous buffer, the write destination state and the reference destination state are set so that they do not overlap. Therefore, it is also possible to generate a common state recording area without dividing it into the write destination state recording area and the reference destination state recording area and use one flag or state variable to indicate whether the synchronous buffer is in the write destination state or the reference destination state.

Of a vertical line (line along the time axis) of the latest data update flag illustrated in the sequence diagram according to Embodiment 4, a thick line portion indicates that the latest data update flag is ON.

The latest data update flag is generated in the control program work area 1042 in the main memory 104 by the system program 210 in the "execution preparation process of a control program" (step S1 illustrated in FIG. 5). The latest data update flag is provided for each group of synchronous buffers that are grouped in units for each of which the collective copying process is performed.

(i3: [Multicore] Control Program Executed by a Different Core as the System Program is an Owner of a Global Variable)

Next, an example is given of a case where, when the microprocessor 100 is multicore, a control program that is executed by a core that is different from a core that executes the system program is set as an owner-side control program.

Figure 27:
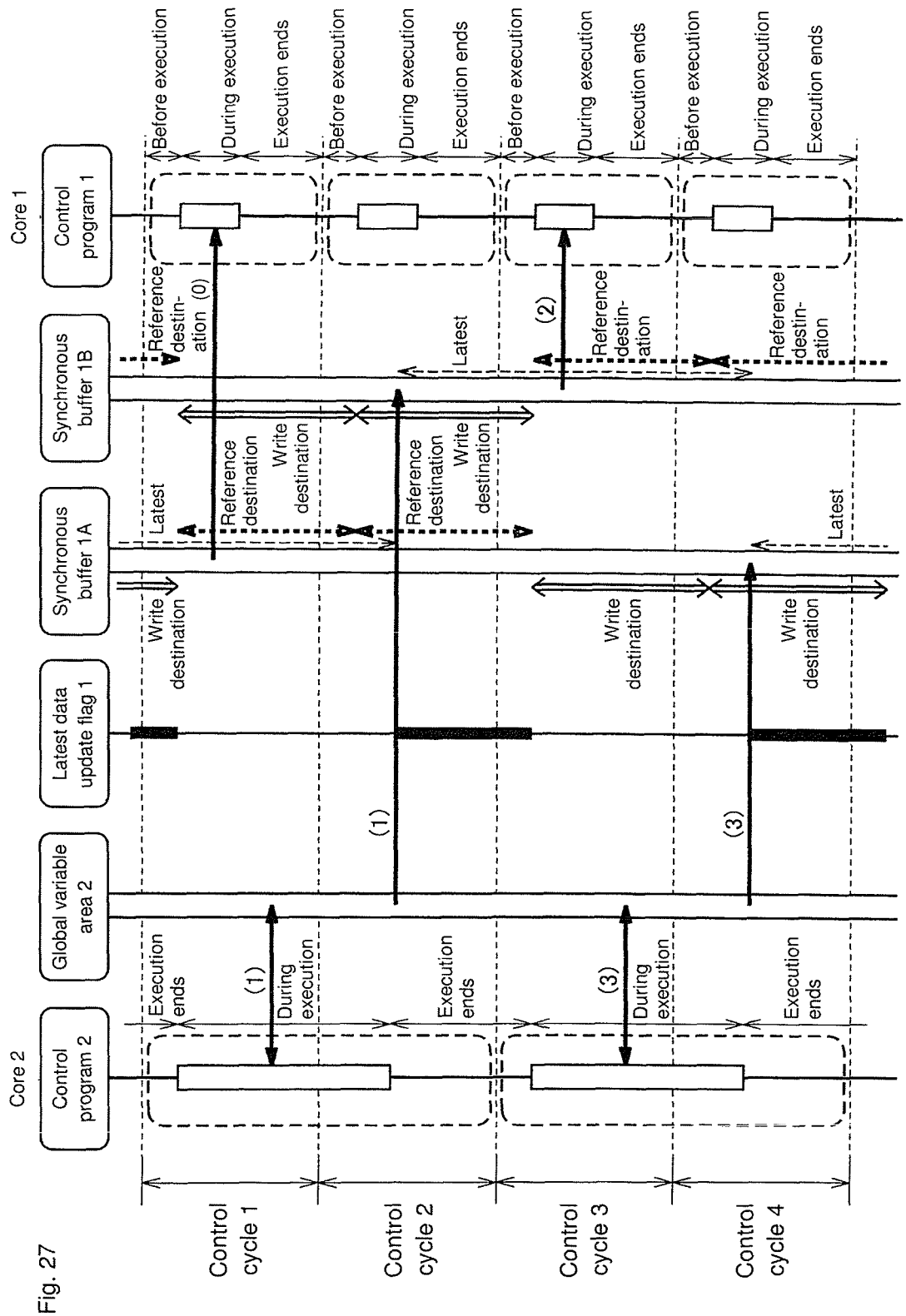
FIG. 27 is a sequence diagram illustrating another execution operation in a multicore microprocessor according to Embodiments 4 and 5.

FIG. 27 is a sequence diagram illustrating another execution operation in a multicore microprocessor according to Embodiment 4. In the sequence diagram illustrated in FIG. 27, it is assumed that a control program 2 that is executed by a core 2 is set as an owner-side control program. Similar to the above-described FIGS. 24 and 25, FIG. 27 is a sequence diagram for commonly describing Embodiment 4 and Embodiment 5 (to be described later). Therefore, when Embodiment 4 is described with reference to FIG. 27, only a "latest data update flag" is focused on, and a "latest state" identification indicated along the time axes of synchronous buffers 2A and 2B is not needed. On the other hand, when Embodiment 5 is described with reference to FIG. 27, only the "latest" identification indicated along the time axes of the synchronous buffers 2A and 2B is focused on and the "latest data update flag" is not needed.

Figure 28:
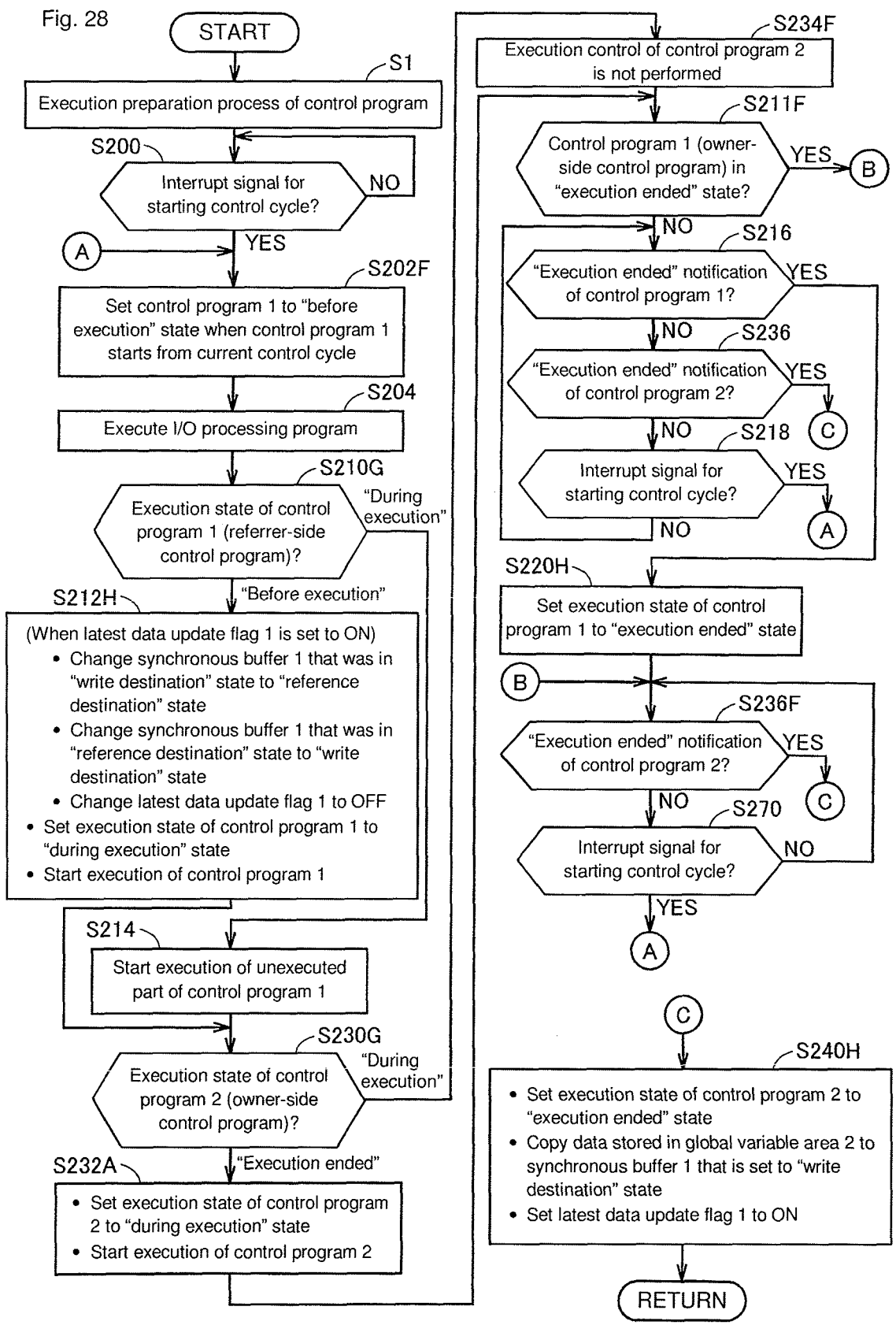
FIG. 28 is a flow chart illustrating another execution operation according to Embodiment 4.

FIG. 28 is a flow chart illustrating another execution operation according to Embodiment 4. In the flow chart of FIG. 28, a step that executes a same process as in the flow chart illustrated in FIG. 23 is given a same step number as in FIG. 23.

The flow chart illustrated in FIG. 28 is different as compared to the flow chart illustrated in FIG. 23 in that processes of steps S212H, S220H and S240H are executed in place of steps S212E, S220E and S240E, respectively. In the following, the difference is mainly described, and detailed description of other processes is not repeated.

In step S212H that is executed when the control program 1 (referrer-side control program) is in the "before execution" state ("before execution" in step S210G), when a latest data update flag 1 is set to ON, the microprocessor 100 (core 1) changes a synchronous buffer 1 (synchronous buffer 1A or 1B) that was in the "write destination" state to the "reference destination" state and changes a synchronous buffer 1 (synchronous buffer 1A or 1B) that was in the "reference destination" state to the "write destination" state, and then changes the latest data update flag 1 from ON to OFF.

When the latest data update flag 1 is not set to ON (when the latest data update flag 1 is set to OFF), the "write destination" state and "reference destination" state of the synchronous buffers 1 are not changed and the latest data update flag 1 is also maintained as OFF.

Further, the microprocessor 100 (core 1) sets the execution state of the control program 1 to the "during execution" state and starts execution of the control program 1 (step S212H).

In step S220H that is executed when an "execution ended" notification of the control program 1 is received (YES in step S216), the microprocessor 100 sets the execution state of the control program 1 to the "execution ended" state (step S220H).

In step S240H that is executed when an "execution ended" notification of the control program 2 is received (YES in step S236 or YES in step S236F), the microprocessor 100 sets the execution state of the control program 2 to the "execution ended" state and then copies data stored in the global variable area 2 to a synchronous buffer 1 (synchronous buffer 1A or synchronous buffer 1B) that is set to the "write destination" state and sets the latest data update flag 1 to ON (step S240H).

(i4: Summary)

As described above, in Embodiment 4, the system program 210 includes the following processes (1)-(3) as an execution preparation process of the control program 230.

(1) A process in which the global variable area 1042a storing a global variable is generated in the memory means (basically, the main memory 104).

(2) A process in which, with respect to each referrer-side control program and for each global variable that is referenced from the referrer-side control program, a first synchronous buffer and a second synchronous buffer that serve as a reference destination in place of the global variable area when the referrer-side control program references the global variable are generated in the memory means (basically, the main memory 104) as a group of synchronous buffers (synchronous buffers 1A and 1B, or, synchronous buffer 2A or 2B).

(3) A process in which, for each combination of an owner-side control program and a referrer-side control program that are associated by a global variable, a latest data update flag is generated in the memory means (basically, the main memory 104).

The first synchronous buffer and the second synchronous buffer are each set to, in a non-overlapping manner, one of the "write destination" state in which a global variable can be copied from the global variable area to a synchronous buffer and the "reference destination" state in which a synchronous buffer can be referenced from a referrer-side control program.

Further, the system program 210 includes the following processes (1)-(3) as an execution control process of the control program 230.

(1) An owner-side start process (step S212 in FIG. 26 and step S232A in FIG. 28) that starts execution of an owner-side control program.

(2) A copy process (step S220G in FIG. 26 and step S240H in FIG. 28) that, when execution of an owner-side control program ends, copies a global variable that is rewritten by the owner-side control program from a global variable area to a synchronous buffer that corresponds to the global variable and that is in the write destination state, and further executes a process in which a latest data update flag related to this copy process is set to ON.

(3) A referrer-side start process (step S232G in FIG. 26 and step S212H in FIG. 28) that starts execution of a referrer-side control program, and, with respect to synchronous buffers of the referrer-side control program of which execution is started, under a condition that a synchronous buffer storing the latest data is in the write destination state (that is, under a condition that a latest data update flag related to the synchronous buffers of the referrer-side control program of which execution is started is ON), further executes a third interchange process in which the write destination state and the reference destination state of a synchronous buffer that is in the write destination state and a synchronous buffer that is in the reference destination state are interchanged, and a process in which the latest data update flag that is in the ON state is set to OFF.

According to the above-described Embodiment 4, with respect to each referrer-side control program and for each global variable that is referenced from the referrer-side control program, there are two synchronous buffers, and in the referrer-side start process, except a short period of time during which the interchange process (third interchange process) of the write destination state and the reference destination state of the synchronous buffers is performed, there is always one of the two synchronous buffer that is in the write destination state. Therefore, the copy process can be performed at any time. Further, the synchronous buffer storing the latest data that is copied based on the state of the latest data update flag when the execution of the referrer-side control program starts is used as the reference destination. Thereby, the referrer-side control program can reference the value of the global variable that is the latest when the execution of the referrer-side control program starts.

<J. Latest Data Type Two-Buffer Interchange Method (Embodiment 5)>

(j1: Overview)

As described above, in Embodiment 5, information for identifying a synchronous buffer as a reference destination that stores copied latest data is handled.

(j2: [Multicore] Control Program Executed by the Same Core as the System Program is an Owner of a Global Variable)

An execution operation in a multicore microprocessor according to Embodiment 5 is illustrated in the sequence diagrams of the above-described FIGS. 24 and 25. However, FIGS. 24 and 25 are sequence diagrams for commonly describing Embodiment 5 and the above-described Embodiment 4. In Embodiment 5, only the "latest" state identification indicated along the time axes of the synchronous buffers 2A and 2B is focused on and the "latest data update flag" is not needed.

Figure 29:
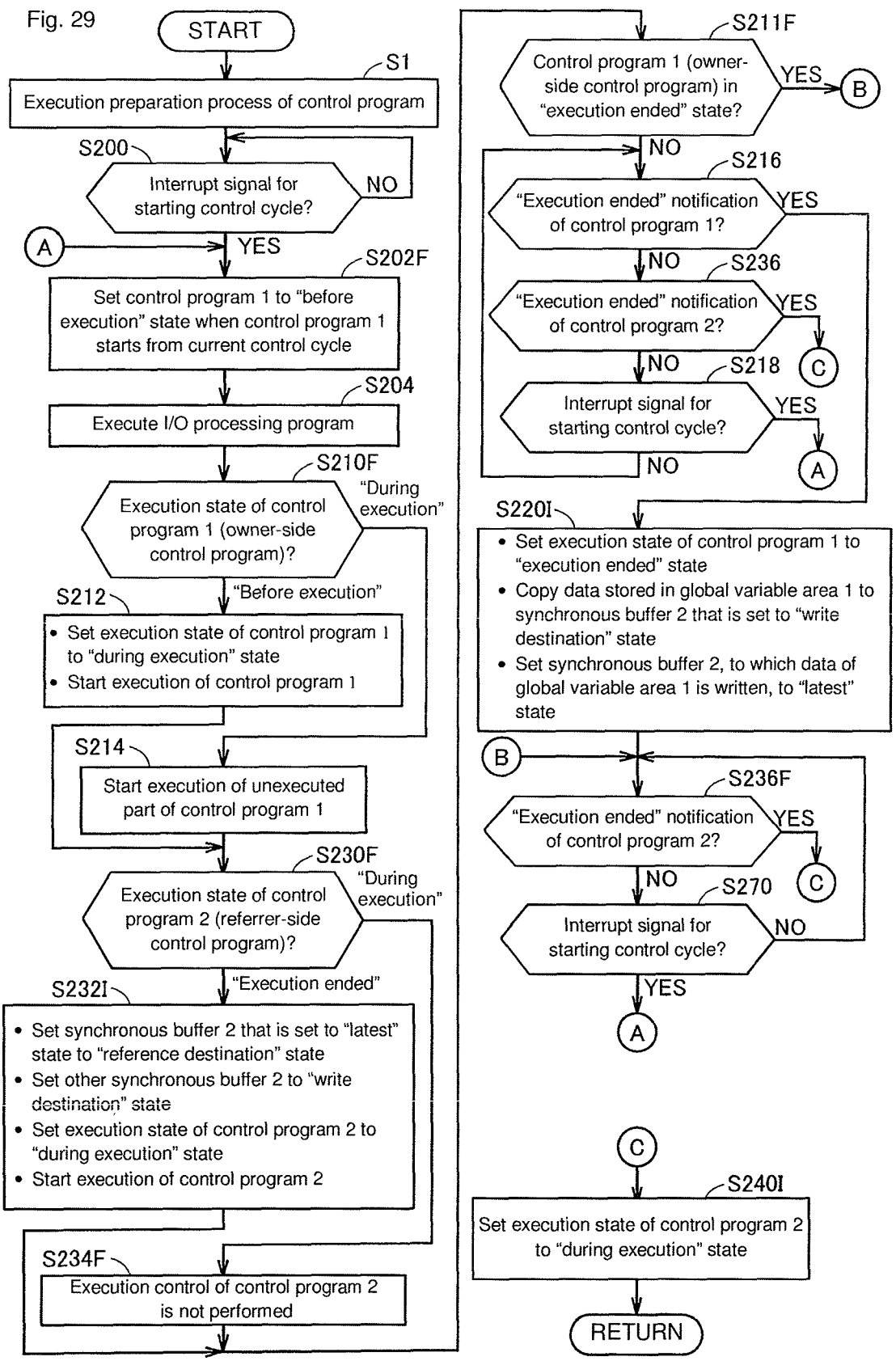
FIG. 29 is a flow chart illustrating an execution operation according to Embodiment 5.

FIG. 29 is a flow chart illustrating an execution operation according to Embodiment 5. The flow chart illustrated in FIG. 29 is applicable to any one of FIGS. 24 and 25. In the flow chart of FIG. 29, a step that executes a substantially same process as in the flow chart illustrated in FIG. 21 is given a same step number as in FIG. 21.

The flow chart illustrated in FIG. 29 is different as compared to the flow chart illustrated in FIG. 21 in that processes of steps S232I, S220I and S240I are executed in place of steps S232D, S220D and S240D, respectively. In the following, the difference is mainly described, and detailed description of other processes is not repeated.

In step S232I that is executed when the control program 2 (referrer-side control program) is in the "execution ended" state ("execution ended" in step S230F), the microprocessor 100 sets the synchronous buffer 2 (synchronous buffer 2A or synchronous buffer 2B) that is set to the "latest" state to the "reference destination" state of the control program 2 (referrer-side control program) and sets the other synchronous buffer 2 to the "write destination" state, and further sets the execution state of the control program 2 to the "during execution" state and starts execution of the control program 2 (step S232I).

In step S220I that is executed when an "execution ended" notification of the control program 1 is received (YES in step S216), the microprocessor 100 sets the execution state of the control program 1 to the "execution ended" state and then copies data stored in the global variable area 1 to the synchronous buffer 2 (synchronous buffer 2A or synchronous buffer 2B) that is set to the "write destination" state and sets the synchronous buffer 2, to which data stored in the global variable area 1 is written, to the "latest" state (step S220I).

In step S240I that is executed when an "execution ended" notification of the control program 2 is received (YES in step S236 or YES in step S236F), the microprocessor 100 sets the execution state of the control program 2 to the "execution ended" state (step S240I).

The above-described states of a synchronous buffer, that is, the write destination state, the reference destination state and the latest state, are indicated by recording in a write destination state recording area, a reference destination state recording area and a latest state recording area, respectively, that the corresponding synchronous buffer is in the write destination state, the reference destination state and the latest state. These recording areas are generated in the control program work area 1042 in the main memory 104 by the system program 210 in the "execution preparation process of a control program" (step S1 illustrated in FIG. 5). A mode of the recording that a synchronous buffer is in the write destination state, the reference destination state or the latest state can be suitably determined. For example, modes can be adopted such as that in which information (such as an identification number of a group of synchronous buffers) that identifies a group that is in the write destination state, the reference destination state or the latest state among the groups of synchronous buffers that are grouped in units for each of which the collective copying process is performed, and that in which, for each of the groups of the synchronous buffers, a flag or state variable that indicates whether the group is in the write destination state, the reference destination state or the latest state is provided and a value of the flag or state variable is recorded. For one synchronous buffer, the write destination state and the reference destination state are set so that they do not overlap. Therefore, it is also possible to generate a common state recording area without dividing it into the write destination state recording area and the reference destination state recording area and use one flag or state variable to indicate whether the synchronous buffer is in the write destination state or the reference destination state.

(j3: [Multicore] Control Program Executed by a Different Core from the System Program is an Owner of a Global Variable)

Next, an example is given of a case where, when the microprocessor 100 is multicore, a control program that is executed by a core that is different from a core that executes the system program is set as an owner-side control program.

Another execution operation in a multicore microprocessor according to Embodiment 5 is illustrated in the sequence diagrams of the above-described FIG. 27. However, FIG. 27 is a sequence diagram for commonly describing Embodiment 5 and the above-described Embodiment 4. In Embodiment 5, only the "latest" state identification indicated along the time axes of the synchronous buffers 2A and 2B is focused on and the "latest data update flag" is not needed.

Figure 30:
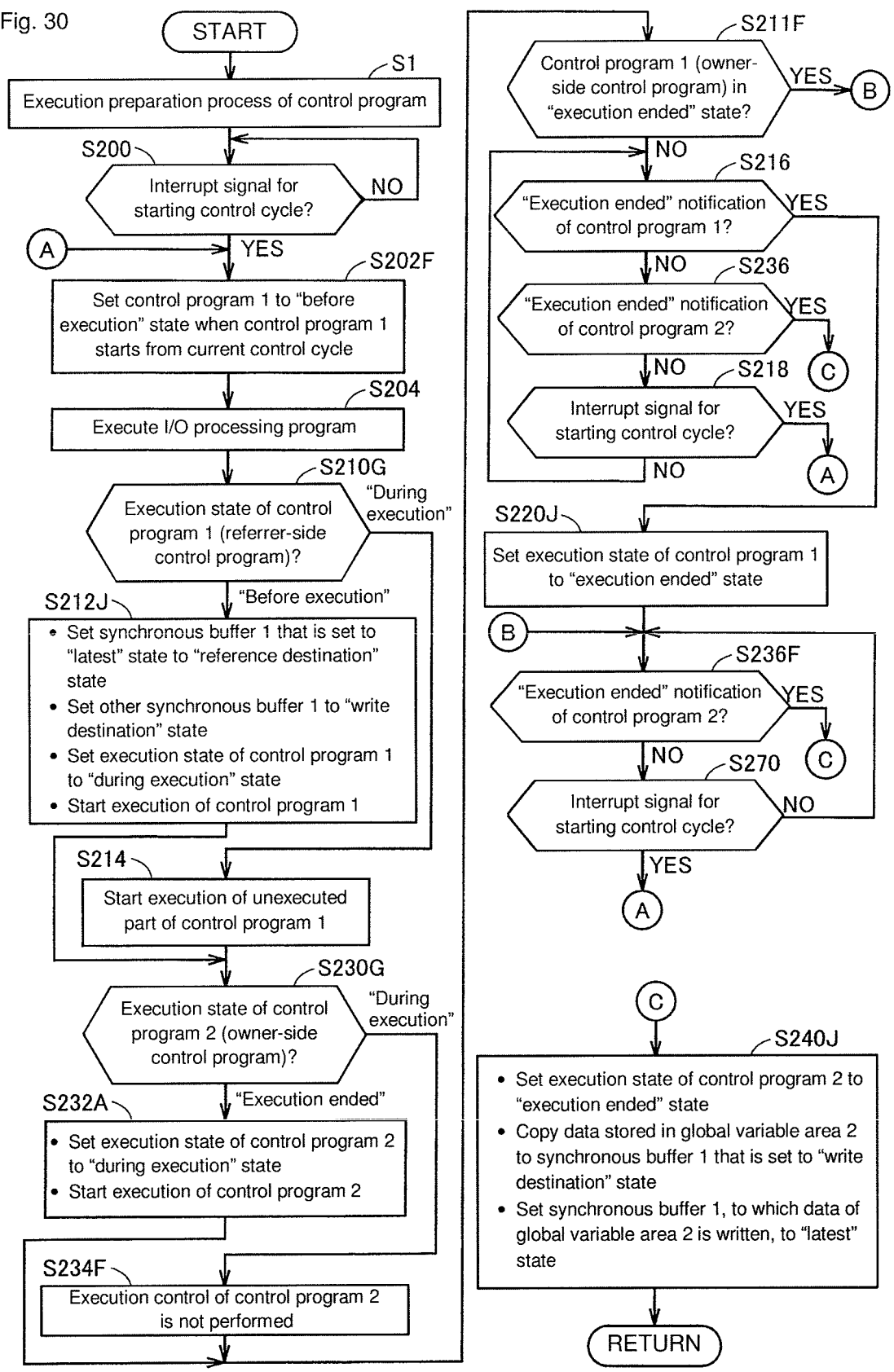
FIG. 30 is a flow chart illustrating another execution operation according to Embodiment 5.

FIG. 30 is a flow chart illustrating another execution operation according to Embodiment 5. In the flow chart of FIG. 30, a step that executes a same process as in the flow chart illustrated in FIG. 23 is given a same step number as in FIG. 23.

The flow chart illustrated in FIG. 30 is different as compared to the flow chart illustrated in FIG. 23 in that processes of steps S212J, S220J and S240J are executed in place of steps S212E, S220E and S240E, respectively. In the following, the difference is mainly described, and detailed description of other processes is not repeated.

In step S212J that is executed when the control program 1 (referrer-side control program) is in the "before execution" state ("before execution" in step S210G), the microprocessor 100 (core 1) sets the synchronous buffer 1 (synchronous buffer 1A or synchronous buffer 1B) that is set to the "latest" state to the "reference destination" state of the control program 1 (referrer-side control program) and sets the other synchronous buffer 1 to the "write destination" state, and further sets the execution state of the control program 1 to the "during execution" state and starts execution of the control program 1 (step S212J).

In step S220J that is executed when an "execution ended" notification of the control program 1 is received (YES in step S216), the microprocessor 100 sets the execution state of the control program 1 to the "execution ended" state (step S220J).

In step S240J that is executed when an "execution ended" notification of the control program 1 is received (YES in step S236 or YES in step S236F), the microprocessor 100 sets the execution state of the control program 2 to the "execution ended" state and then copies data stored in the global variable area 2 to the synchronous buffer 1 (synchronous buffer 1A or synchronous buffer 1B) that is set to the "write destination" state and sets the synchronous buffer 1, to which data stored in the global variable area 1 is written, to the "latest" state (step S240J).

(j4: Summary)

As described above, in Embodiment 5, the system program 210 includes the following processes (1)-(3) as an execution preparation process of the control program 230.

(1) A process in which the global variable area 1042*a* storing a global variable is generated in the memory means (basically, the main memory 104).

(2) A process in which, with respect to each referrer-side control program and for each global variable that is referenced from the referrer-side control program, a first synchronous buffer and a second synchronous buffer that serve as a reference destination in place of the global variable area when the referrer-side control program references the global variable are generated in the memory means as a group of synchronous buffers (synchronous buffers 1A and 1B, or, synchronous buffer 2A or 2B).

(3) A process generating a latest state recording area in the memory means (basically, the main memory 104).

The first synchronous buffer and the second synchronous buffer are each set to, in a non-overlapping manner, one of the "write destination" state in which a global variable can be copied from the global variable area to a synchronous buffer and the "reference destination" state in which a synchronous buffer can be referenced from a referrer-side control program.

Further, the system program 210 includes the following processes (1)-(3) as an execution control process of the control program 230.

(1) An owner-side start process (step S212 in FIG. 29 and step S232A in FIG. 30) that starts execution of an owner-side control program.

(2) A copy process (step S220I in FIG. 29 and step S240J in FIG. 30) that, when execution of an owner-side control program ends, copies a global variable that is rewritten by the owner-side control program from a global variable area to a synchronous buffer that corresponds to the global variable and that is the write destination state, and further executes a process in which that the synchronous buffer as a copy destination is in the latest state is recorded in a latest state recording area.

(3) A referrer-side start process (step S232I in FIG. 29 and step S212J in FIG. 30) that starts execution of a referrer-side control program and, with respect to synchronous buffers of the referrer-side control program of which execution is started, under a condition that a synchronous buffer that is in the latest state that is identified according to content of a latest state recording area is in the write destination state; further executes a third interchange process in which the write destination state and the reference destination state of a synchronous buffer that is in the write destination state and a synchronous buffer that is in the reference destination state are interchanged.

The referrer-side start process can also be described as follows, that is, a referrer-side start process that starts execution of a referrer-side control program and further executes a process in which a synchronous buffer that is in the latest state that is identified according to content of a latest state recording area is set to the reference destination state in which the synchronous buffer is referenced by the referrer-side control program during execution, and the other synchronous buffer that belongs to the same group as the synchronous buffer that is set to the reference destination state is set to the write destination state.

According to the above-described Embodiment 5, with respect to each referrer-side control program and for each global variable that is referenced from the referrer-side control program, there are two synchronous buffers, and in the referrer-side start process, except a short period of time during which the interchange process (third interchange process) of the write destination state and the reference destination state of the synchronous buffers is performed, there is always one of the two synchronous buffers that is in the write destination state. Therefore, the copy process can be performed at any time. Further, the synchronous buffer storing the latest data that is copied based on the content of the latest state recording area when the execution of the referrer-side control program starts is used as the reference destination. Thereby, the referrer-side control program can reference the value of the global variable that is the latest when the execution of the referrer-side control program starts.

<K. Update Flag Type Three-Buffer Interchange Method (Embodiment 6)>

(k1: Overview)

In the above-described Embodiment 4, an example is given of a configuration in which a latest data update flag is used to store data in two synchronous buffers. In Embodiment 6, an example is given of a configuration in which data is stored in three synchronous buffers. That is, an example is given of a configuration in which the configuration of Embodiment 4 is expanded to include three synchronous buffers.

In Embodiment 6, an example is also given of a case where the microprocessor 100 is multicore.

(k2: [Multicore] Control Program Executed by the Same Core as the System Program is an Owner of a Global Variable)

Figure 31:
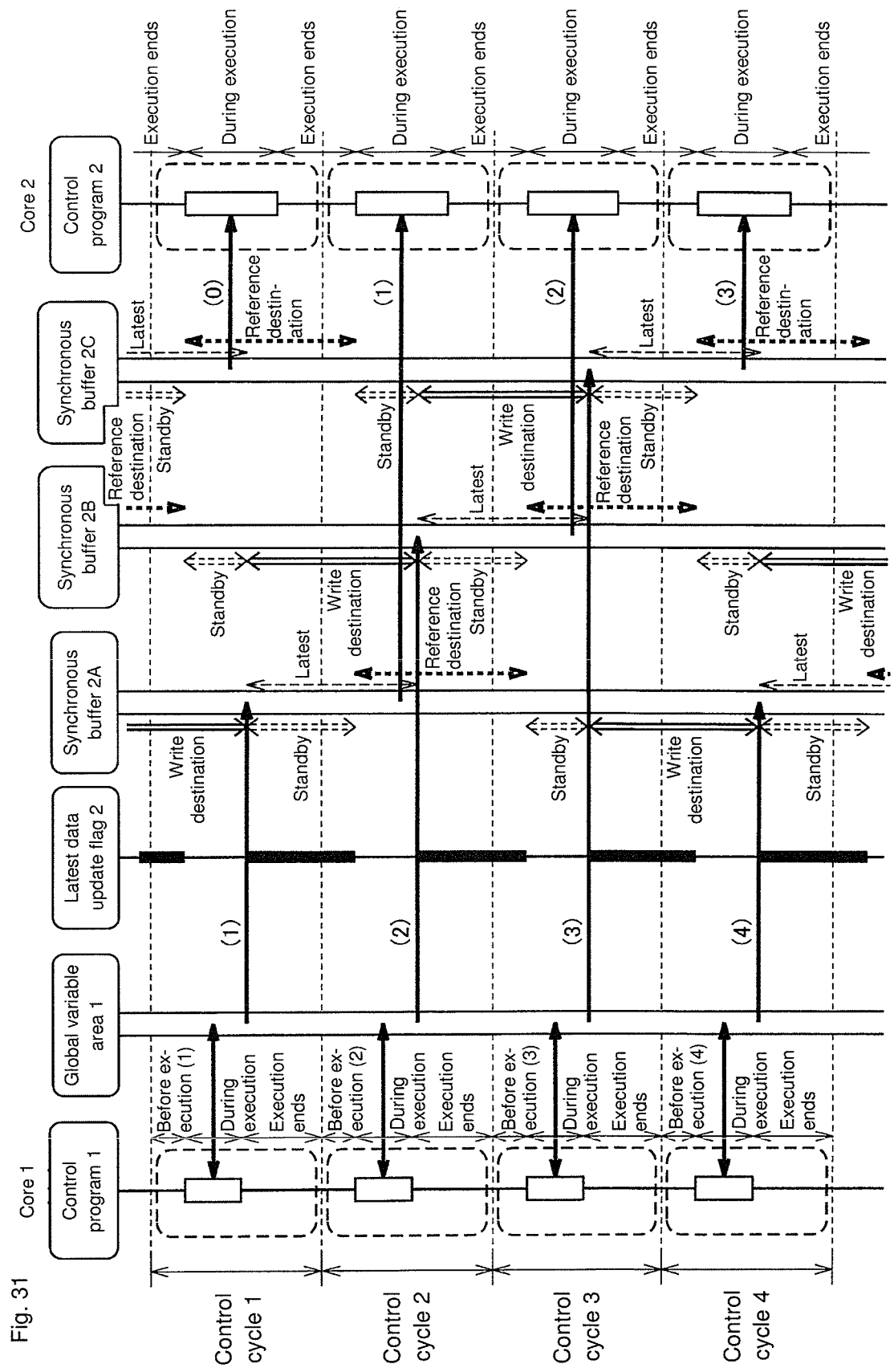
FIG. 31 is a sequence diagram illustrating an execution operation in a multicore microprocessor according to Embodiments 6 and 7.
Figure 32:
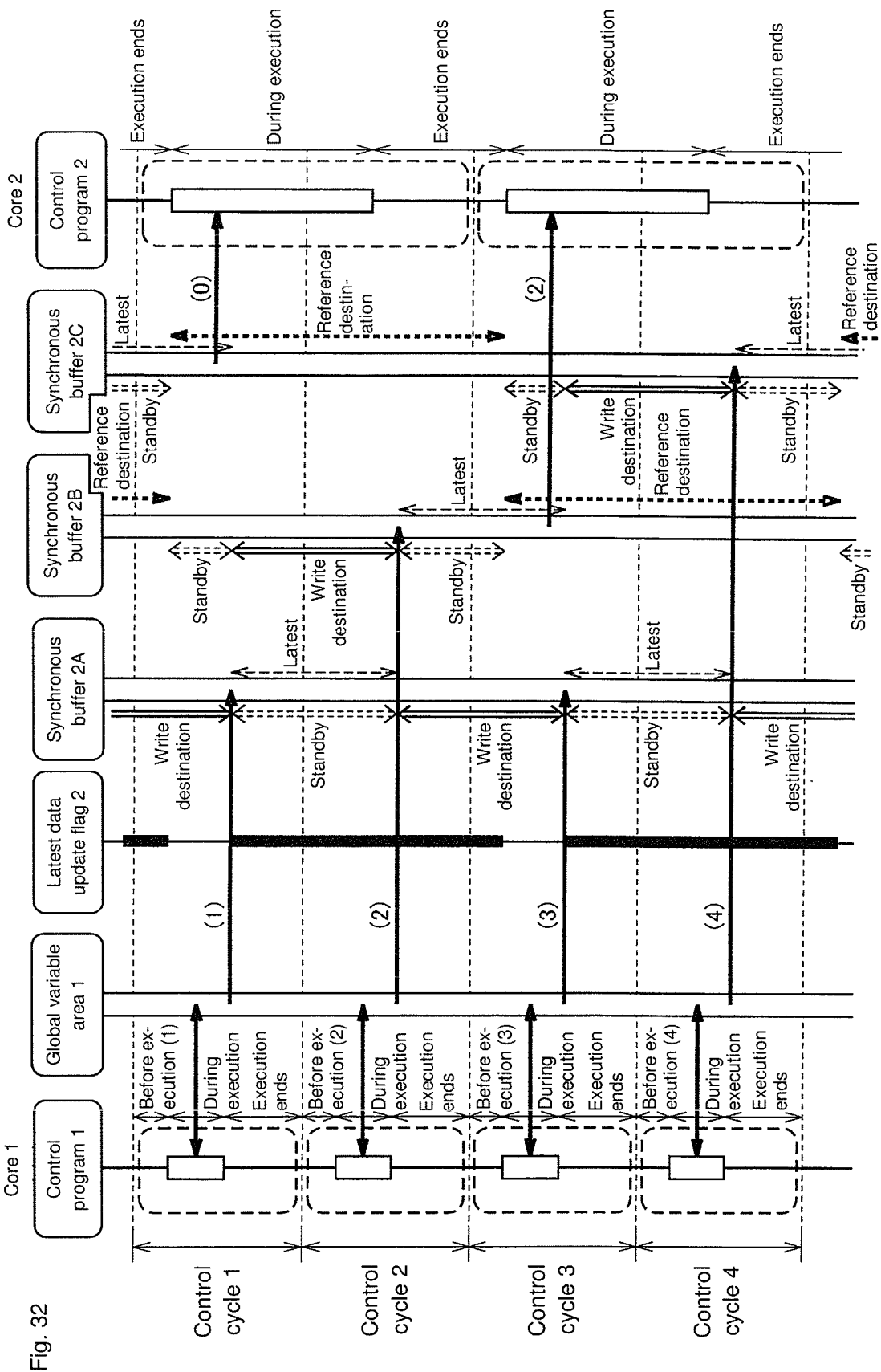
FIG. 32 is a sequence diagram illustrating an execution operation in a multicore microprocessor according to Embodiments 6 and 7.

FIGS. 31 and 32 are sequence diagrams illustrating an execution operation in a multicore microprocessor according to Embodiment 6. More specifically, in FIGS. 31 and 32, a core 1 executes a control program 1 and a core 2 executes a control program 2. In this case, in the core 1, in addition to the control program 1, a system program is also executed. It is assumed that the control program 1 is set to an owner-side control program. FIG. 31 illustrates an example in which an execution cycle of the control program 1 and an execution cycle of the control program 2 are substantially the same and FIG. 32 illustrates an example in which the execution cycle of the control program 1 is shorter than the execution cycle of the control program 2.

As illustrated in FIGS. 31 and 32, in Embodiment 6, a global variable area 1 is associated with the control program 1 and synchronous buffers 2A, 2B, and 2C are associated with the control program 2.

FIGS. 31 and 32 are sequence diagrams for commonly describing Embodiment 6 and Embodiment 7 (to be described later). Embodiment 7 (to be described later) corresponds a configuration in which the configuration of Embodiment 5 is expanded to include three synchronous buffers, and handles information for identifying a synchronous buffer as a reference destination that stores copied latest data. Therefore, when Embodiment 6 is described with reference to FIGS. 31 and 32, only a "latest data update flag" is focused on, and a "latest" state identification indicated along time axes of the synchronous buffers 2A, 2B, and 2C is not needed. On the other hand, when Embodiment 7 is described with reference to FIGS. 31 and 32, only the "latest" state identification indicated along the time axes of the synchronous buffers 2A, 2B, and 2C is focused on and the "latest data update flag" is not needed.

Further, in FIGS. 31 and 32, the "write destination" state and the "reference destination" state are simply referred to as "write destination" and "reference destination".

A case is considered where the multicore as illustrated in FIGS. 31 and 32 is adopted to execute the control program 1 and the control program 2 in parallel. The control program 2 can be executed at any time in view of resource utilization of the core. However, when it is considered as a PLC, the control program 2 also needs to use an output process and an input process of the system program. Therefore, it is basic to wait for the end of the output process and the input process that are executed at the beginning of each control cycle to start execution of the control program 2.

When the control program 2 does not need to use the output process and input process of the system program, it is also possible to change the design so that the control program 2 is executed without synchronizing the execution cycle of the control program 2 with the control cycle. For example, it is also possible that, when the execution of the control program 2 ends, the next referrer-side start process is immediately performed.

In this case, synchronization between a global variable area 1 and synchronous buffers 2A and 2B is maintained according to steps described in the following.

Figure 33:
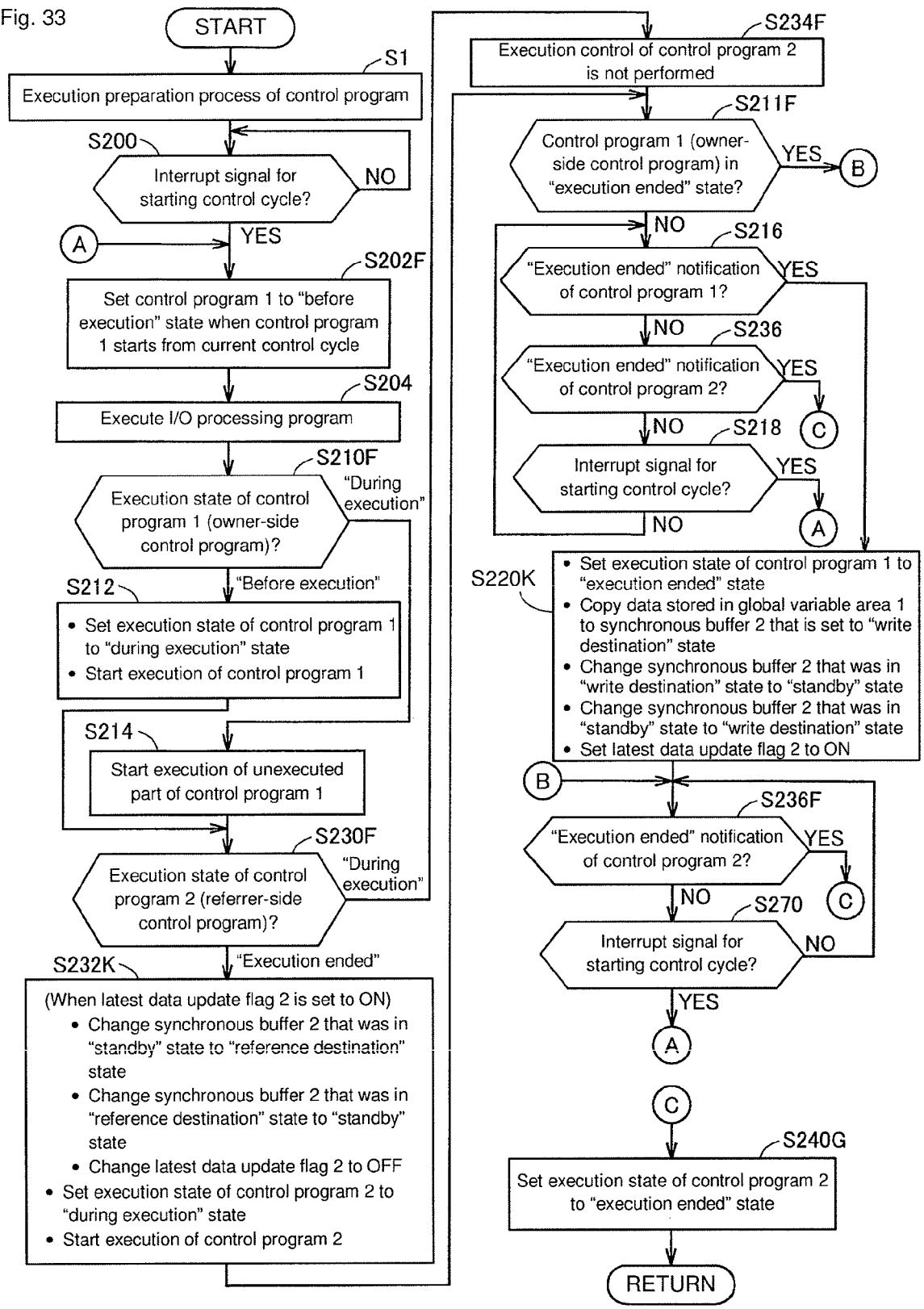
FIG. 33 is a flow chart illustrating an execution operation according to Embodiment 6.

FIG. 33 is a flow chart illustrating an execution operation according to Embodiment 6. The flow chart illustrated in FIG. 33 is applicable to any one of FIGS. 31 and 32. In the flow chart of FIG. 33, a step that executes a substantially same process as in the flow chart illustrated in FIG. 26 is given a same step number as in FIG. 26.

The flow chart illustrated in FIG. 33 is different as compared to the flow chart illustrated in FIG. 26 in that processes of steps S232K and S220K are executed in place of steps S232G and S220G, respectively. In the following, the difference is mainly described, and detailed description of other processes is not repeated.

In step S232K that is executed when the control program 2 (referrer-side control program) is in the "execution ended" state ("execution ended" in step S230F), when a latest data update flag 2 is set to ON, the microprocessor 100 changes a synchronous buffer 2 (one of the synchronous buffers 2A, 2B, and 2C) that was in the "standby" state to the "reference destination" state and changes a synchronous buffer 2 (one of the synchronous buffers 2A, 2B, and 2C) that was in the "reference destination" state to the "standby" state, and then changes the latest data update flag 2 from ON to OFF.

When the latest data update flag 2 is not set to ON (when the latest data update flag 2 is set to OFF), the "standby" state and "reference destination" state of the synchronous buffers 2 are not changed and the latest data update flag 2 is also maintained as OFF.

Further, the microprocessor 100 (core 1) sets the execution state of the control program 2 to the "during execution" state and causes the core 2 to start execution of the control program 2 (step S232K).

In step S220K that is executed when an "execution ended" notification of the control program 1 is received (YES in step S216), the microprocessor 100 sets the execution state of the control program 1 to the "execution ended" state and then copies data stored in the global variable area 1 to a synchronous buffer 2 (one of the synchronous buffers 2A, 2B, and 2C) that is set to the "write destination" state. Further, the microprocessor 100 changes a synchronous buffer 2 (one of the synchronous buffers 2A, 2B, and 2C) that was in the "write destination" state to the "standby" state and changes a synchronous buffer 2 (one of the synchronous buffers 2A, 2B, and 2C) that was in the "standby" state to the "write destination" state, and then sets the latest data update flag 2 to ON (step S220K).

The above-described states of a synchronous buffer, that is, the write destination state, the reference destination state and the standby state of a synchronous buffer, are indicated by recording in a write destination state recording area, a reference destination state recording area and a standby state recording area, respectively, that the corresponding synchronous buffer is in the write destination state, the reference destination state and the standby state. These recording areas are generated in the control program work area 1042 in the main memory 104 by the system program 210 in the "execution preparation process of a control program" (step S1 illustrated in FIG. 5). A mode of the recording that a synchronous buffer is in the write destination state, the reference destination state or the standby state can be suitably determined. For example, modes can be adopted such as that in which information (such as an identification number of a group of synchronous buffers) that identifies a group that is in the write destination state, the reference destination state or the standby state among the groups of synchronous buffers that are grouped in units for each of which the collective copying process is performed, and that in which, for each of the groups of the synchronous buffers, a flag or state variable that indicates whether the group is in the write destination state, the reference destination state or the standby state is provided and a value of the flag or state variable is recorded. For one synchronous buffer, the write destination state, the reference destination state and the standby state are set so that they do not overlap. Therefore, it is also possible to generate a common state recording area without dividing it into recording areas of these states and use one group of flags or one state variable to indicate which state the synchronous buffer is in.

Of a vertical line (line along the time axis) of the latest data update flag illustrated in the sequence diagram according to Embodiment 6, a thick line portion indicates that the latest data update flag is ON.

The latest data update flag is generated in the control program work area 1042 in the main memory 104 by the system program 210 in the "execution preparation process of a control program" (step S1 illustrated in FIG. 5). The latest data update flag is provided for each group of synchronous buffers that are grouped in units for each of which the collective copying process is performed.

(k3: [Multicore] Control Program Executed by a Different Core from the System Program is an Owner of a Global Variable)

Next, an example is given of a case where, when the microprocessor 100 is multicore, a control program that is executed by a core that is different from a core that executes the system program is set as an owner-side control program.

Figure 34:
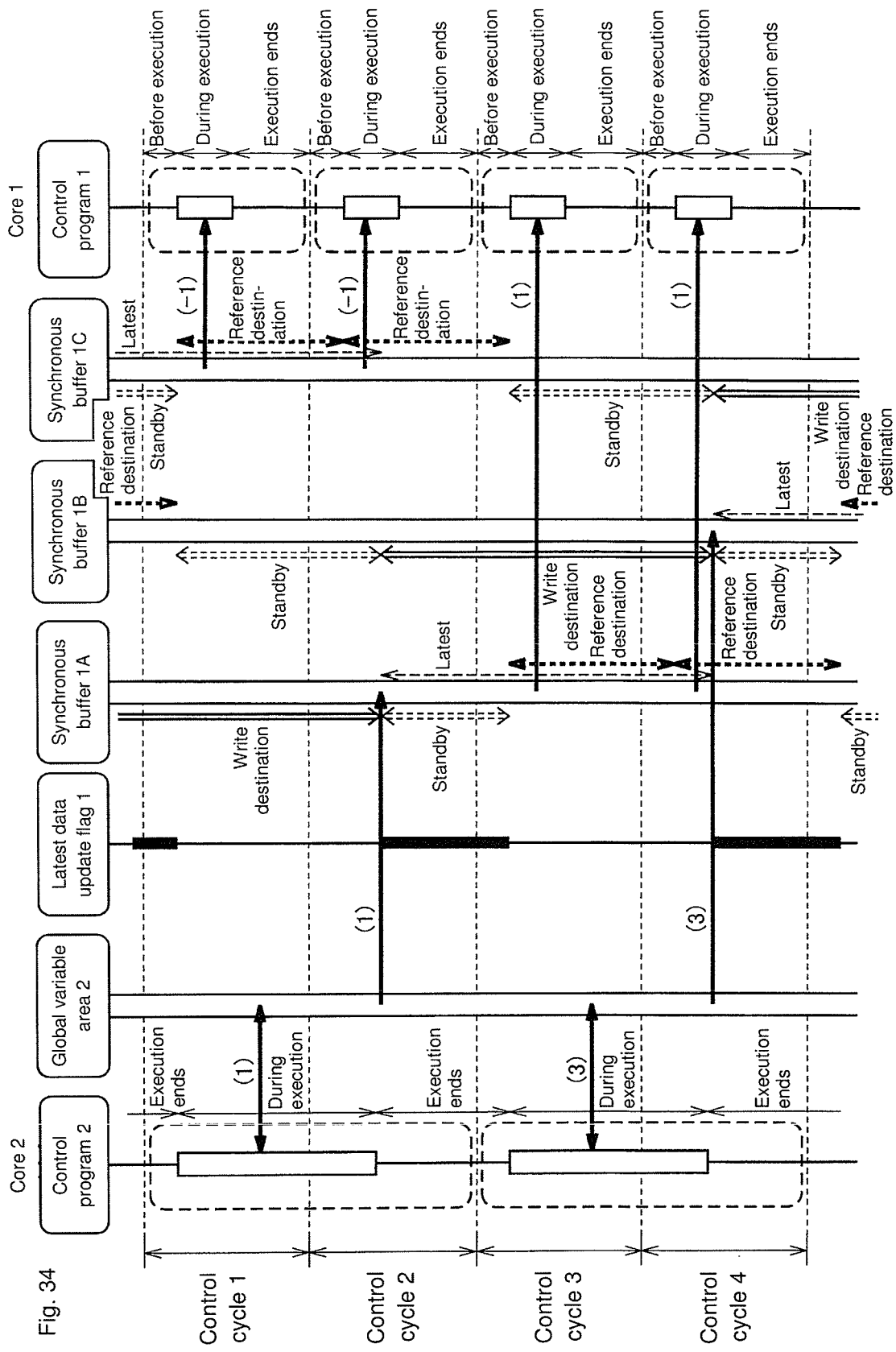
FIG. 34 is a sequence diagram illustrating another execution operation in a multicore microprocessor according to Embodiment 6.

FIG. 34 is a sequence diagram illustrating another execution operation in a multicore microprocessor according to Embodiment 6. In the sequence diagram illustrated in FIG. 34, it is assumed that a control program 2 that is executed by a core 2 is set as an owner-side control program. Similar to the above-described FIGS. 31 and 32, FIG. 34 is a sequence diagram for commonly describing Embodiment 6 and Embodiment 7 (to be described later). Therefore, when Embodiment 6 is described with reference to FIG. 34, only a "latest data update flag" is focused on, and a "latest" state identification indicated along time axes of the synchronous buffers 2A, 2B, and 2C is not needed. On the other hand, when Embodiment 7 is described with reference to FIG. 34, only the "latest" state identification indicated along the time axes of the synchronous buffers 2A, 2B, and 2C is focused on and the "latest data update flag" is not needed.

FIG. 35 is a flow chart illustrating another execution operation according to Embodiment 6. In the flow chart of FIG. 35, a step that executes a same process as in the flow chart illustrated in FIG. 28 is given a same step number as in FIG. 28.

The flow chart illustrated in FIG. 35 is different as compared to the flow chart illustrated in FIG. 28 in that processes of step S212L and S240L are executed in place of steps S212H and S240H, respectively. In the following, the difference is mainly described, and detailed description of other processes is not repeated.

In step S212L that is executed when the control program 1 (referrer-side control program) is in the "before execution" state ("before execution" in step S210G), when a latest data update flag 1 is set to ON, the microprocessor 100 changes a synchronous buffer 1 (one of the synchronous buffers 1A, 1B, and 1C) that was in the "standby" state to the "reference destination" state and changes a synchronous buffer 1 (one of the synchronous buffers 1A, 1B, and 1C) that was in the "reference destination" state to the "standby" state, and then changes the latest data update flag 1 from ON to OFF.

When the latest data update flag 1 is not set to ON (when the latest data update flag 1 is set to OFF), the "standby" state and "reference destination" state of the synchronous buffers 1 are not changed and the latest data update flag 1 is also maintained as OFF.

Further, the microprocessor 100 (core 1) sets the execution state of the control program 1 to the "during execution" and starts execution of the control program 1 (step S212L).

In step S240L that is executed when an "execution ended" notification of the control program 2 is received (YES in step S236 or YES in step S236F), the microprocessor 100 sets the execution state of the control program 2 to the "execution ended" state and then copies data stored in the global variable area 2 to a synchronous buffer 1 (one of the synchronous buffers 1A, 1B, and 1C) that is set to the "write destination" state. Further, the microprocessor 100 changes a synchronous buffer 1 (one of the synchronous buffers 1A, 1B, and 1C) that was in the "write destination" state to the "standby" state and changes a synchronous buffer 1 (one of the synchronous buffers 1A, 1B, and 1C) that was in the "standby" state to the "write destination" state, and then sets the latest data update flag 1 to ON (step S220L).

(k4: Summary)

As described above, in Embodiment 6, the system program 210 includes the following processes (1)-(3) as an execution preparation process of the control program 230.

(1) A process in which the global variable area 1042a storing a global variable is generated in the memory means (basically, the main memory 104).

(2) A process in which, with respect to each referrer-side control program and for each global variable that is referenced from the referrer-side control program, a first synchronous buffer, a second synchronous buffer and a third synchronous buffer that serve as a reference destination in place of the global variable area when the referrer-side control program references the global variable are generated in the memory means as a group of synchronous buffers (synchronous buffers 1A, 1B, and 1C or synchronous buffers 2A, 2B, and 2C).

(3) A process in which, for each combination of an owner-side control program and a referrer-side control program that are associated by a global variable, a latest data update flag is generated in the memory means.

In this case, the first synchronous buffer, the second synchronous buffer and the third synchronous buffer are each set to, in a non-overlapping manner, one of the "write destination" state in which a global variable can be copied from the global variable area to a synchronous buffer, the "reference destination" state in which a synchronous buffer can be referenced from a referrer-side control program, and the "standby" state.

Further, the system program 210 includes the following processes (1)-(3) as an execution control process of the control program 230.

(1) An owner-side start process (step S212 in FIG. 33 and step S232A in FIG. 35) that starts execution of an owner-side control program.

(2) A copy process (step S220K in FIG. 33 and step S240L in FIG. 35) that, when execution of an owner-side control program ends, copies a global variable that is rewritten by the owner-side control program from a global variable area to a synchronous buffer that corresponds to the global variable and that is in the write destination state, and further executes a first interchange process in which the write destination state and the standby state of a synchronous buffer in the write destination state that becomes copy destination and a synchronous buffer in the standby state that is in the same group as the synchronous buffer as a copy destination in the write destination state are interchanged, and a process in which a latest data update flag related to this copy process is set to ON.

(3) A referrer-side start process (step S232K in FIG. 33 and step S212L in FIG. 35) that starts execution of a referrer-side control program, and, with respect to synchronous buffers of the referrer-side control program of which execution is started, under a condition that a synchronous buffer storing the latest data is in the standby state (that is, under a condition that a latest data update flag related to the synchronous buffers of the referrer-side control program of which execution is started is ON), further executes a second interchange process in which the standby state and the reference destination state of a synchronous buffer that is in the standby state and a synchronous buffer that is in the reference destination state are interchanged, and a process in which the latest data update flag that is in the ON state is set to OFF.

According to the above-described Embodiment 6, with respect to each referrer-side control program and for each global variable that is referenced from the referrer-side control program, there are three synchronous buffers and there is always one of the synchronous buffers that is in the write destination state. Therefore, the copy process can be performed at any time. Further, the synchronous buffer storing the latest data that is copied when the execution of the referrer-side control program starts is used as the reference destination. Thereby, the referrer-side control program can reference the value of the global variable that is the latest when the execution of the referrer-side control program starts.

Further, in Embodiment 6, by using a synchronous buffer that stores the latest data that is copied when execution of a referrer-side control program is started as the reference destination, in the copy process, interchange of the write destination state and the standby state of the synchronous buffers is performed, and in the referrer-side start process, based on the state of the latest data update flag, interchange of the standby state and the reference destination state of the synchronous buffers is performed. The synchronous buffer that is in the write destination state when the copying from the global variable area is performed changes through the standby state to the reference destination state.

In the case of the above-described Embodiment 4, in the referrer-side start process, during a short period of time in which the interchange process (third interchange process) of the write destination state and the reference destination state of the synchronous buffers is performed, the copy process from the global variable area to a synchronous buffer cannot be performed, and it is necessary to wait until the third interchange process ends to perform the copy process. However, in the case of Embodiment 6, it is possible to design in a manner that, in the referrer-side start process, even during the period of time in which the interchange process (second interchange process) of the standby state and the reference destination state of the synchronous buffers is performed, the copy process from the global variable area to a synchronous buffer can be executed.

<L. Latest Data Type Three-Buffer Interchange Method (Embodiment 7)>

(l1: Overview)

In the above-described Embodiment 5, an example is given of a configuration in which information for identifying a synchronous buffer that stores copied latest data as a reference destination is used to store data in two synchronous buffers. In Embodiment 7, an example is given of a configuration in which data is stored in three synchronous buffers. That is, an example is given of a configuration in which the configuration of Embodiment 5 is expanded to include three synchronous buffers.

In Embodiment 7, an example is also given of a case where the microprocessor 100 is multicore.

(I2: [Multicore] Control Program Executed by the Same Core as the System Program is an Owner of a Global Variable)

An execution operation in a multicore microprocessor according to Embodiment 7 is illustrated in the sequence diagrams of the above-described FIGS. 31 and 32. However, FIGS. 31 and 32 are sequence diagrams for commonly describing the above-described Embodiment 6 and Embodiment 7. In Embodiment 7, only the "latest" state identification indicated along the time axes of the synchronous buffers 2A, 2B, and 2C is focused on and the "latest data update flag" is not needed.

Figure 36:
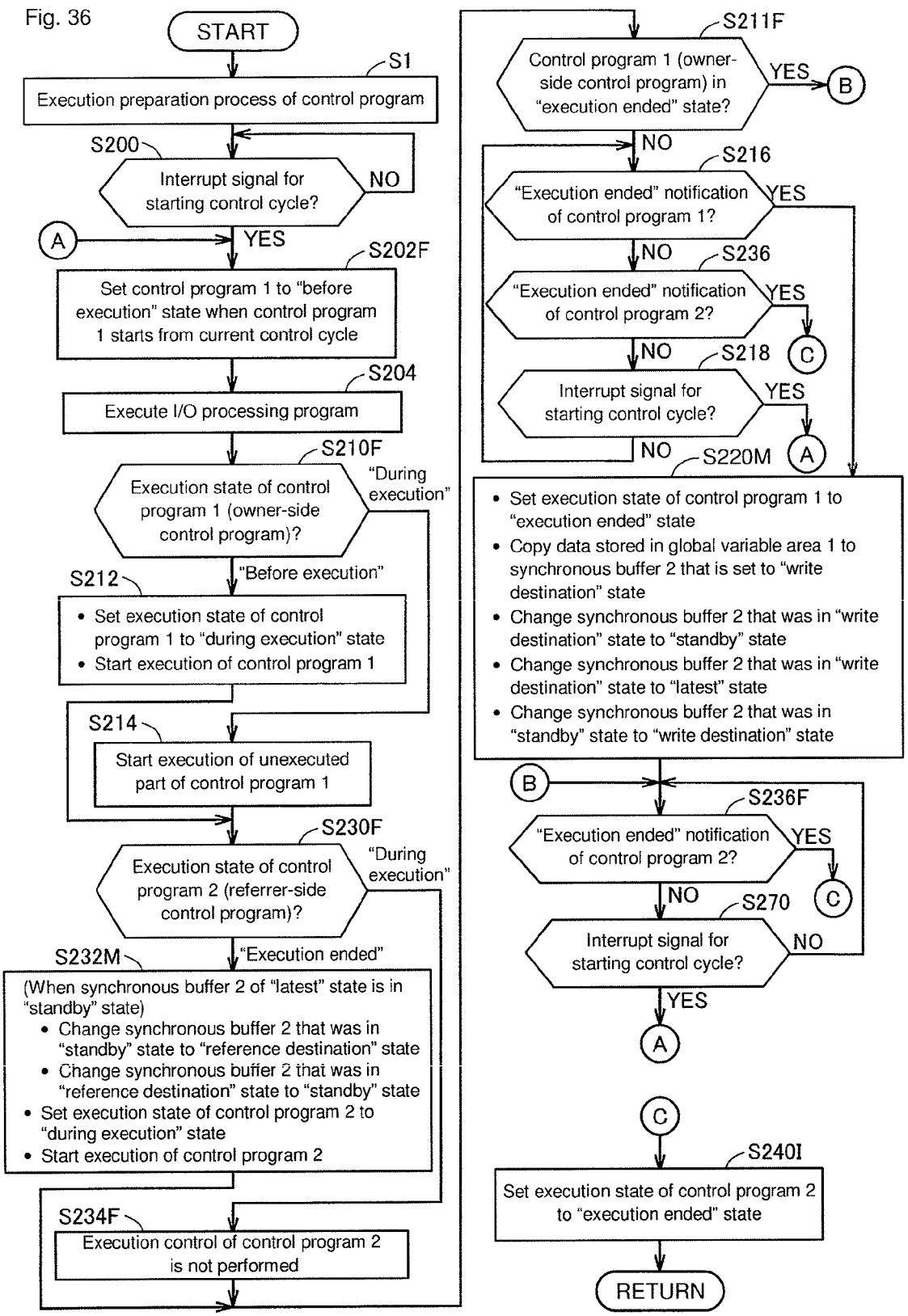
FIG. 36 is a flow chart illustrating an execution operation according to Embodiment 7.

FIG. 36 is a flow chart illustrating an execution operation according to Embodiment 7. The flow chart illustrated in FIG. 36 is applicable to any one of FIGS. 31 and 32. In the flow chart of FIG. 36, a step that executes a substantially same process as in the flow chart illustrated in FIG. 29 is given a same step number as in FIG. 29.

The flow chart illustrated in FIG. 36 is different as compared to the flow chart illustrated in FIG. 29 in that processes of steps S232M and S220M are executed in place of steps S232I and S220I, respectively. In the following, the difference is mainly described, and detailed description of other processes is not repeated.

In step S232M that is executed when the control program 2 (referrer-side control program) is in the "execution ended" state ("execution ended" in step S230F), when a synchronous buffer 2 (one of the synchronous buffers 2A, 2B, and 2C) that is in the "latest" state is set to the "standby" state, the microprocessor 100 (core 1) changes the synchronous buffer 2 (one of the synchronous buffers 2A, 2B, and 2C) that was in the "standby" state to the "reference destination" state and changes a synchronous buffer 2 (one of the synchronous buffers 2A, 2B, and 2C) that was in the "reference destination" state to the "standby" state.

When a synchronous buffer 2 (one of the synchronous buffers 2A, 2B, and 2C) that is in the "latest" state is set to the "reference" state, the "standby" state and "reference destination" state of the synchronous buffer 2 are not changed and are maintained.

Further, the microprocessor 100 (core 1) sets the execution state of the control program 2 to the "during execution" state and causes the core 2 to start execution of the control program 2 (step S232M).

In step S220M that is executed when an "execution ended" notification of the control program 1 is received (YES in step S216), the microprocessor 100 sets the execution state of the control program 1 to the "execution ended" state and then copies data stored in the global variable area 1 to a synchronous buffer 2 (one of the synchronous buffers 2A, 2B, and 2C) that is set to the "write destination" state. Further, microprocessor 100 changes a synchronous buffer 2 (one of the synchronous buffers 2A, 2B, and 2C) that was in the "write destination" state to the "standby" state and also sets it to the "latest" state, and sets a synchronous buffer 2 (one of the synchronous buffers 2A, 2B, and 2C) that was in the "standby" state to the "write destination" state (step S220M).

The above-described states of a synchronous buffer, that is, the write destination state, the reference destination state, the standby state and the latest state of a synchronous buffer, are respectively indicated by recording in a write destination state recording area, a reference destination state recording area, a standby state recording area and a latest state recording area, respectively, that the corresponding synchronous buffer is in the write destination state, the reference destination state, the standby state and the latest state. These recording areas are generated in the control program work area 1042 in the main memory 104 by the system program 210 in the "execution preparation process of a control program" (step S1 illustrated in FIG. 5). A mode of the recording that a synchronous buffer is in the write destination state, the reference destination state, the standby state or the latest state can be suitably determined. For example, modes can be adopted such as that in which information (such as an identification number of a group of synchronous buffers) that identifies a group that is in the write destination state, the reference destination state, the standby state or the latest state among the groups of synchronous buffers that are grouped in units for each of which the collective copying process is performed, and that in which, for each of the groups of the synchronous buffers, a flag or state variable that indicates whether the group is in the write destination state, the reference destination state, the standby state or the latest state is provided and a value of the flag or state variable is recorded. For one synchronous buffer, the write destination state, the reference destination state and the standby state are set so that they do not overlap. Therefore, it is also possible to generate a common state recording area without dividing it into the write destination state recording area, the reference destination state recording area and the standby state recording area and use one group of flags or one state variable to indicate which state of the three states the synchronous buffer is in.

(I3: [Multicore] Control Program Executed by a Different Core from the System Program is an Owner of a Global Variable)

Next, an example is given of a case where, when the microprocessor 100 is multicore, a control program that is executed by a core that is different from a core that executes the system program is set as an owner-side control program.

Another execution operation in a multicore microprocessor according to Embodiment 7 is illustrated in the sequence diagram of the above-described FIG. 34. However, FIG. 34 is a sequence diagram for commonly describing the above-described Embodiment 6 and Embodiment 7. In Embodiment 7, only the "latest" state identification indicated along the time axes of the synchronous buffers 2A, 2B, and 2C is focused on and the "latest data update flag" is not needed.

FIG. 37 is a flow chart illustrating another execution operation according to Embodiment 7. In the flow chart of FIG. 37, a step that executes a same process as in the flow chart illustrated in FIG. 30 is given a same step number as in FIG. 30.

The flow chart illustrated in FIG. 37 is different as compared to the flow chart illustrated in FIG. 30 in that processes of steps S212N and S240N are executed in place of steps S212J and S240J, respectively. In the following, the difference is mainly described, and detailed description of other processes is not repeated.

In step S212N that is executed when the control program 1 (referrer-side control program) is in the "before execution" state ("before execution" in step S210G), when a synchronous buffer 1 (one of the synchronous buffers 1A, 1B, and 1C) that is in the "latest" state is set to the "standby" state, the microprocessor 100 changes the synchronous buffer 1 (one of the synchronous buffers 1A, 1B, and 1C) that was in the "standby" state to the "reference destination" state and changes a synchronous buffer 1 (one of the synchronous buffers 1A, 1B, and 1C) that was in the "reference destination" state to the "standby" state.

When a synchronous buffer 1 (one of the synchronous buffers 1A, 1B, and 1C) that is in the "latest" state is set to the "reference" state, the "standby" state and "reference destination" state of the synchronous buffer 1 are not changed and are maintained.

Further, the microprocessor 100 (core 1) sets the execution state of the control program 1 to the "during execution" state and starts execution of the control program 1 (step S212N).

In step S240N that is executed when an "execution ended" notification of the control program 1 is received (YES in step S236 or YES in step S236F), the microprocessor 100 sets the execution state of the control program 2 to the "execution ended" state and then copies data stored in the global variable area 2 to a synchronous buffer 1 (one of the synchronous buffers 1A, 1B, and 1C) that is set to the "write destination" state. Further, microprocessor 100 changes a synchronous buffer 1 (one of the synchronous buffers 1A, 1B, and 1C) that was in the "write destination" state to the "standby" state and also sets it to the "latest" state and further sets a synchronous buffer 1 (one of the synchronous buffers 1A, 1B, and 1C) that was in the "standby" state to the "write destination" state (step S240N).

(14: Summary)

As described above, in Embodiment 7, the system program 210 includes the following processes (1)-(3) as an execution preparation process of the control program 230.

(1) A process in which the global variable area 1042a storing a global variable is generated in the memory means (basically, the main memory 104).

(2) A process in which, with respect to each referrer-side control program and for each global variable that is referenced from the referrer-side control program, a first synchronous buffer, a second synchronous buffer and a third synchronous buffer that serve as a reference destination in place of the global variable area when the referrer-side control program references the global variable are generated in the memory means as a group of synchronous buffers (synchronous buffers 1A, 1B, and 1C or synchronous buffers 2A, 2R, and 2C).

(3) A process generating a latest state recording area in the memory means.

The first synchronous buffer, the second synchronous buffer and the third synchronous buffer are each set to, in a non-overlapping manner, one of the "write destination" state in which a global variable can be copied from the global variable area to a synchronous buffer, the "reference destination" state in which a synchronous buffer can be referenced from a referrer-side control program, and the "standby" state.

Further, the system program 210 includes the following processes (1)-(3) as an execution control process of the control program 230.

(1) An owner-side start process (step S212 in FIG. 36 and step S232A in FIG. 37) that starts execution of an owner-side control program.

(2) A copy process (step S220M in FIG. 36 and step S240N in FIG. 37) that, when execution of an owner-side control program ends, copies a global variable that is rewritten by the owner-side control program from a global variable area to a synchronous buffer that corresponds to the global variable and that is in the write destination state, and further executes a first interchange process in which the write destination state and the standby state of a synchronous buffer in the write destination state that becomes a copy destination and a synchronous buffer in the standby state that is in the same group as the synchronous buffer in the write destination state are interchanged, and a process in which that the synchronous buffer as a copy destination is in the latest state is recorded in a latest state recording area.

(3) A referrer-side start process (step S232M in FIG. 36 and step S212N in FIG. 37) that starts execution of a referrer-side control program and, with respect to synchronous buffers of the referrer-side control program of which execution is started, under a condition that a synchronous buffer that is in the latest state that is identified according to content of a latest state recording area is in the standby state, further executes a second interchange process in which the standby state and the reference destination state of a synchronous buffer that is in the standby state and a synchronous buffer that is in the reference destination state are interchanged.

The referrer-side start process can also be described as follows, that is, a referrer-side start process that starts execution of a referrer-side control program and further executes a process in which a synchronous buffer that is the latest state that is identified according to content of a latest state recording area is set to the reference destination state in which the synchronous buffer is referenced by the referrer-side control program during execution, and a synchronous buffer that belongs to the same group as the synchronous buffer in the reference destination state and that is not in the write destination state is set to the standby state.

According to the above-described Embodiment 7, with respect to each referrer-side control program and for each global variable that is referenced from the referrer-side control program, there are three synchronous buffers and there is always one of the synchronous buffers that is in the write destination state. Therefore, the copy process can be performed at any time. Further, the synchronous buffer storing the latest data that is copied when the execution of the referrer-side control program starts is used as the reference destination. Thereby, the referrer-side control program can reference the value of the global variable that is the latest when the execution of the referrer-side control program starts.

Further, in Embodiment 7, by using a synchronous buffer that stores the latest data that is copied when execution of a referrer-side control program is started as the reference destination, in the copy process, interchange of the write destination state and the standby state of the synchronous buffers is performed, and in the referrer-side start process, based on the content of the latest state recording area, interchange of the standby state and the reference destination state of the synchronous buffers is performed. The synchronous buffer that is in the write destination state when the copying from the global variable area is performed changes through the standby state to the reference destination state.

In the case of the above-described Embodiment 5, in the referrer-side start process, during a short period of time in which the interchange process (third interchange process) of the write destination state and the reference destination state of the synchronous buffers is performed, the copy process from the global variable area to a synchronous buffer cannot be performed, and it is necessary to wait until the third interchange process ends to perform the copy process. However, in the case of Embodiment 7, it is possible to design in a manner that, in the referrer-side start process, even during the period of time in which the interchange process (second interchange process) of the standby state and the reference destination state of the synchronous buffers is performed, the copy process from the global variable area to a synchronous buffer can be executed.

<M. Support Device>

Next, creation of a program that is executed in the PLC 1 and the PLC support device 8 for performing maintenance of the PLC 1 and the like are described.

Figure 38:
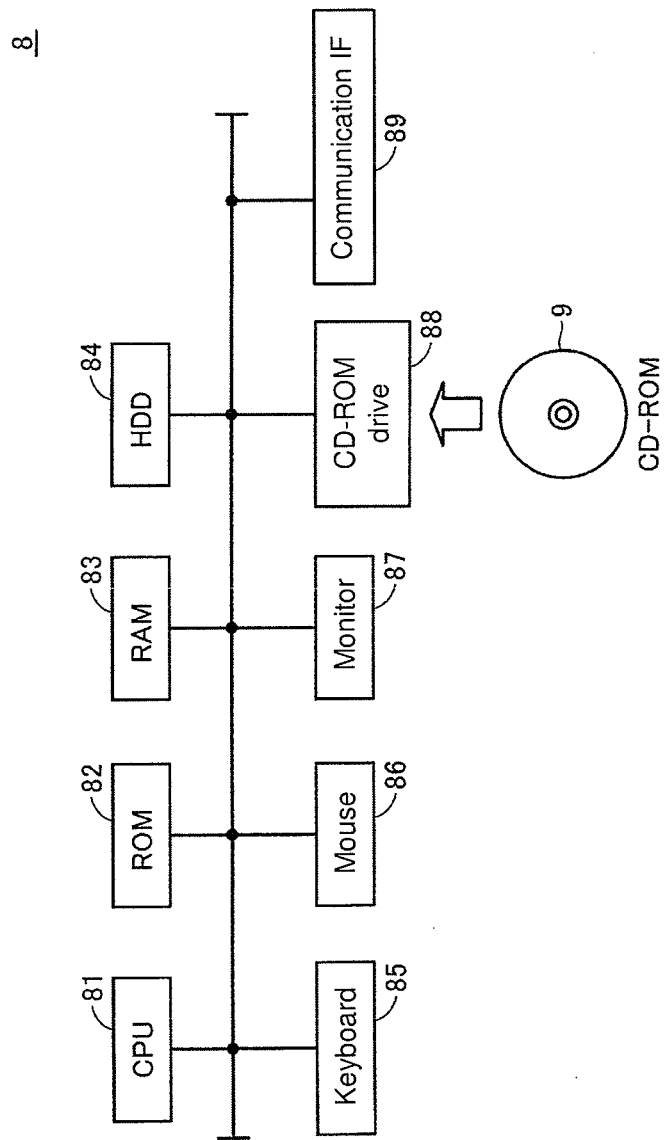
FIG. 38 is a schematic view illustrating a hardware configuration of a PLC support device connected to and used with the CPU unit according to the embodiments of the present invention.

FIG. 38 is a schematic view illustrating a hardware configuration of the PLC support device 8 connected to and used with the CPU unit according to the embodiments of the present invention. With reference to FIG. 38, the PLC support device 8 is typically configured with a general-purpose computer. From a viewpoint of maintainability, a laptop-type personal computer excellent in portability is preferable.

With reference to FIG. 38, the PLC support device 8 includes a CPU 81 executing various programs including an OS, a ROM (Read Only Memory) 82 storing BIOS and various data, a memory RAM 83 providing a work area that stores data required for execution of a program by the CPU 81, and a hard disk (HDD) 84 storing, in a non-volatile manner, a program and the like executed by the CPU 81.

The PLC support device 8 further includes a keyboard 85 and a mouse 86 receiving operation by a user, and a monitor 87 displaying information to the user. Furthermore, the PLC support device 8 includes a communication interface (IF) 89 to communicate with the PLC 1 (CPU unit 13) and the like.

As described later, the various programs executed in the PLC support device 8 are stored in a CD-ROM 9 for distribution. The programs stored in this CD-ROM 9 are read by a CD-ROM (Compact Disk-Read Only Memory) drive 88 and is stored in the hard disk (HDD) 84 and the like. Alternatively, a program may be downloaded via a network from a superordinate host computer and the like.

As described above, the PLC support device 8 is embodied with a general-purpose computer, and a further description for the PLC support device 8 is thus omitted.

Figure 39:
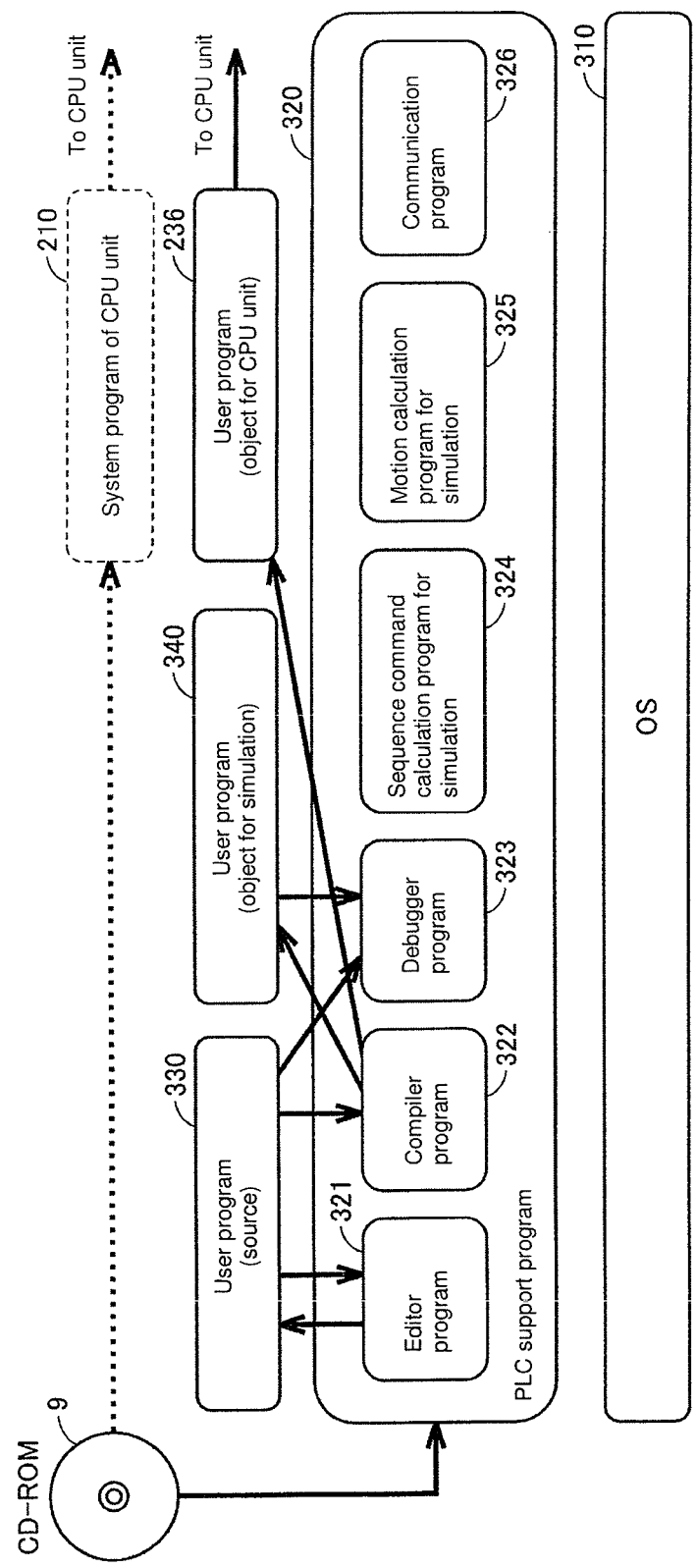
FIG. 39 is a schematic view illustrating a software configuration of the PLC support device connected to and used with the CPU unit according to the embodiments of the present invention.

FIG. 39 is a schematic view illustrating a software configuration of the PLC support device 8 connected to and used with the CPU unit according to the embodiments of the present invention. With reference to FIG. 39, an OS 310 is executed in the PLC support device 8 in order to provide an environment in which various programs included in a PLC support program 320 can be executed.

The PLC support program 320 includes an editor program 321, a compiler program 322, a debugger program 323, a sequence command calculation program for simulation 324, a motion calculation program for simulation 325, and a communication program 326. Each program included in the PLC support program 320 is typically distributed in a state of being stored in the CD-ROM 9 and is installed in the PLC support device 8.

The editor program 321 provides a function such as input and edit functions to create a user program 236. More specifically, in addition to a function with which a user creates a source program 330 of the user program 236 by operating the keyboard 85 and the mouse 86, the editor program 321 provides functions to save and edit the created source program 330. Further, the editor program 321 receives input of the source program of the control program 230 (especially, user program 236) from outside, and edits already existing source program of the control program 230 through operation of the user. Further, the editor program 321 performs input and edit operations of attribute data of a variable used by the control program 230.

The compiler program 322 compiles the source program of the control program 230 to provide a function generating the user program 236 in an object program format that can be executed by the microprocessor 100 of the CPU unit 13. In addition, the compiler program 322 compiles the source program 330 to provide a function generating a user program 340 in an object program format that can be executed by the CPU 81 of the PLC support device 8. This user program 340 is an object program for simulation used to simulate (imitate) operation of the PLC 1 with the PLC support device 8.

The debugger program 323 provides a function debugging a source program of the control program 230. The debugging includes operations such as partial execution of a user-designated portion of a source program and tracking of temporal change in a variable value during execution of the source program.

The debugger program 323 further provides a function executing an object program for simulation of the control program 230. At the time of the simulation, the sequence command calculation program for simulation 324 and the motion calculation program for simulation 325 included in the PLC support program 320 are used in replacement of the sequence command calculation program 232 and the motion calculation program 234 included in the system program of the CPU unit 13.

The communication program 326 provides a function transferring, to the CPU unit 13 of the PLC 1, the object program for the CPU unit 13 of the control program 230 and attribute data of a variable.

In general, the system program 210 provided to the PLC 1 is stored in the non-volatile memory 106 of the CPU unit 13 at a stage of manufacturing the CPU unit 13. However, when the system program 210 is stored in the CD-ROM 9, the user can copy the system program 210 in the CD-ROM 9 to the PLC support device 8 and transfer the copied system program 210 to the CPU unit 13 using the function provided by the communication program 326. Moreover, when the realtime OS 200 to be executed by the CPU unit 13 of the PLC 1 is stored in the CD-ROM 9, the realtime OS 200 can be also re-installed in the PLC 1 by a user operation.

The embodiments disclosed here should be considered as examples and not as limitation of the present invention in all aspects. The scope of the present invention is indicated not by the description above but by the scope of claims. The scope of the present invention is intended to include all modifications without departing from the scope of the claims and the meaning and scope of equivalents.

DESCRIPTION OF REFERENCE NUMERALS

1 PLC, 2 Field network, 3 Servo motor driver, 4 Servo motor, 5 Terminal, 6 Detection switch, 7 Relay, 8 PLC support device, 9 CD-ROM, 10 Connection cable, 11 PLC system bus, 12 Power supply unit, 13 CPU unit, 14, 53 I/O unit, 15 Specialty unit, 51 Terminal bus, 52 Communication coupler, 81 CPU, 83 RAM, 85 Keyboard, 86 Mouse, 87 Monitor, 88 CD-ROM drive, 100 Microprocessor, 102 Chip set, 104 Main memory, 106 Non-volatile memory, 108 System timer, 110 USB connector, 120 PLC system bus controller, 122 DMA control circuit, 124 PLC system bus control circuit, 126, 146 Buffer memory, 130 PLC system bus connector, 140 Field network controller, 142 DMA control circuit, 144 Field network control circuit, 210, 220 System program, 212 Scheduler program, 214 Output processing program, 216 Input processing program, 218 I/O processing program, 230 Control program, 232 Sequence command calculation program, 234 Motion calculation program, 236, 340 User program, 320 Support program, 321 Editor program, 322 Compiler program, 323 Debugger program, 324 Sequence command calculation program for simulation, 325 Motion calculation program for simulation 326 Communication program, 330 Source program, 1041 Program area, 1042 Control program work area. 1042a Global variable area, 1042b Synchronous buffer area, 1043 PLC system bus transmission buffer, 1044 PLC system bus reception buffer, 1045 Field network transmission buffer, 1046 Field network reception buffer, 200 Realtime OS, SYS System.

We claim:

1. A CPU of a programmable logic controller (PLC) controlling a control target, comprising:
a microprocessor;
a memory; and
a communication circuit, wherein
the CPU of the PLC is configured to control the control target by repeating transmission of output data, reception of input data, and execution of a plurality of control programs that uses the input data to generate the output data,
the memory stores the plurality of control programs, a system program that controls the execution of the plurality of control programs, and attribute data of a variable that is used by the plurality of control programs,
the microprocessor is configured to execute the system program and the plurality of control programs that are stored in the memory,
the communication circuit is configured to transmit the output data and receives the input data,
the attribute data include, when the variable is a global variable that is referenced by the plurality of the control programs, information specifying one owner-side control program that rewrites the variable and information specifying at least one referrer-side control program that only references the variable,
the system program is configured to cause the microprocessor to execute, as an execution preparation process of the plurality of control programs,
a process in which a global variable area storing the global variable is generated in the memory; and
a process in which, with respect to each referrer-side control program and for each global variable that is referenced by the referrer-side control program, a synchronous buffer is generated in the memory as a reference destination in place of the global variable area when the referrer-side control program references the global variable,
the system program is configured to cause the microprocessor to execute, as an execution control process of the plurality of control programs,
an owner-side start process that starts execution of the owner-side control program;
a copy process in which, when execution of the owner-side control program ends, the global variable that is rewritten by the owner-side control program is copied from the global variable area to the synchronous buffer corresponding to the global variable; and
a referrer-side start process that starts execution of the referrer-side control program,
wherein the plurality of control programs in the PLC are able to reference the global variable for which consistency is ensured, without a need of a control program of the plurality of control programs performing processing to ensure consistency of the global variable and without blocking concurrent execution of the plurality of control programs.

2. The CPU of a PLC according to claim 1, wherein
the process in which the synchronous buffer is generated is a process in which, with respect to each referrer-side control program and for each global variable that is referenced by the referrer-side control program, a first synchronous buffer and a second synchronous buffer are generated as a group of synchronous buffers,
the first synchronous buffer and the second synchronous buffer are each set to, in a non-overlapping manner, one of a write destination state in which the global variable is copied from the global variable area to the synchronous buffer and a reference destination state in which the synchronous buffer is referenced from the referrer-side control program, and
the copy process is a process of copying to the synchronous buffer in the write destination state.

3. The CPU of the PLC according to claim 2, wherein
the process in which the synchronous buffer is generated is a process in which, with respect to each referrer-side control program and for each global variable that is referenced from the referrer-side control program, the first synchronous buffer, the second synchronous buffer and a third synchronous buffer are generated as a group of synchronous buffers,
the first synchronous buffer, the second synchronous buffer and the third synchronous buffer are each set to, in a non-overlapping manner, one of the write destination state, the reference destination state and a standby state,
the copy process further includes a first interchange process in which the write destination state and the standby state of the synchronous buffer in the write destination state that becomes a copy destination and the synchronous buffer in the standby state that is in the same group as the synchronous buffer in the write destination state are interchanged, and
the referrer-side start process further includes a second interchange process in which, with respect to the synchronous buffers of the referrer-side control program of which execution is started, under a condition that the synchronous buffer storing latest data is in the standby state, the standby state and the reference destination state of the synchronous buffer in the standby state and the synchronous buffer in the reference destination state are interchanged.

4. The CPU of the PLC according to claim 3, wherein
the system program is further configured to cause the microprocessor to execute, as the execution preparation process of the plurality of control programs, a process in which, for each combination of the owner-side control program and the referrer-side control program that are associated by the global variable, a latest data update flag is generated in the memory,
the copy process further includes a process in which the latest data update flag related to this copy process is set to ON,
the referrer-side start process further includes, under a condition that the latest data update flag related to the synchronous buffer of the referrer-side control program of which execution is started is ON, the second interchange process and a process in which the latest data update flag is set to OFF, and
thereby, the second interchange process that is executed under a condition that the synchronous buffer storing latest data is in the standby state is realized.

5. The CPU of the PLC according to claim 3, wherein
the system program is further configured to cause the microprocessor to execute, as the execution preparation process of the plurality of control programs, a process in which a latest state recording area is generated in the memory,
the copy process further includes a process in which that the synchronous buffer as the copy destination is in a latest state is recorded in the latest state recording area, and
the referrer-side start process further includes the second interchange process that is executed under a condition that the synchronous buffer in the latest state that is identified according to content of the latest state recording area is in the standby state.

6. The CPU of the PLC according to claim 2, wherein
the referrer-side start process further includes, with respect to the synchronous buffers of the referrer-side control program of which execution is started, under a condition that the synchronous buffer storing latest data is in the write destination state, an interchange process in which the write destination state and the reference destination state of the synchronous buffer in the write destination state and the synchronous buffer in the reference destination state are interchanged.

7. The CPU of the PLC according to claim 6, wherein
the system program is further configured to cause the microprocessor to execute, as the execution preparation process of the plurality of control programs, a process in which, for each combination of the owner-side control program and the referrer-side control program that are associated by the global variable, the latest data update flag is generated in the memory,
the copy process further includes a process in which the latest data update flag related to this copy process is set to ON,
the referrer-side start process further includes, under a condition that the latest data update flag related to the synchronous buffer of the referrer-side control program of which execution is started is ON, the interchange process and a process in which the latest data update flag is set to OFF, and
thereby, the third interchange process that is executed under a condition that the synchronous buffer storing latest data is in the write destination state is realized.

8. The CPU of the PLC according to claim 6, wherein
the system program is further configured to cause the microprocessor to execute, as the execution preparation process of the plurality of control programs, a process in which a latest state recording area is generated in the memory,
the copy process further includes a process in which that the synchronous buffer as the copy destination is in a latest state is recorded in the latest state recording area, and
the referrer-side start process further includes the third interchange process that is executed under a condition that the synchronous buffer in the latest state that is identified according to content of the latest state recording area is in the write destination state.

9. The CPU of the PLC according to claim 1, wherein
the process in which the synchronous buffer is generated is a process in which, with respect to each referrer-side control program and for each global variable that is referenced from the referrer-side control program, a first synchronous buffer and a second synchronous buffer are generated as a group of synchronous buffers,
the system program is further configured to cause the microprocessor to execute, as the execution preparation process of the plurality of control programs, a process in which a latest state recording area is generated in the memory,
the copy process further includes a process in which that the synchronous buffer as a copy destination is in a latest state is recorded in the latest state recording area, and
the referrer-side start process further includes a process in which the synchronous buffer in the latest state that is identified according content of the latest state recording area is set to a reference destination state in which the synchronous buffer is referenced by the referrer-side control program during execution.

10. The CPU of the PLC according to claim 9, wherein
the process in which the synchronous buffer is generated is a process in which, with respect to each referrer-side control program and for each global variable that is referenced by the referrer-side control program, the first synchronous buffer, the second synchronous buffer and a third synchronous buffer are generated as a group of synchronous buffers,
the first synchronous buffer, the second synchronous buffer and the third synchronous buffer are each set to, in a non-overlapping manner, one of a write destination state in which the global variable is copied from the global variable area, the reference destination state and a standby state,
the copy process is a process of copying to the synchronous buffer in the write destination state and further includes a first interchange process in which the write destination state and the standby state of the synchronous buffer in the write destination state that becomes the copy destination and the synchronous buffer in the standby state that is in the same group as the synchronous buffer as the copy destination are interchanged, and
the referrer-side start process further includes a process in which the synchronous buffer that belongs to the same group as the synchronous buffer in the reference destination state and is not in the write destination state is set to the standby state.

11. The CPU of the PLC according to claim 9, wherein
the first synchronous buffer and the second synchronous buffer are set to, in a non-overlapping manner, one of the write destination state in which the global variable is copied from the global variable area and the reference destination state,
the copy process is a process of copying to the synchronous buffer in the write destination state, and
the referrer-side start process further includes a process in which the other synchronous buffer that belongs to the same group as the synchronous buffer in the reference destination state is set to the write destination state.

12. The CPU of the PLC according to claim 9, wherein
the referrer-side start process further includes a process in which the synchronous buffer in the latest state that is identified according content of the latest state recording area is set to a write-protect state,
the system program is further configured to cause the microprocessor to execute, as the execution control process of the plurality of control programs, a write-protect release process in which, when execution of the referrer-side control program ends, the write-protect state of the synchronous buffer that was in the write-protect state is released, and the copy process is a process in which copying is performed using one of the first synchronous buffer and the second synchronous buffer that is not in the write-protect state as a copy destination.

13. The CPU of the PLC according to claim 1, wherein
the referrer-side start process further includes a process in which the synchronous buffer that is referenced during execution of the referrer-side control program is set to a write-protect state,
the system program is configured to cause the microprocessor to execute, as the execution control process of the plurality of control programs, a write-protect release process in which, when execution of the referrer-side control program ends, the write-protect state of the synchronous buffer that was in the write-protect state is released, and
the copy process is a process that is executed under a condition that the synchronous buffer as a copy destination is not in the write-protect state.

14. The CPU of the PLC according to claim 13, wherein
the process in which the synchronous buffer is generated is a process in which, with respect to each referrer-side control program and for each global variable that is referenced from the referrer-side control program, one synchronous buffer is generated.

15. The CPU of a PLC according to claim 13, wherein
the process in which the synchronous buffer is generated is a process in which, with respect to each referrer-side control program and for each global variable that is referenced from the referrer-side control program, a first synchronous buffer and a second synchronous buffer are generated as a group of synchronous buffers,
the system program is further configured to cause the microprocessor to execute, as the execution preparation process of the plurality of control programs, a process in which a latest state recording area is generated in the memory,
the copy process is a process in which copying is performed using one of the first synchronous buffer and the second synchronous buffer that is not in the write-protect state as a copy destination, and further includes a process in which that the synchronous buffer as the copy destination is in a latest state is recorded in the latest state recording area, and
the referrer-side start process further includes a process in which the synchronous buffer in the latest state that is identified according to content of the latest state recording area is set to the reference destination state in which the synchronous buffer is referenced during execution of the referrer-side control program.

16. The CPU of a PLC according to claim 1, wherein
the process in which the synchronous buffer is generated is a process in which, with respect to each referrer-side control program and for each global variable that is referenced from the referrer-side control program, a first synchronous buffer and a second synchronous buffer are generated as a group of synchronous buffers,
the second synchronous buffer is the synchronous buffer that is a reference destination when the referrer-side control program references the global variable,
the copy process is a process of copying to the first synchronous buffer, and
the referrer-side start process further includes a process in which data stored in the first synchronous buffer is copied to the second synchronous buffer.

17. A programmable logic controller (PLC) system including a program being stored in a memory to be executed by a microprocessor in a CPU of the PLC, the CPU comprising the microprocessor, the memory and a communication circuit and controlling a control target by repeating transmission of output data, reception of input data and execution of a plurality of control programs that uses the input data to generate the output data, wherein
the memory stores the plurality of control programs, the system program that controls the execution of the plurality of control programs, and attribute data of a variable that is used by the plurality of control programs,
the microprocessor is configured to execute, in addition to the system program, the plurality of control programs,
the communication circuit is configured to transmit the output data and receives the input data,
the attribute data include, when the variable is a global variable that is referenced by a plurality of the control programs, information specifying one owner-side control program that rewrites the variable and information specifying at least one referrer-side control program that only references the variable,
the system program is configured to cause the microprocessor to execute, as an execution preparation process of the plurality of control programs,
a process in which a global variable area storing the global variable is generated in the memory; and
a process in which, with respect to each referrer-side control program and for each global variable that is referenced by the referrer-side control program, a synchronous buffer is generated in the memory as a reference destination in place of the global variable area when the referrer-side control program references the global variable, and
the system program is configured to cause the microprocessor to execute, as an execution control process of the plurality of control programs,
an owner-side start process that starts execution of the owner-side control program;
a copy process in which, when execution of the owner-side control program ends, the global variable that is rewritten by the owner-side control program is copied from the global variable area to the synchronous buffer corresponding to the global variable; and
a referrer-side start process that starts execution of the referrer-side control program,
wherein the plurality of control programs in the PLC are able to reference the global variable for which consistency is ensured, without a need of a control program of the plurality of control programs performing processing to ensure consistency of the global variable and without blocking concurrent execution of the plurality of control programs.

18. The system according to claim 17, wherein
the process in which the synchronous buffer is generated is a process in which, with respect to each referrer-side control program and for each global variable that is referenced by the referrer-side control program, a first synchronous buffer and a second synchronous buffer are generated as a group of synchronous buffers,
the first synchronous buffer and the second synchronous buffer are each set to, in a non-overlapping manner, one of a write destination state in which the global variable is copied from the global variable area to the synchronous buffer and a reference destination state in which the synchronous buffer is referenced from the referrer-side control program, and the copy process is a process of copying to the synchronous buffer in the write destination state.

19. The system according to claim 18, wherein
the process in which the synchronous buffer is generated is a process in which, with respect to each referrer-side control program and for each global variable that is referenced from the referrer-side control program, the first synchronous buffer, the second synchronous buffer and a third synchronous buffer are generated as a group of synchronous buffers,
the first synchronous buffer, the second synchronous buffer and the third synchronous buffer are each set to, in a non-overlapping manner, one of the write destination state, the reference destination state and a standby state,
the copy process further includes a first interchange process in which the write destination state and the standby state of the synchronous buffer in the write destination state that becomes a copy destination and the synchronous buffer in the standby state that is in the same group as the synchronous buffer in the write destination state are interchanged, and
the referrer-side start process further includes a second interchange process in which, with respect to the synchronous buffers of the referrer-side control program of which execution is started, under a condition that the synchronous buffer storing latest data is in the standby state, the standby state and the reference destination state of the synchronous buffer in the standby state and the synchronous buffer in the reference destination state are interchanged.

20. The system according to claim 18, wherein
the referrer-side start process further includes, with respect to the synchronous buffers of the referrer-side control program of which execution is started, under a condition that the synchronous buffer storing latest data is in the write destination state, an interchange process in which the write destination state and the reference destination state of the synchronous buffer in the write destination state and the synchronous buffer in the reference destination state are interchanged.

21. The system according to claim 17, wherein
the process in which the synchronous buffer is generated is a process in which, with respect to each referrer-side control program and for each global variable that is referenced from the referrer-side control program, a first synchronous buffer and a second synchronous buffer are generated as a group of synchronous buffers,
the system program is further configured to cause the microprocessor to further execute, as the execution preparation process of the plurality of control programs, a process in which a latest state recording area is generated in the memory,
the copy process further includes a process in which that the synchronous buffer as a copy destination is in a latest state is recorded in the latest state recording area, and
the referrer-side start process further includes a process in which the synchronous buffer in the latest state that is identified according content of the latest state recording area is set to a reference destination state in which the synchronous buffer is referenced by the referrer-side control program during execution.

22. The system according to claim 17, wherein
the referrer-side start process further includes a process in which the synchronous buffer that is referenced during execution of the referrer-side control program is set to a write-protect state,
the system program is further configured to cause the microprocessor to further execute, as the execution control process of the plurality of control programs, a write-protect release process in which, when execution of the referrer-side control program ends, the write-protect state of the synchronous buffer that was in the write-protect state is released, and
the copy process is a process that is executed under a condition that the synchronous buffer as a copy destination is not in the write-protect state.

23. The system according to claim 17, wherein
the process in which the synchronous buffer is generated is a process in which, with respect to each referrer-side control program and for each global variable that is referenced from the referrer-side control program, a first synchronous buffer and a second synchronous buffer are generated as a group of synchronous buffers,
the second synchronous buffer is the synchronous buffer that is a reference destination when the referrer-side control program references the global variable,
the copy process is a process of copying to the first synchronous buffer, and
the referrer-side start process further includes a process in which data stored in the first synchronous buffer is copied to the second synchronous buffer.

24. A recording medium storing a system program for a programmable logic controller (PLC), the system program being stored in a memory to be executed by a microprocessor in a CPU of the PLC, the CPU comprising the microprocessor, the memory and a communication circuit and controlling a control target by repeating transmission of output data, reception of input data, and execution of a plurality of control programs that uses the input data to generate the output data, wherein
the memory stores the plurality of control programs, the system program that controls the execution of the plurality of control programs, and attribute data of a variable that is used by the control program,
the microprocessor is configured to execute, in addition to the system program, the plurality of control programs,
the communication circuit is configured to transmit the output data and receives the input data,
the attribute data include, when the variable is a global variable that is referenced by a plurality of the control programs, information specifying one owner-side control program that rewrites the variable and information specifying at least one referrer-side control program that only references the variable,
the system program is configured to cause the microprocessor to execute, as an execution preparation process of the plurality of control programs,
a process in which a global variable area storing the global variable is generated in the memory; and
a process in which, with respect to each referrer-side control program and for each global variable that is referenced by the referrer-side control program, a synchronous buffer is generated in the memory as a reference destination in place of the global variable area when the referrer-side control program references the global variable, and
the system program is configured to cause the microprocessor to execute, as an execution control process of the plurality of control programs, an owner-side start process that starts execution of the owner-side control program;

a copy process in which, when execution of the owner-side control program ends, the global variable that is rewritten by the owner-side control program is copied from the global variable area to the synchronous buffer corresponding to the global variable; and a referrer-side start process that starts execution of the referrer-side control program, wherein the plurality of control programs in the PLC are able to reference the global variable for which consistency is ensured, without a need of a control program of the plurality of control programs performing processing to ensure consistency of the global variable and without blocking concurrent execution of the plurality of control programs.

25. The recording medium storing the system program for the PLC according to claim 24, wherein the process in which the synchronous buffer is generated is a process in which, with respect to each referrer-side control program and for each global variable that is referenced by the referrer-side control program, a first synchronous buffer and a second synchronous buffer are generated as a group of synchronous buffers, the first synchronous buffer and the second synchronous buffer are each set to, in a non-overlapping manner, one of a write destination state in which the global variable can be copied from the global variable area to the synchronous buffer and a reference destination state in which the synchronous buffer is referenced from the referrer-side control program, and the copy process is a process of copying to the synchronous buffer in the write destination state.

26. The recording medium storing the system program for the PLC according to claim 25, wherein the process in which the synchronous buffer is generated is a process in which, with respect to each referrer-side control program and for each global variable that is referenced from the referrer-side control program, the first synchronous buffer, the second synchronous buffer and a third synchronous buffer are generated as a group of synchronous buffers, the first synchronous buffer, the second synchronous buffer and the third synchronous buffer are each set to, in a non-overlapping manner, one of the write destination state, the reference destination state and a standby state, the copy process further includes a first interchange process in which the write destination state and the standby state of the synchronous buffer in the write destination state that becomes a copy destination and the synchronous buffer in the standby state that is in the same group as the synchronous buffer in the write destination state are interchanged, and the referrer-side start process further includes a second interchange process in which, with respect to the synchronous buffers of the referrer-side control program of which execution is started, under a condition that the synchronous buffer storing latest data is in the standby state, the standby state and the reference destination state of the synchronous buffer in the standby state and the synchronous buffer in the reference destination state are interchanged.

27. The recording medium storing the system program for the PLC according to claim 25, wherein the referrer-side start process further includes, with respect to the synchronous buffers of the referrer-side control program of which execution is started, under a condition that the synchronous buffer storing latest data is in the write destination state, an interchange process in which the write destination state and the reference destination state of the synchronous buffer in the write destination state and the synchronous buffer in the reference destination state are interchanged.

28. The recording medium storing the system program for the PLC according to claim 24, wherein the process in which the synchronous buffer is generated is a process in which, with respect to each referrer-side control program and for each global variable that is referenced from the referrer-side control program, a first synchronous buffer and a second synchronous buffer are generated as a group of synchronous buffers, the system program is further configured to cause the microprocessor to further execute, as the execution preparation process of the plurality of control programs, a process in which a latest state recording area is generated in the memory, the copy process further includes a process in which that the synchronous buffer as a copy destination is in a latest state is recorded in the latest state recording area, and the referrer-side start process further includes a process in which the synchronous buffer in the latest state that is identified according content of the latest state recording area is set to a reference destination state in which the synchronous buffer is referenced by the referrer-side control program during execution.

29. The recording medium storing the system program for the PLC according to claim 24, wherein the referrer-side start process further includes a process in which the synchronous buffer that is referenced during execution of the referrer-side control program is set to a write-protect state, the system program is further configured to cause the microprocessor to further execute, as the execution control process of the plurality of control programs, a write-protect release process in which, when execution of the referrer-side control program ends, the write-protect state of the synchronous buffer that was in the write-protect state is released, and the copy process is a process that is executed under a condition that the synchronous buffer as a copy destination is not in the write-protect state.

30. The recording medium storing the system program for the PLC according to claim 24, wherein the process in which the synchronous buffer is generated is a process in which, with respect to each referrer-side control program and for each global variable that is referenced from the referrer-side control program, a first synchronous buffer and a second synchronous buffer are generated as a group of synchronous buffers, the second synchronous buffer is the synchronous buffer that is a reference destination when the referrer-side control program references the global variable, the copy process is a process of copying to the first synchronous buffer, and the referrer-side start process further includes a process in which data stored in the first synchronous buffer is copied to the second synchronous buffer.

* * * * *